(12) United States Patent
Devarajan et al.

(10) Patent No.: US 9,760,273 B2
(45) Date of Patent: Sep. 12, 2017

(54) OVERVIEW AXIS HAVING A DIFFERENT GRAPH ELEMENT TYPE

(71) Applicant: SAS Institute Inc., Cary, NC (US)

(72) Inventors: Ravinder Devarajan, Cary, NC (US); Himesh G. Patel, Apex, NC (US); Pat Berryman, Cary, NC (US); Lisa Hope Everdyke, Durham, NC (US); Bradley Edward Morris, Raleigh, NC (US); Christopher Kendrick Edwards, Raleigh, NC (US); Jordan Riley Benson, Ellerbe, NC (US); Timothy Joel Erikson, Wendell, NC (US)

(73) Assignee: SAS Institute Inc., Cary, NC (US)

( * ) Notice: Subject to any disclaimer, the term of this patent is extended or adjusted under 35 U.S.C. 154(b) by 94 days.

(21) Appl. No.: 14/643,556

(22) Filed: Mar. 10, 2015

(65) Prior Publication Data
US 2015/0261737 A1 Sep. 17, 2015

Related U.S. Application Data

(60) Provisional application No. 61/951,486, filed on Mar. 11, 2014, provisional application No. 62/016,066, filed on Jun. 23, 2014.

(51) Int. Cl.
*G06F 17/00* (2006.01)
*G06F 3/0486* (2013.01)
(Continued)

(52) U.S. Cl.
CPC ...... *G06F 3/0486* (2013.01); *G06F 17/30554* (2013.01); *G06F 17/30958* (2013.01);
(Continued)

(58) Field of Classification Search
CPC .................................................... G06T 11/206
See application file for complete search history.

(56) References Cited

U.S. PATENT DOCUMENTS

| 2004/0181543 A1 | 9/2004 | Wu et al. |
| 2008/0109740 A1 | 5/2008 | Prinsen et al. |

(Continued)

OTHER PUBLICATIONS

SAS® 9.3 Graph Template Language: User's Guide. Cary, NC: SAS Institute Inc. 2011, pp. 1-464.
(Continued)

*Primary Examiner* — Mohammed-Ibrahim Zuberi
(74) *Attorney, Agent, or Firm* — Bell & Manning, LLC

(57) ABSTRACT

A method of rendering an overview axis is provided. A first indicator indicating a first graph element type to present in a canvas panel is received. First sample data is generated to render an instance of the first graph element type in the canvas panel. A second instance of the first graph element type is rendered in an overview axis using the generated first sample data. A second indicator indicating a second graph element type as a basis for presenting the overview axis is received, wherein the second graph element type is a different graph element type from the first graph element type. Second sample data is generated to render an instance of the second graph element type in the overview axis to replace the rendered second instance of the first graph element type.

27 Claims, 44 Drawing Sheets

(51) Int. Cl.
*G06T 11/20* (2006.01)
*G06F 17/30* (2006.01)
*H04L 29/08* (2006.01)
*G06T 11/60* (2006.01)

(52) U.S. Cl.
CPC ............ *G06T 11/206* (2013.01); *G06T 11/60* (2013.01); *H04L 67/02* (2013.01); *G06T 2200/24* (2013.01); *G06T 2200/32* (2013.01); *G06T 2207/20072* (2013.01); *G06T 2211/428* (2013.01)

(56) References Cited

U.S. PATENT DOCUMENTS

| | | | |
|---|---|---|---|
| 2008/0192056 A1 | 8/2008 | Robertson et al. | |
| 2010/0079463 A1* | 4/2010 | Rabin | G06T 11/206 345/440 |
| 2011/0179051 A1 | 7/2011 | Bruckner et al. | |
| 2011/0283231 A1 | 11/2011 | Richstein et al. | |
| 2012/0017165 A1 | 1/2012 | Gardner et al. | |
| 2013/0300743 A1* | 11/2013 | Degrell | G06T 11/206 345/440 |
| 2015/0261725 A1 | 9/2015 | Devarajan et al. | |
| 2015/0261729 A1 | 9/2015 | Davis | |
| 2015/0262394 A1 | 9/2015 | Devarajan et al. | |
| 2015/0262395 A1 | 9/2015 | Devarajan et al. | |
| 2015/0262396 A1 | 9/2015 | Devarajan et al. | |
| 2016/0098176 A1 | 4/2016 | Cervelli et al. | |
| 2016/0180555 A1* | 6/2016 | Matsuo | G06T 11/206 345/440 |

OTHER PUBLICATIONS

SAS® 9.4 ODS Graphics Designer: User's Guide, Second Edition. Cary, NC: SAS Institute Inc. 2013, pp. 1-338.
SAS® Visual Analytics 6.3: User's Guide. Cary, NC: SAS Institute Inc. 2013, pp. 1-634.
SAS© 9.3 ODS Graphics Designer: User's Guide, Cary, NC; SAS Institute Inc. 2011, pp. 13, 158-164, 172, 173, and 187.
SAS© 9.3 ODS Graphics Designer: User's Guide, Cary, NC; SAS Institute Inc. 2011, pp. 6, 17, 26, 39-69, 130-131, 157-164, 169-174, 187.
SAS© 9.3 ODS Graphics Designer: User's Guide, Cary, NC; SAS Institute Inc. 2011, pp. 6, 17, 39, 46-50, 54, 64-69, 130-131. https://www.google.com/finance?g=NASDAQ%3AGOOGL& ei=gNeXV4n9DYmlsgGfg7_oCA, Printed on Aug. 2, 2016.

* cited by examiner

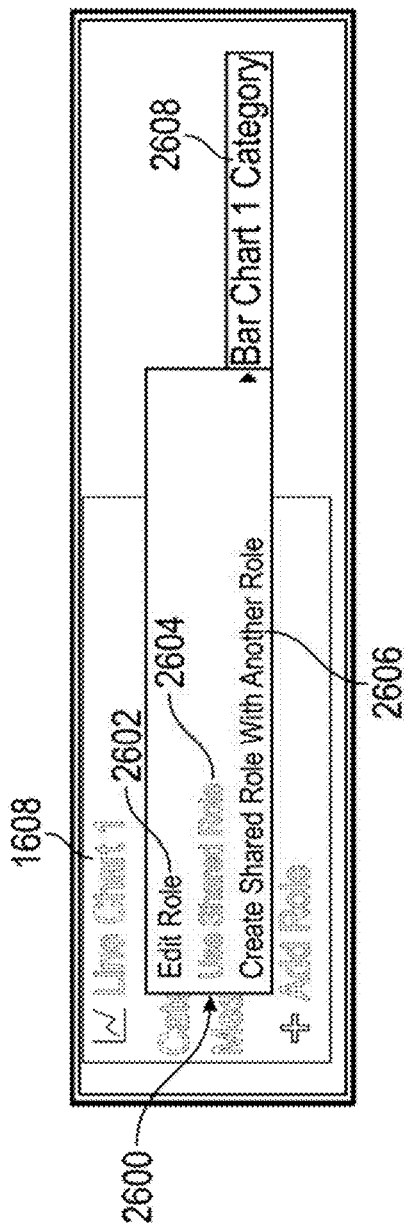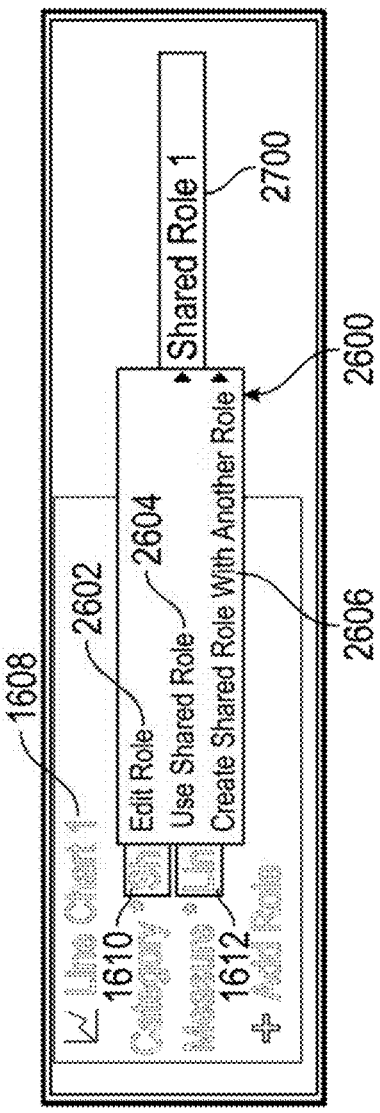
FIG. 26
FIG. 27

OVERVIEW AXIS HAVING A DIFFERENT GRAPH ELEMENT TYPE

CROSS-REFERENCE TO RELATED APPLICATIONS

The present application claims the benefit of 35 U.S.C. §119(e) to U.S. Provisional Patent Application No. 61/951,486, filed on Mar. 11, 2014, and to U.S. Provisional Patent Application No. 62/016,066, filed on Jun. 23, 2014, the entire contents of which are hereby incorporated by reference.

BACKGROUND

Computational processes are widely-used to analyze, understand, integrate, and transform data. Visualization techniques are used to present the data for evaluation and analysis of the data.

SUMMARY

In an example embodiment, a method of rendering an overview axis is provided. A first indicator indicating a first graph element type to present in a canvas panel is received. First sample data is generated to render an instance of the first graph element type. The instance of the first graph element type is rendered in the canvas panel using the generated first sample data. A second instance of the first graph element type is rendered in an overview axis using the generated first sample data. A second indicator is received that indicates a second graph element type as a basis for presenting the overview axis. The second graph element type is a different graph element type from the first graph element type. Second sample data is generated to render an instance of the second graph element type. The instance of the second graph element type is rendered using the generated second sample data in the overview axis to replace the rendered second instance of the first graph element type.

In another example embodiment, a computer-readable medium is provided having stored thereon computer-readable instructions that, when executed by a computing device, cause the computing device to perform the method of rendering an overview axis.

In yet another example embodiment, a computing device is provided. The system includes, but is not limited to, a processor and a computer-readable medium operably coupled to the processor. The computer-readable medium has instructions stored thereon that, when executed by the computing device, cause the computing device to perform the method of rendering an overview axis.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 4-6, 11-34, and 41 illustrate user interface windows presented under control of a graph design application of the graph design device of FIG. 1 in accordance with illustrative embodiments.

DETAILED DESCRIPTION

Figure 1:
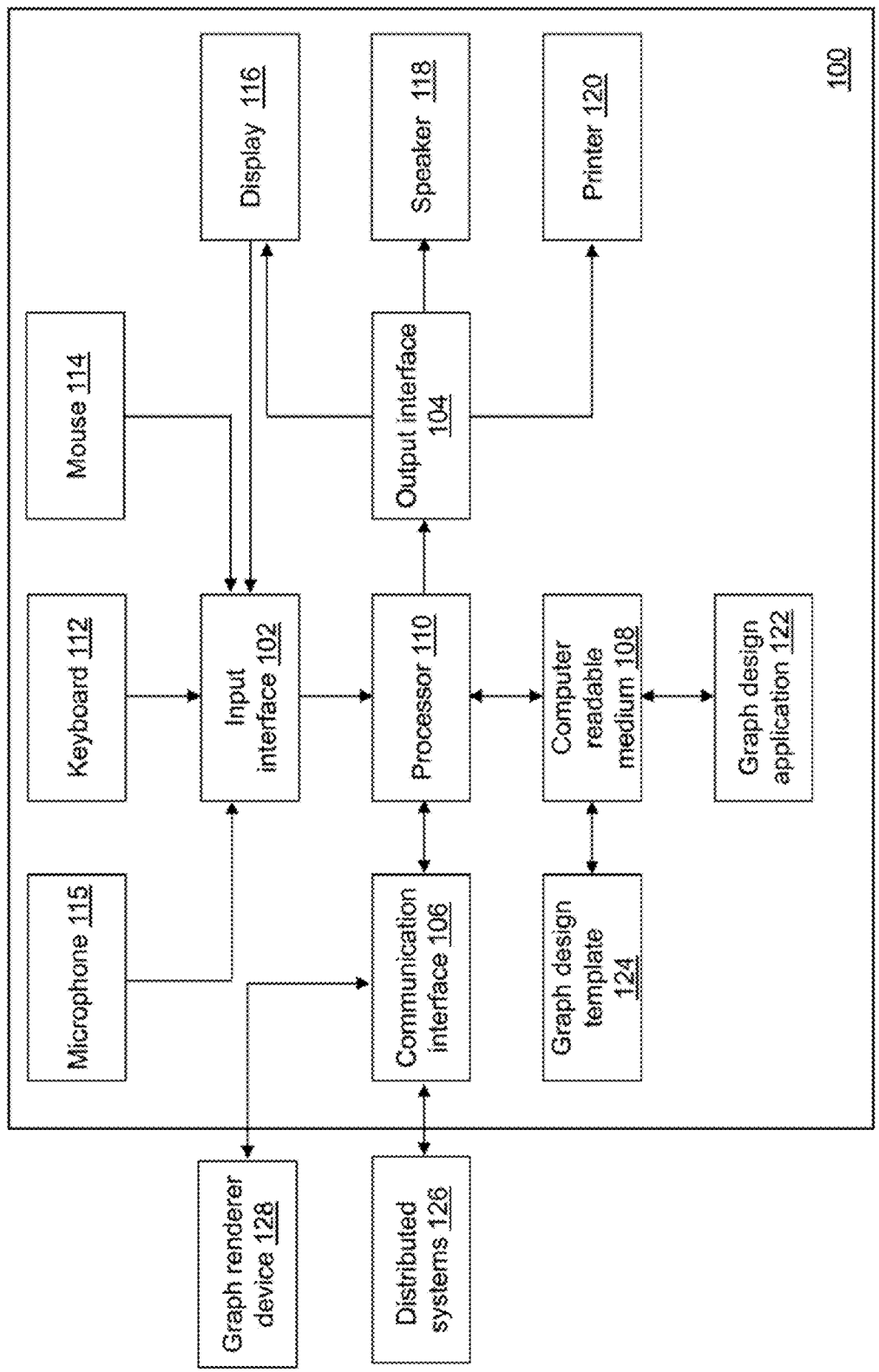
FIG. 1 depicts a block diagram of a graph design device in accordance with an illustrative embodiment.

Referring to FIG. 1, a block diagram of a graph design device 100 is shown in accordance with an illustrative embodiment. Graph design device 100 may include an input interface 102, an output interface 104, a communication interface 106, a computer-readable medium 108, a processor 110, a graph design application 122, and a graph design template 124. Fewer, different, and/or additional components may be incorporated into graph design device 100.

Input interface 102 provides an interface for receiving information from the user for entry into graph design device 100 as understood by those skilled in the art. Input interface 102 may interface with various input technologies including, but not limited to, a keyboard 112, a mouse 114, a microphone 115, a display 116, a track ball, a keypad, one or more buttons, etc. to allow the user to enter information into graph design device 100 or to make selections presented in a user interface displayed on the display. The same interface may support both input interface 102 and output interface 104. For example, display 116 comprising a touch screen provides user input and presents output to the user. Graph design device 100 may have one or more input interfaces that use the same or a different input interface technology. The input interface technology further may be accessible by graph design device 100 through communication interface 106.

Output interface 104 provides an interface for outputting information for review by a user of graph design device 100 and/or for use by another application. For example, output interface 104 may interface with various output technologies including, but not limited to, display 116, a speaker 118, a printer 120, etc. Graph design device 100 may have one or more output interfaces that use the same or a different output interface technology. The output interface technology further may be accessible by graph design device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Graph design device 100 may have one or more communication interfaces that use the same or a different communication interface technology. For example, graph design device 100 may support communication using an Ethernet port, a Bluetooth antenna, a telephone jack, a USB port, etc. Data and messages may be transferred between graph design device 100 and distributed systems 126 and/or a graph renderer device 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Graph design device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Graph design device 100 also may have one or more drives that support the loading of a memory media such as a CD, DVD, an external hard drive, etc. One or more external hard drives further may be connected to graph design device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Graph design device 100 may include a plurality of processors that use the same or a different processing technology.

Graph design application 122 performs operations associated with creating and/or editing graph design template 124 using a graphical user interface presented on display 116. Some or all of the operations described herein may be embodied in graph design application 122. The operations may be implemented using hardware, firmware, software, or any combination of these methods. Referring to the example embodiment of FIG. 1, graph design application 122 is implemented in software (comprised of computer-readable and/or computer-executable instructions) stored in computer-readable medium 108 and accessible by processor 110 for execution of the instructions that embody the operations of graph design application 122. Graph design application 122 may be written using one or more programming languages, assembly languages, scripting languages, etc.

Graph design application 122 may be implemented as a Web application. For example, graph design application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Graph design template 124 may be stored on graph design device 100, on graph renderer device 128, and/or on distributed systems 126. Graph design template 124 captures characteristics of a graph object designed using graph design application 122. The characteristics can be used to render a graph when combined with data selected by a user. The characteristics may be defined using a template language such as the SAS® Graph Template Language developed and provided by SAS Institute Inc. of Cary, N.C. For example, a description of the SAS® Graph Template Language can be found in the SAS® 9.3 Graph Template Language User's Guide published by SAS Institute Inc. of Cary, N.C., the entire contents of which are hereby incorporated by reference.

Figure 2:
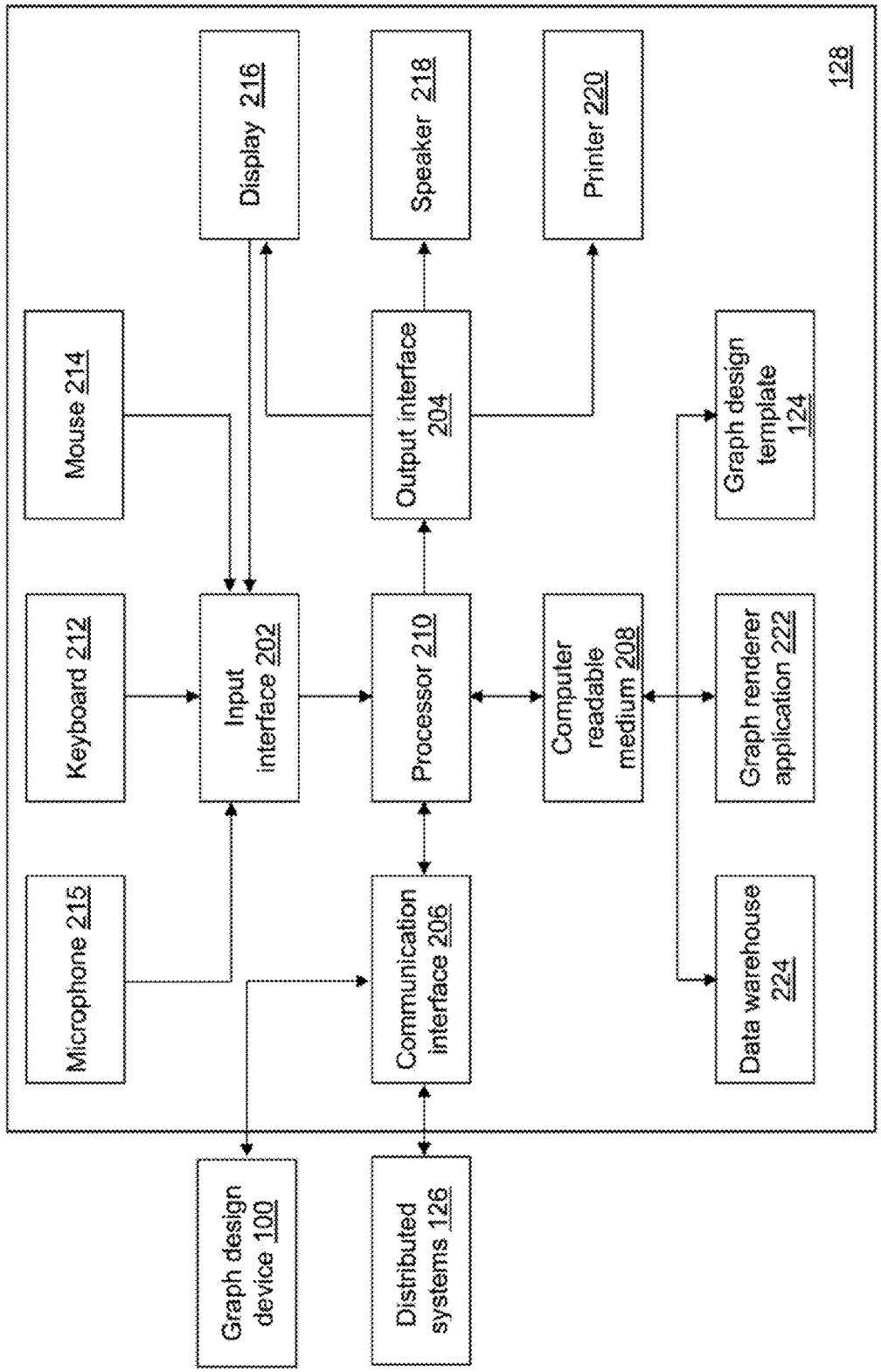
FIG. 2 depicts a block diagram of a graph renderer device in accordance with an illustrative embodiment.

Referring to FIG. 2, a block diagram of graph renderer device 128 is shown in accordance with an example embodiment. Graph renderer device 128 may include a second input interface 202, a second output interface 204, a second communication interface 206, a second computer-readable medium 208, a second processor 210, a graph renderer application 222, a data warehouse 224, and graph design template 124. Fewer, different, and additional components may be incorporated into graph renderer device 128. Graph renderer device 128 and graph design device 100 may be different devices or the same device.

Second input interface 202 provides the same or similar functionality as that described with reference to input interface 102 of graph design device 100 though referring to graph renderer device 128. Second output interface 204 provides the same or similar functionality as that described with reference to output interface 104 of graph design device 100 though referring to graph renderer device 128. Second communication interface 206 provides the same or similar functionality as that described with reference to communication interface 106 of graph design device 100 though referring to graph renderer device 128. Data and messages may be transferred between graph renderer device 128 and distributed systems 126 and/or graph design device 100 using second communication interface 206. Second computer-readable medium 208 provides the same or similar functionality as that described with reference to computer-readable medium 108 of graph design device 100 though referring to graph renderer device 128. Second processor 210 provides the same or similar functionality as that described with reference to processor 110 of graph design device 100 though referring to graph renderer device 128.

Graph renderer application 222 performs operations associated with rendering a graph with selected data using graph design template 124 created by graph design application 122. Some or all of the operations described herein may be embodied in graph renderer application 222. The operations may be implemented using hardware, firmware, software, or any combination of these methods. Referring to the example embodiment of FIG. 2, graph renderer application 222 is implemented in software (comprised of computer-readable and/or computer-executable instructions) stored in second computer-readable medium 208 and accessible by second processor 210 for execution of the instructions that embody the operations of graph renderer application 222. Graph renderer application 222 may be written using one or more programming languages, assembly languages, scripting languages, etc. Graph renderer application 222 may be implemented as a Web application.

Data warehouse 224 may include one or more datasets and one or more graph design templates. Graph design template 124 is an example of the one or more graph design templates. The rows of a dataset of the one or more datasets may be referred to as observations or records and the columns, representing variables, associated with an observation may be referred to as data points for the observation. Of course, in an alternative embodiment, data warehouse 224 may be transposed and may be organized in other manners. Data warehouse 224 may be stored in various compressed formats such as a coordinate format, a compressed sparse column format, a compressed sparse row format, etc.

Data warehouse 224 may be stored on second computer-readable medium 208, on computer-readable medium 108, and/or on one or more of distributed systems 126 and accessed using second communication interface 206. Graph design template 124 may be stored separate from data warehouse 224 or in combination with data warehouse 224 on second computer-readable medium 208, on computer-readable medium 108, and/or on one or more of distributed systems 126 and accessed using second communication interface 206. The data stored in data warehouse 224 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Data warehouse 224 may be stored using various formats as known to those skilled in the art including a file system, a relational database, a system of tables, a structured query language database, etc. For example, data warehouse 224 may be stored in a cube distributed across a grid of computers as understood by a person of skill in the art. As another example, data warehouse 224 may be stored in a multi-node Hadoop® cluster. For instance, Apache™ Hadoop® is an open-source software framework for distributed computing supported by the Apache Software Foundation. As another example, data warehouse 224 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in data warehouse 224.

If data warehouse 224 and/or graph design template 124 are distributed across distributed systems 126, a distributed processing system can be used. For example, referring to FIG. 3, a block diagram of a distributed processing system 300 is shown in accordance with an illustrative embodiment. In an illustrative embodiment, distributed processing system 300 may include a graphic design system 302, a graph renderer system 304, distributed systems 126, a data access control device 305, and a network 301. For illustration, distributed processing system 300 may be implemented using a multi-node Hadoop® cluster, using a grid of computers storing a cube of data, using the SAS® LASR™ Analytic Server, using cloud computing, using another type of SAS server solution, etc., as understood by a person of skill in the art. For example, data access control device 305 coordinates access to data warehouse 224 when distributed across distributed systems 126 when requested by a computing device of graphic design system 302 and/or by a computing device of graph renderer system 304. One or more components of distributed processing system 300 may support multithreading, as understood by a person of skill in the art.

The components of distributed processing system 300 may be located in a single room or adjacent rooms, in a single facility, and/or may be distributed geographically from one another. Each of graphic design system 302, graph renderer system 304, distributed systems 126, and data access control device 305 may be composed of one or more discrete devices.

Network 301 may include one or more networks of the same or different types. Network 301 can be any type of wired and/or wireless public or private network including a cellular network, a local area network, a wide area network such as the Internet, etc. Network 301 further may comprise sub-networks and consist of any number of devices.

Graphic design system 302 can include any number and type of computing devices that may be organized into subnets. Graph design device 100 is an example computing device of graphic design system 302. The computing devices of graphic design system 302 send and receive communications through network 301 to/from another of the one or more computing devices of graphic design system 302, to/from graph renderer system 304, to/from distributed systems 126, and/or to/from data access control device 305. The one or more computing devices of graphic design system 302 may include computers of any form factor such as a smart phone 306, a desktop 308, a laptop 310, a personal digital assistant, an integrated messaging device, a tablet computer, etc. The one or more computing devices of graphic design system 302 may communicate using various transmission media that may be wired and/or wireless as understood by those skilled in the art.

Graph renderer system 304 can include any number and type of computing devices that may be organized into subnets. Graph renderer device 128 is an example computing device of graph renderer system 304. The computing devices of graph renderer system 304 send and receive communications through network 301 to/from another of the one or more computing devices of graph renderer system 304, to/from graphic design system 302, to/from distributed systems 126, and/or to/from data access control device 305. The one or more computing devices of graph renderer system 304 may include computers of any form factor such as a smart phone 312, a desktop 314, a laptop 316, a personal digital assistant, an integrated messaging device, a tablet computer, etc. The one or more computing devices of graph renderer system 304 may communicate using various transmission media that may be wired and/or wireless as understood by those skilled in the art.

Figure 3:
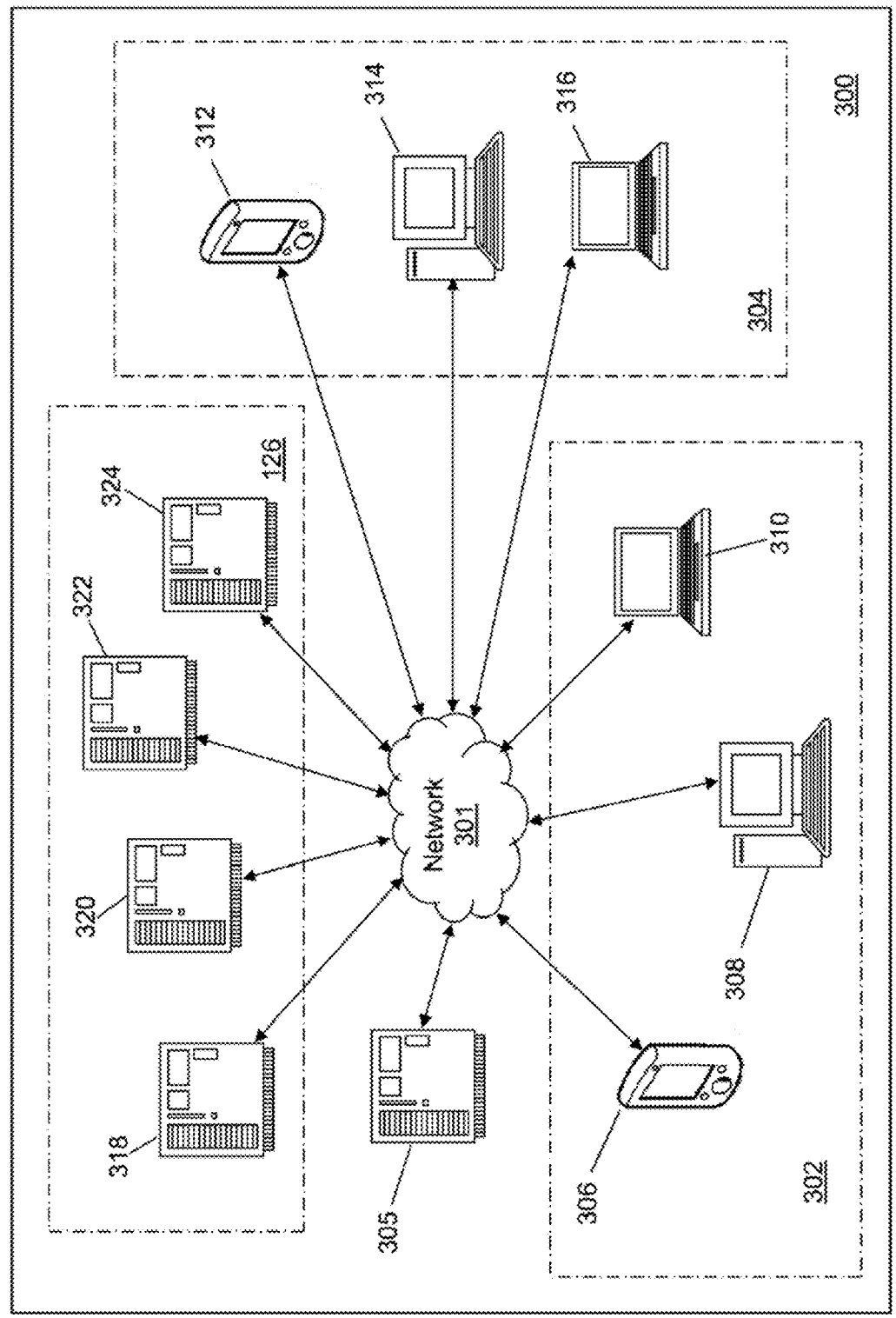
FIG. 3 depicts a block diagram of a distributed processing system in accordance with an illustrative embodiment.

For illustration, FIG. 3 represents distributed systems 126 with a first server computer 318, a second server computer 320, a third server computer 322, and a fourth server computer 324. Distributed systems 126 can include any number and form factor of computing devices that may be organized into subnets. The computing devices of distributed systems 126 send and receive communications through network 301 to/from another of the one or more computing devices of distributed systems 126, to/from graph renderer system 304, to/from graphic design system 302, and/or to/from data access control device 305. The one or more computing devices of distributed systems 126 may communicate using various transmission media that may be wired and/or wireless as understood by those skilled in the art.

For illustration, FIG. 3 represents data access control device 305 as a server computing device though data access control device 305 may include one or more computing devices of any form factor that may be organized into subnets. Data access control device 305 sends and receives communications through network 301 to/from distributed systems 126, to/from graph renderer system 304, and/or to/from graphic design system 302. Data access control device 305 may communicate using various transmission media that may be wired and/or wireless as understood by those skilled in the art. Any number of different users may be accessing graph renderer application 222, graph design application 122, the data stored in data warehouse 224, and/or graph design template 124 at any given time.

Various levels of integration between the components of distributed processing system 300 may be implemented without limitation as understood by a person of skill in the art. For example, graph renderer application 222 and graph design application 122 may be integrated into a single application, may be separately executed applications, or may be part of an integrated, distributed application supporting some or all of the same or additional types of functionality as described herein. As an example, graph renderer application 222 and graph design application 122 may be included in the SAS® Visual Analytics suite of products offered by SAS Institute Inc. of Cary, N.C. For example, the SAS® Visual Analytics Designer developed and provided by SAS Institute Inc. of Cary, N.C. may be used as graph renderer application 222.

Figure 4:
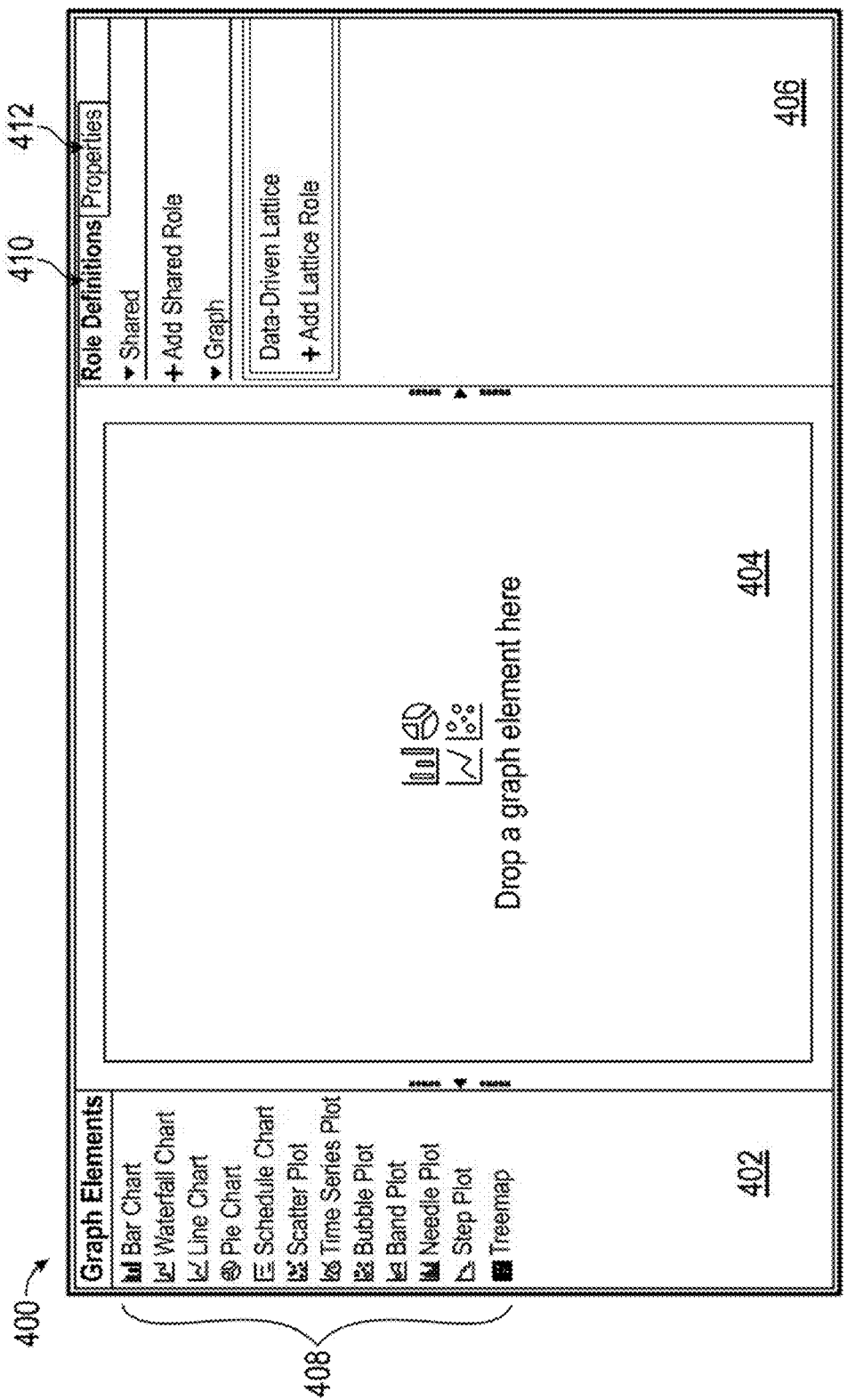

For illustration, graph design application 122 can be started by logging on to distributed processing system 300 at graph design device 100 and selecting a link from a drop down menu, from a user interface window, from an application bar, etc. When graph design application 122 is started, a first user interface window 400 may be presented in display 116 as shown in FIG. 4 in accordance with an illustrative embodiment. After logging in or starting graph design application 122, graph design application 122 may control the presentation of additional user interface windows that may include a plurality of menus and selectors such as drop down menus, buttons, text boxes, hyperlinks, additional windows, etc. As understood by a person of skill in the art, the user interface windows are presented on display 116 under control of the computer-readable and/or computer-executable instructions of graph design application 122. As the user interacts with the user interface windows presented under control of graph design application 122, different user interface windows may be presented to provide the user with various options for creating and editing a graph object. As understood by a person of skill in the art, graph design application 122 receives and processes an indicator associated with an interaction by the user with a user interface window.

First user interface window 400 may include a graph element type panel 402, a canvas panel 404, and a customization panel 406. Graph element type panel 402 may be positioned on a left side of first user interface window 400 and may include a plurality of graph element type selectors 408 that a user can select, drag, and drop onto canvas panel 404 as understood by a person of skill in the art. The plurality of graph element type selectors 408 are the building blocks used to create a custom graph object in canvas panel 404.

Illustrative graph element type selectors include an icon associated with the following graph element types: bar chart, waterfall chart, line chart, pie chart, schedule chart, scatter plot, time series plot, bubble plot, band plot, needle plot, step plot, and treemap. Graph design application 122 may implement a fewer or a greater number of graph element type selectors depending on the embodiment. In some embodiments, a combination of graph types may be employed.

A bar chart, for example, includes vertical bars or horizontal bars. A height or length of each bar represents a value.

A waterfall chart (also known as a progressive bar chart) shows how an initial value of a measure increases or decreases during a series of operations or transactions. The first bar begins at the initial value, and each subsequent bar begins where a previous bar ends. A length and direction of a bar indicate a magnitude and a type (positive or negative, for example) of the operation or transaction. The waterfall chart shows, for example, how incremental changes lead to a final value of a measure.

A line chart displays data, for example, by using a line that connects data values. If multiple measures are assigned to a line chart, separate Y axes can be created for each measure.

A pie chart displays, for example, a part-to-whole relationship in a circle divided into multiple slices for each value of a category data item based on a single measure for each data item. Each slice represents a relative contribution of each part to a whole.

A schedule chart presents time lines by representing tasks, start dates, durations, and end dates in cascading horizontal bar charts.

A scatter plot displays the values of measures using markers. Multiple measures can be shown using different markers.

A time series plot shows, for example, an ordered sequence of values that are observed at equally spaced time intervals. A time series plot uses a date, date-time, time, or hierarchy data item that is continuous on the x-axis.

A bubble plot presents, for example, the values of at least three measures by using differently sized bubbles in a scatter plot. Values of two measures are represented by a position on x-axis and y-axis plot axes, and the value of a third measure is represented by a bubble size.

A band plot presents, for example, a horizontal band with two Y values for each X value. Or, it draws a vertical band with two X values for each Y value. A band plot includes an upper and a lower band boundary (two X or Y values) that can be filled to create two outlines.

A needle plot, for example, is a plot in which data points are connected by a vertical line that connects to a horizontal baseline. The baseline intersects a zero value or a minimum value on a vertical axis.

A step plot, for example, includes a series of horizontal and vertical line segments that connect observations of data.

A treemap displays, for example, a hierarchy or a category as a set of rectangular tiles. Each tile represents a category value or a hierarchy node. A size of each tile represents either a frequency count or a value of a measure.

Canvas panel 404 defines an area of first user interface window 400 within which a graph object is created and edited. Canvas panel 404 may be divided into one or more cells automatically as the user interacts with canvas panel 404. Canvas panel 404 may be positioned in a center of first user interface window 400 between graph element type panel 402 and customization panel 406. Graph elements can be combined and arranged in canvas panel 404 by dragging and dropping a graph element type selector selected from graph element type selectors 408 into a cell location of the one or more cells of canvas panel 404. One or more graph elements can be layered in each cell location of canvas panel 404. The graph object can include the one or more cells with zero or more graph elements overlaid in each cell. Initially, canvas panel 404 may include a single cell.

Customization panel 406 may be positioned on a right side of first user interface window 400 and may include a role tab 410 and a properties tab 412. Role tab 410 includes various selectors and data entry boxes used to define data roles based on an item selected in canvas panel 404. For example, items included in role tab 410 support a creation of new shared roles, a modification of names of existing roles, addition of new roles, etc. When the graph element type selector selected from graph element type selectors 408 is dropped onto canvas panel 404, a graph element instance is created in canvas panel 404 and roles for the graph element instance are created automatically with default names on role tab 410. Different names can be defined for the roles by editing the default names.

Properties tab 412 includes various selectors and data entry boxes used to define visual properties of graph elements based on the item selected in canvas panel 404. For example, to change the properties of a graph element instance such as a bar chart, one of the bars of the bar chart is selected; to change the properties of an axis, any part of the x-axis or y-axis is selected; to change the properties of a legend, any part of the legend is selected; to select the properties of an entire graph element or a cell, an area above the graph element or cell area is selected; etc. Graph element properties determine features that affect an appearance of the graph element instance in the graph object. In general, colors, marker symbols, line attributes, outline colors, fill colors, etc. can be defined.

Figure 5:
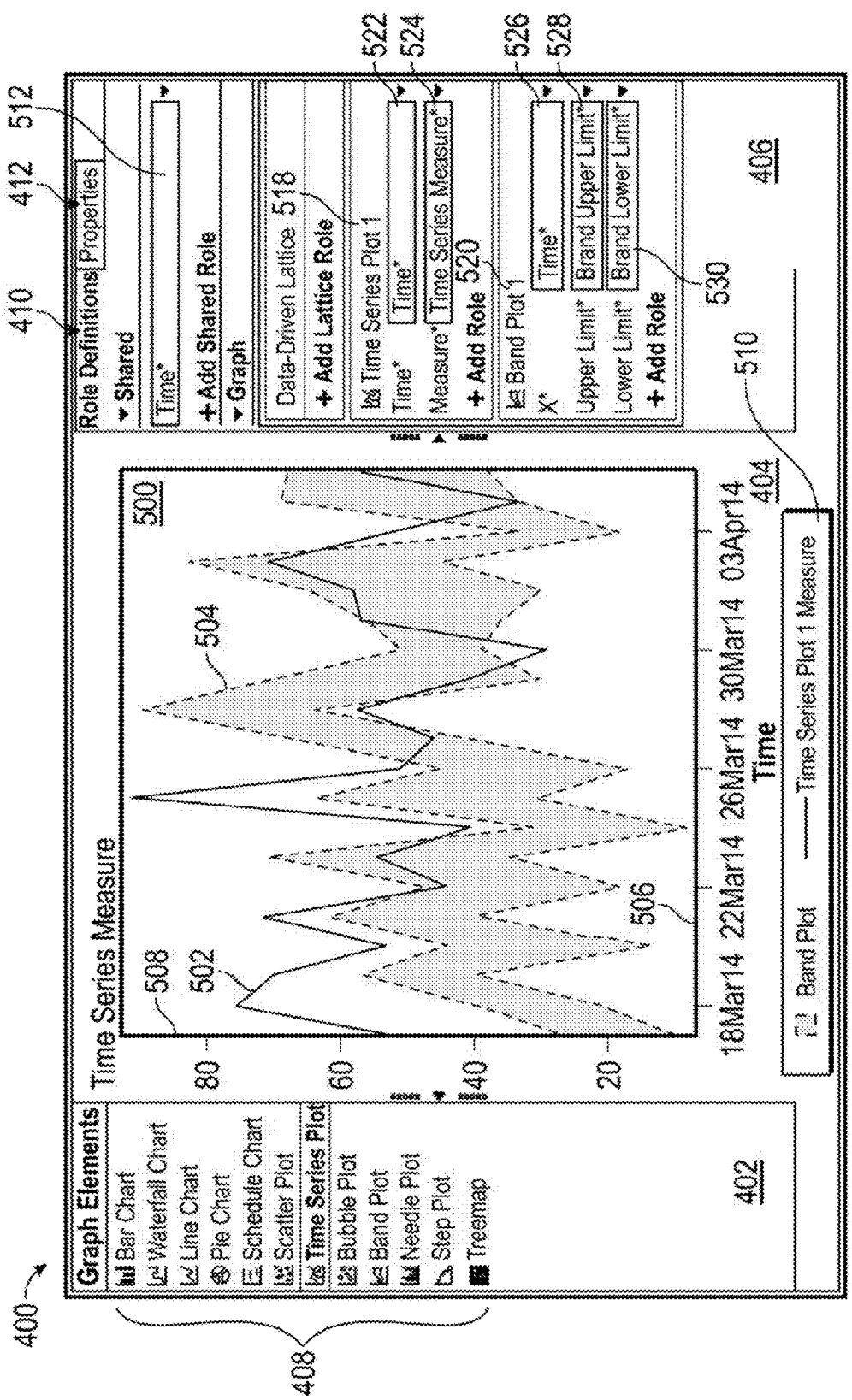

Referring to FIG. 5, a stock plot template graph 500 is presented in canvas panel 404 in accordance with an illustrative embodiment. In FIG. 5, stock plot template graph 500 is a single-cell graph object with two graph element instances, a time-series plot and a band plot, overlaid. A cell is a distinct rectangular area within a graph object that can contain zero or more graph element instances, axes, legends, etc. Multiple cells may be arranged as a grid of columns and rows. A graph element visually represents data. Axis collectively refers to an axis line, major tick marks, tick values, and an axis label. Tick values are the value indicators shown along an axis line to periodically label a range of values in a set of observations that is being plotted/charted. In multi-cell graph objects, the columns and/or rows of cells can share axes if the cells have the same data type as discussed further below. Legend collectively refers to a legend border, one or more legend entries (where each entry has a symbol and a corresponding label), and/or a legend title.

In the illustrative embodiment, stock plot template graph 500 includes a first overlay graph element 502, a second overlay graph element 504, an x-axis 506, a y-axis 508, and a legend 510. For example, first overlay graph element 502 is a time-series plot created by selecting a time-series plot selector from the plurality of graph element type selectors 408 and dragging and dropping the time-series plot selector onto canvas panel 404. Second overlay graph element 504 is a band plot created by selecting a band plot selector from the plurality of graph element type selectors 408 and dragging and dropping the band plot selector onto canvas panel 404. Second overlay graph element 504 is overlaid on top of first overlay graph element 502 though the order can be changed as discussed further below. As understood by a person of skill in the art, some graph element types do not include both x-axis 506 and y-axis 508. For example, a pie chart graph element type does not include an x-axis or a y-axis.

Classification is a term used to describe a format given to data to define its function in a graph. Each classification renders tick values on the axis in a distinct way. For example, classification specifies whether the data item is a category, a measure, a date-time, or any. Numeric data can be classified as measure. Graph axes that can use any of the data classifications can be classified as "any".

Table I defines possible classifications (data types) for each graph element type that includes an x-axis and a y-axis. The tree map graph element type and the pie chart graph element type do not include an x-axis and a y-axis and are not listed. A classification is assigned by default when the graph element type is dropped into canvas panel 404 and is the classification listed first in each column.

TABLE I

| Graph element type | X-Axis classification | Y-Axis classification |
| --- | --- | --- |
| Vertical Bar Chart | Category, Date-time | Measure |
| Horizontal Bar Chart | Measure | Category, Date-time |
| Waterfall Chart | Category, Date-time | Measure |
| Line Chart | Category, Date-time | Measure |
| Schedule | (Start and End) Date-time, Measure | Category, Date-time |
| Scatter Plot | Any, Category, Date-time, Measure | Any, Category, Date-time, Measure |
| Time series Plot | Date-time | Measure |
| Bubble Plot | Any, Category, Date-time, Measure | Any, Category, Date-time, Measure |
| Band Plot | Any, Category, Date-time, Measure | (Upper and Lower Limits) Any, Category, Date-time, Measure |
| Needle Plot | Any, Category, Date-time, Measure | Measure |
| Step Plot | Any, Category, Date-time, Measure | Measure |

Role refers to a receptacle for a data assignment that contributes to how a graph element is rendered. For example, for a bar chart to be rendered, the bar chart receives a categorical data assignment and a measure (numeric) data assignment resulting in two roles, a category role and a measure role. When a graph contains a plurality of graph elements, some data roles between the plurality of graph elements can be shared. Data roles are shared to use the same data role for at least one of the axes. A role can be associated with a column of data in a dataset stored in data warehouse 224 when the graph is rendered. A single data column can be assigned to roles that use a shared role.

Roles can be modified using role tab 410. For example, based on stock plot template graph 500, role tab 410 includes a shared role identification selector 512, a time series plot designator 518, and a band plot designator 520. An x-axis selector 522 and a y-axis selector 524 are associated with time series plot designator 518 and define two roles for first overlay graph element 502. An x-axis selector 526, an upper band selector 528, and a lower band selector 530 are associated with band plot designator 520 and define three roles for second overlay graph element 504.

Overlaid graph elements may be automatically assigned a shared role on certain axes. For example, when second overlay graph element 504 is overlaid on first overlay graph element 502 by dragging and dropping the band plot graph selector into the cell containing first overlay graph element 502, a shared role may be created automatically for a time axis of first overlay graph element 502 and of second overlay graph element 504. Shared role identification selector 512 indicates "Time". X-axis selector 522 of time series plot designator 518 and x-axis selector 526 of band plot designator 520 also both indicate "Time" as the shared axis.

By default, the automatically created shared axis may be named "shared role 1" in shared role identification selector 512, in x-axis selector 522 of time series plot designator 518, and in x-axis selector 526 of band plot designator 520. The default value may be changed to "Time" by the user to provide additional description regarding the data to associate with the role when a graph is rendered.

Similarly, by default, y-axis selector 524 of time series plot designator 518 may be named "role 1" though the default value may be changed to "Time Series Measure" by the user to provide additional description regarding the data to associate with the role. Further, by default, upper band selector 528 and lower band selector 530 of band plot designator 520 may be named "role 2" and "role 3" though the default value may be changed to "Band Upper Limit" and "Band Lower Limit", respectively, by the user to provide additional description regarding the data to associate with the role.

The types of axis properties presented in properties tab 412 vary depending on the type of axis selected in canvas panel 404. Possible types of axes include discrete, linear, log, and date-time. A discrete axis includes independent data values rather than a range of numeric values. Each distinct value is represented by a tick mark. Discrete is a default axis type for character or category data. For example, bar charts use a discrete axis for the category role. A linear axis includes a linear range of numeric values. Linear is a default axis type for numeric data. For example, line charts use a linear axis for a measure role. A date-time axis includes a range of date, time, or date-time values. Axis properties that can be changed include: reverse an axis order; show or hide axis elements, such as an axis line, tick marks, and grid lines; change an appearance of tick marks, tick values, axis labels, and grid lines; merge two or more column axes or two or more row axes; specify lowest and highest axis range tick offsets; specify an alternate axis for a graph element; etc.

Figure 6:
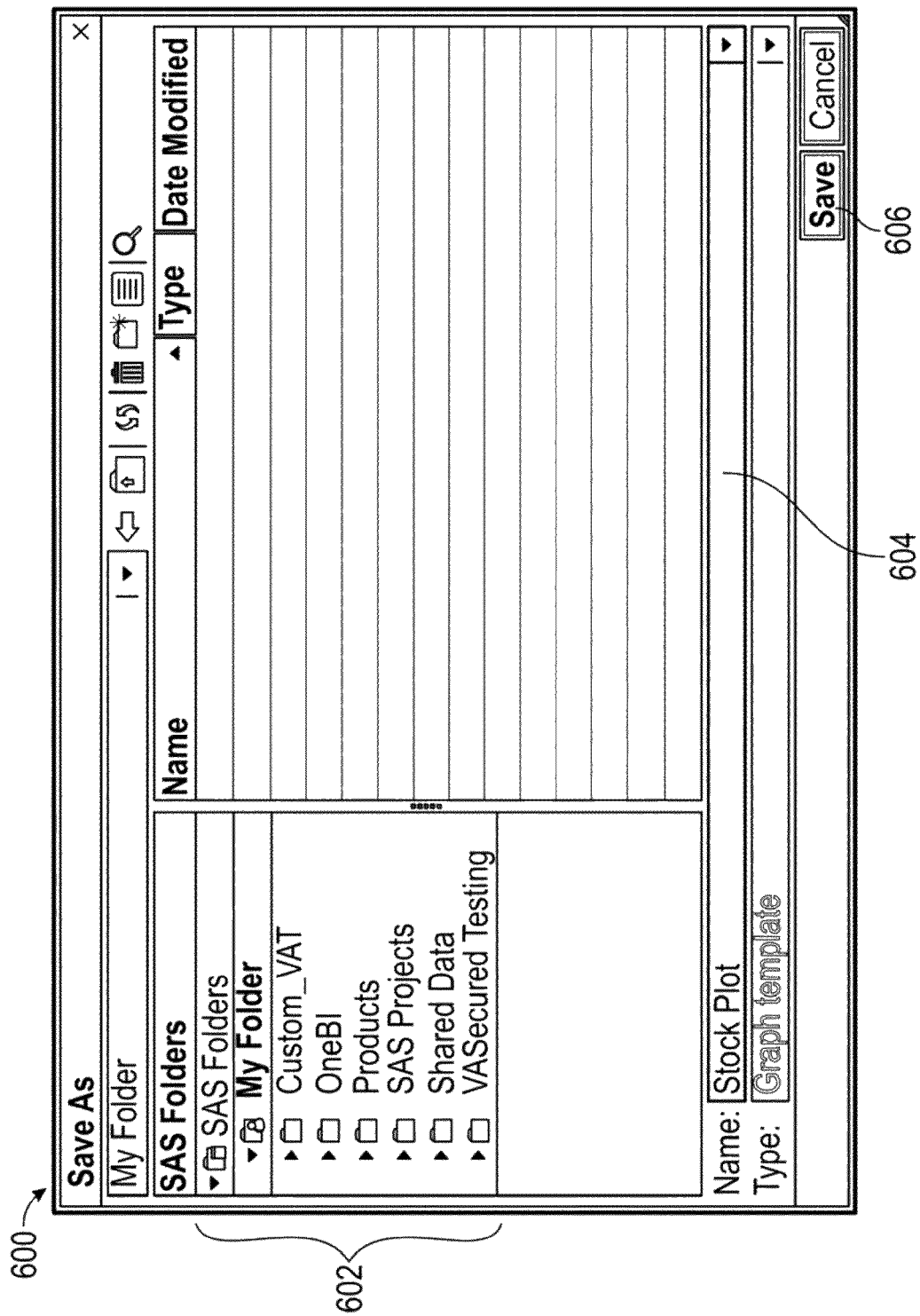

Referring to FIG. 6, a save user interface window 600 is shown in accordance with an illustrative embodiment. Save user interface window 600 may be created after a user selection from a menu bar (not shown) to save the graph object created in canvas panel 404 in graph design template 124. As understood by a person of skill in the art, save user interface window 600 allows a user to select a location to which to store graph design template 124 and a name for graph design template 124. Of course, any number of graph design templates may be created and stored. For example, save user interface window 600 includes a folder tree 602, a name box 604, and a save button 606. Selection of save button 606 stores graph design template 124 that describes stock plot template graph 500 at the selected folder location and with the specified name such as "Stock Plot". Graph design template 124 includes information needed to instruct graph renderer application 222 how to render stock plot template graph 500 except for the actual data selected from data warehouse 224. Graph design template 124 may be stored using a graph template markup language such as the extensible markup language developed to support the SAS® Graph Template Language. Shared roles may be defined using dynamic variables (dynvars) as defined by the SAS® Graph Template Language.

For example, below is an example of a graph template markup language for stock plot template graph 500 illustrated in FIG. 5:

```
<StatGraph attrPriority="COLOR" opaque="false" border="false"
missingValueDisplay="AUTOLABEL" includeMissingDiscrete="true">
    <Meta>
        <DynVars>
            <DynVar name="SHARED_DYNVAR_0" required="true" type="TIME"
                description="Shared Role 1" multiplesAllowed="false">
                <DefaultValues/>
            </DynVar>
            <DynVar name="DYNVAR_1" required="true" type="NUMERIC"
                description="Band Plot 1 Upper Limit" multiplesAllowed="false">
                <DefaultValues/>
            </DynVar>
            <DynVar name="DYNVAR_2" required="true" type="NUMERIC"
                description="Band Plot 1 Lower Limit" multiplesAllowed="false">
                <DefaultValues/>
            </DynVar>
            <DynVar name="DYNVAR_4" required="true" type="NUMERIC"
                description="Time Series Plot 1 Measure" multiplesAllowed="false">
                <DefaultValues/>
            </DynVar>
        </DynVars>
    </Meta>
    <LayoutGlobalLegend legendTitlePosition="TOP">
        <AutoLegend>
            <GraphNames>
                <Value>BandPlot_0</Value>
                <Value>TimeSeriesPlot_0</Value>
            </GraphNames>
        </AutoLegend>
    </LayoutGlobalLegend>
    <LayoutDataMatrix cellWidthMin="1" cellHeightMin="1">
    <LayoutPrototypeOverlay2D cycleAttrs="true">
        <YAxisOpts gridDisplay="OFF">         <DiscreteOpts
            tickValueFitPolicy="THIN" sortOrder="DATA"/>
            <LinearOpts>
                <TickValueFormatOpts extractScale="true"/>
            </LinearOpts>
        </YAxisOpts>
        <XAxisOpts gridDisplay="OFF" name="categoryAxis">         <DiscreteOpts
            tickValueFitPolicy="STAGGERTRUNCATEDROP" sortOrder="DATA"/>
            <LinearOpts>
                <TickValueFormatOpts extractScale="true"/>
            </LinearOpts>
```

```
    </XAxisOpts>
    <BandPlot justify="LEFT" display="FILL" legendLabel="Band Plot "
        limitUpper="DYNVAR_1" _stmt="bandplot" tipListPolicy="APPEND"
        limitLower="DYNVAR_2" name="BandPlot_0" x="SHARED_DYNVAR_0"
        connectOrder="AXIS"/>
    <TimeSeriesPlot tipListPolicy="APPEND" responseVars="DYNVAR_4"
        _stmt="timeseriesplot" baselineIntercept="AUTO"
        time="SHARED_DYNVAR_0" name="TimeSeriesPlot_0"
        fadeType="AUTO"/>
    <Y2AxisOpts gridDisplay="OFF">       <DiscreteOpts
        tickValueFitPolicy="THIN" sortOrder="DATA"/>
        <LinearOpts>
            <TickValueFormatOpts extractScale="true"/>
        </LinearOpts>
    </Y2AxisOpts>
  </LayoutPrototypeOverlay2D>   </LayoutDataMatrix>
</StatGraph>
```

Figure 7:
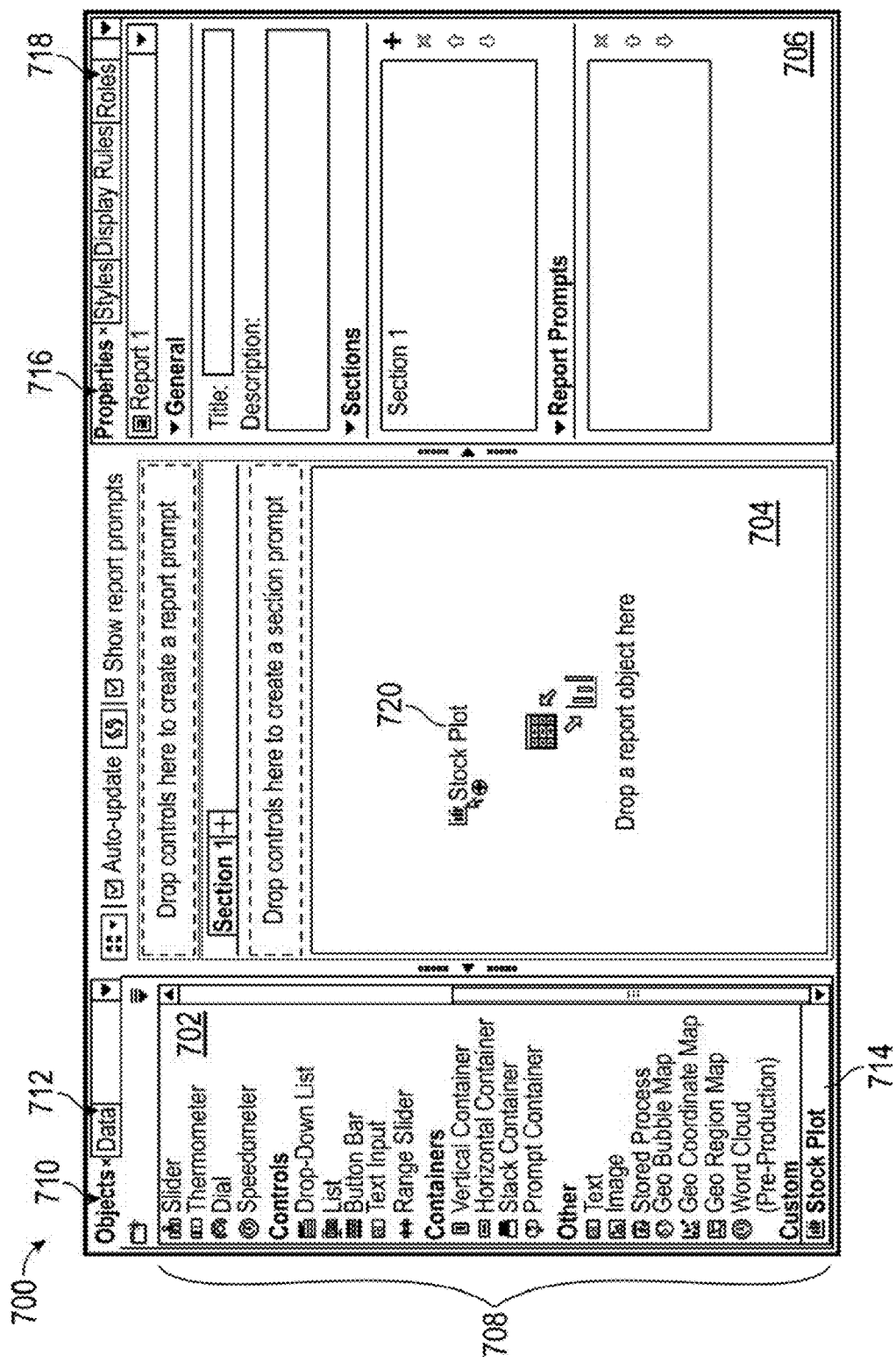
FIGS. 7-10 and 42-45 illustrate user interface windows presented under control of a graph renderer application of the graph renderer device of FIG. 2 in accordance with illustrative embodiments.

Referring to FIG. 7, a second user interface window 700 is shown in accordance with an illustrative embodiment. For example, when graphic renderer application 222 is started, second user interface window 700 is presented in second display 216. Second user interface window 700 may include an object type panel 702, a second canvas panel 704, and a second customization panel 706. Object type panel 702 may be positioned on a left side of second user interface window 700. Second canvas panel 704 defines an area of second user interface window 700 within which a graph is created and edited and included in a report. Second canvas panel 704 may be positioned in a center of second user interface window 700 between object type panel 702 and second customization panel 706. Second customization panel 706 may be positioned on a right side of second user interface window 700 and may include a second properties tab 716 and a roles tab 718. Second properties tab 716 includes various selectors and data entry boxes used to define visual properties of objects in a report, including graph objects, based on the item selected in second canvas panel 704. Roles tab 718 includes various selectors and data entry boxes used to define data roles based on an item selected in second canvas panel 704.

Object type panel 702 may include an object type tab 710 and a data tab 712. Object type tab 710 may include a plurality of object type selectors 708 that a user can select and drag and drop onto second canvas panel 704 as understood by a person of skill in the art. The plurality of graph object type selectors 708 are the building blocks used to create a custom report that may include a custom graph in second canvas panel 704. The plurality of graph object type selectors 708 include various containers and control objects for building the report in addition to graph objects. Graph objects can be combined and arranged in second canvas panel 704 by dragging and dropping a graph object type selector selected from the plurality of object type selectors 708 into a cell location of second canvas panel 704. Initially, second canvas panel 704 includes a single cell though similar to canvas panel 404, second canvas panel 704 can include one or more cells.

The plurality of object type selectors 708 include one or more custom graph object type selectors including a stock plot selector 714 associated with the design template saved using save user interface window 600 ("Stock Plot"). The "Stock Plot" design template stored in graph design template 124 may be listed in the plurality of object type selectors 708 automatically. One or more design templates may be stored together or separately. A user may locate the one or more design templates in a variety of manners, such as by browsing, by searching, etc., as understood by a person of skill in the art.

Figure 8:
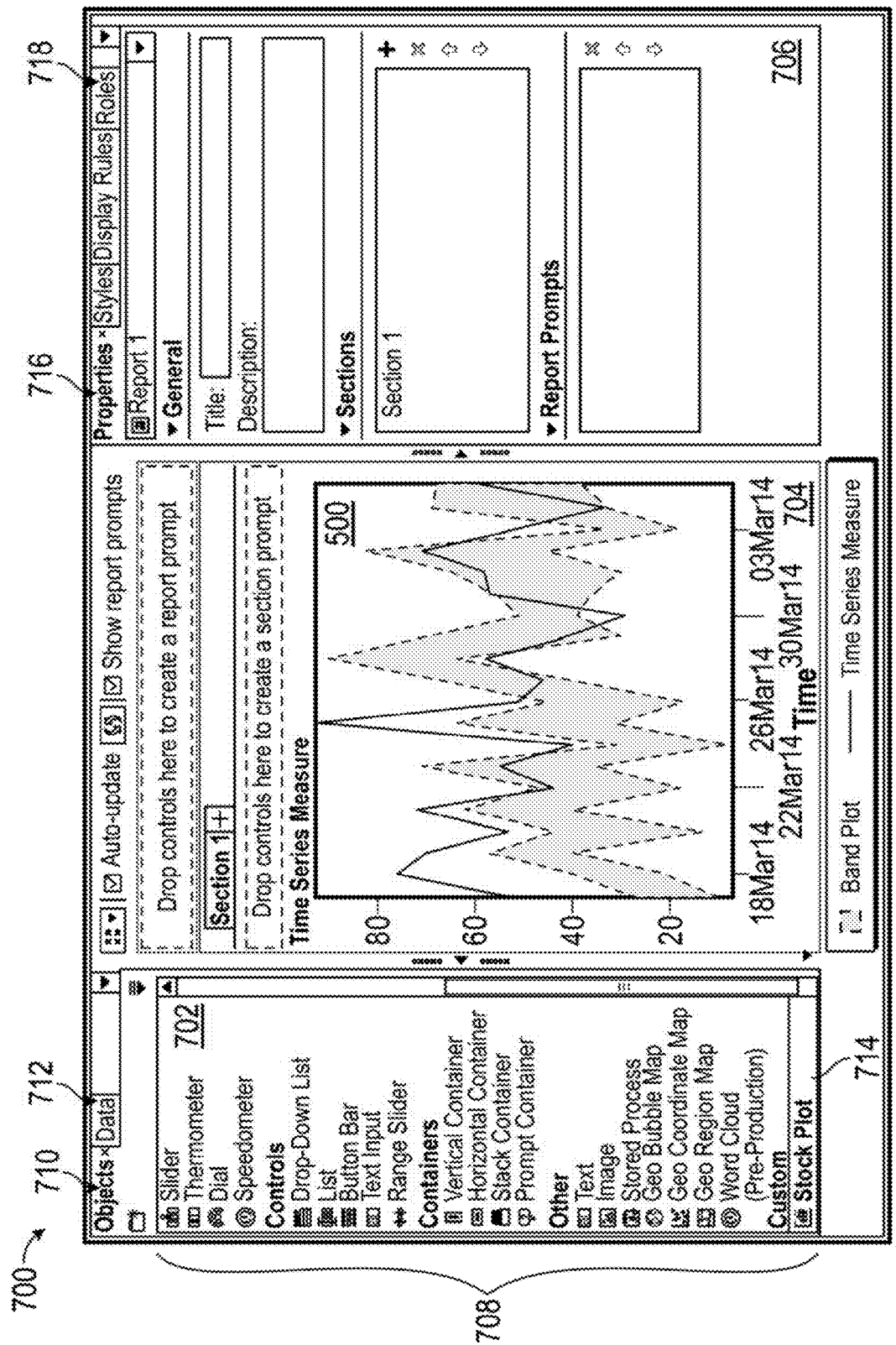

A stock plot indicator 720 indicates that stock plot selector 714 has been selected and dragged into second canvas panel 704 and can be dropped into second canvas panel 704. Referring to FIG. 8, dropping stock plot selector 714 into second canvas panel 704 triggers creation of stock plot template graph 500 in second canvas panel 704.

Figure 9:
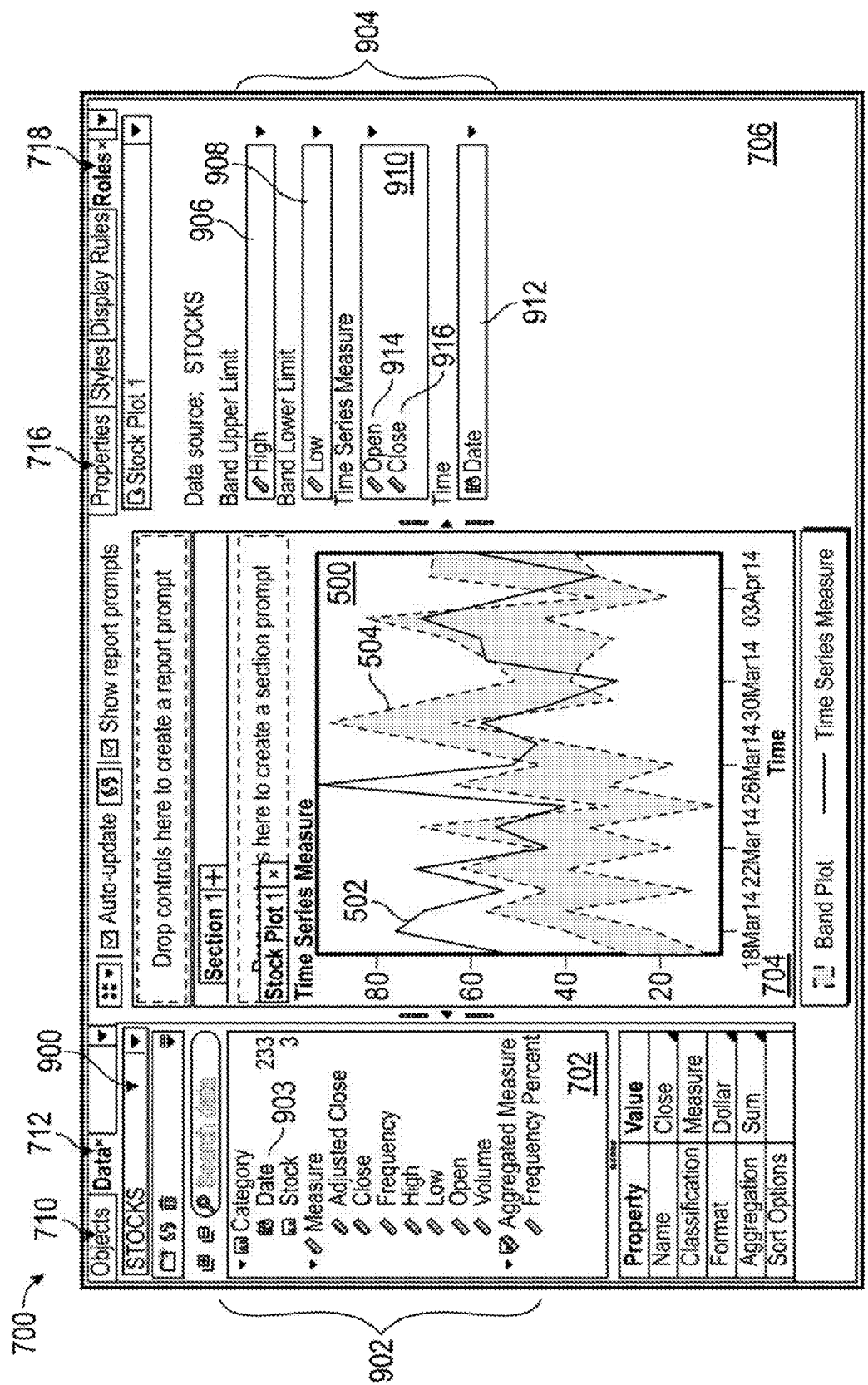

Referring to FIG. 9, data tab 712 may include a dataset selector 900. A user may select the dataset, for example, by scrolling to a dataset name of the one or more datasets stored in data warehouse 224. After selection of the dataset using data selector 900, one or more data type indicators 902 indicate columns of data in the selected dataset that have been associated with an indicator of a data type, such as category, measure, date-time. For example, the "STOCKS" dataset indicated by data selector 900 includes a "Date" data column, a "Stock" data column, an "Adjusted Close" data column, a "Close" data column, a "Frequency" data column, a "High" data column, a "Low" data column, an "Open" data column, a "Volume" data column, and a "Frequency Percent" data column.

In the illustrative embodiment of FIG. 9, there is not a separate indicator for a date-time classification for the date data column because the classification of the data types is hierarchical. Each data type may be either a "Category" classification or a "Measure" classification. "Date-time" may be a sub-type within the "Category" classification, such that any graph role that uses a category could accept a date-time column, though some graph roles may more specifically accept a date-time value. The date-time nature of a column may be indicated by an icon such as clock icon 903 associated with the "date" column.

Roles tab 718 may include a plurality of role selectors 904 defined based on stock plot template graph 500. Columns of data are assigned to roles in roles tab 718. For example, the plurality of role selectors 904 for stock plot template graph 500 may include a first selector 906, a second selector 908, a third selector 910, and a fourth selector 912. First selector 906 may be associated with the "Band Upper Limit" role defined in first interface window 400 using upper band selector 528. Second selector 908 may be associated with the "Band Lower Limit" role defined in first interface window 400 using lower band selector 530. Third selector 910 may be associated with the "Time Series Measure" role defined in first interface window 400 using y-axis selector 524. Fourth selector 912 may be associated with the "Time" role defined in first interface window 400 using x-axis selector 522.

In the illustrative embodiment of FIG. 9, the "High" data column is selected as the data used to render the "Band Upper Limit" role of second overlay graph element 504. The "Low" data column is selected as the data used to render the "Band Lower Limit" role of second overlay graph element 504. The "Date" data column is selected as the data used to render the shared "Time" role of first overlay graph element 502 and second overlay graph element 504. Two data columns, the "Open" data column as indicated by first indicator 914 and the "Close" data column as indicated by second indicator 916 are selected as the data used to render the "Time Series Measure" role of first overlay graph element 502. Selection of the two data columns results in two measure curves.

Figure 10:
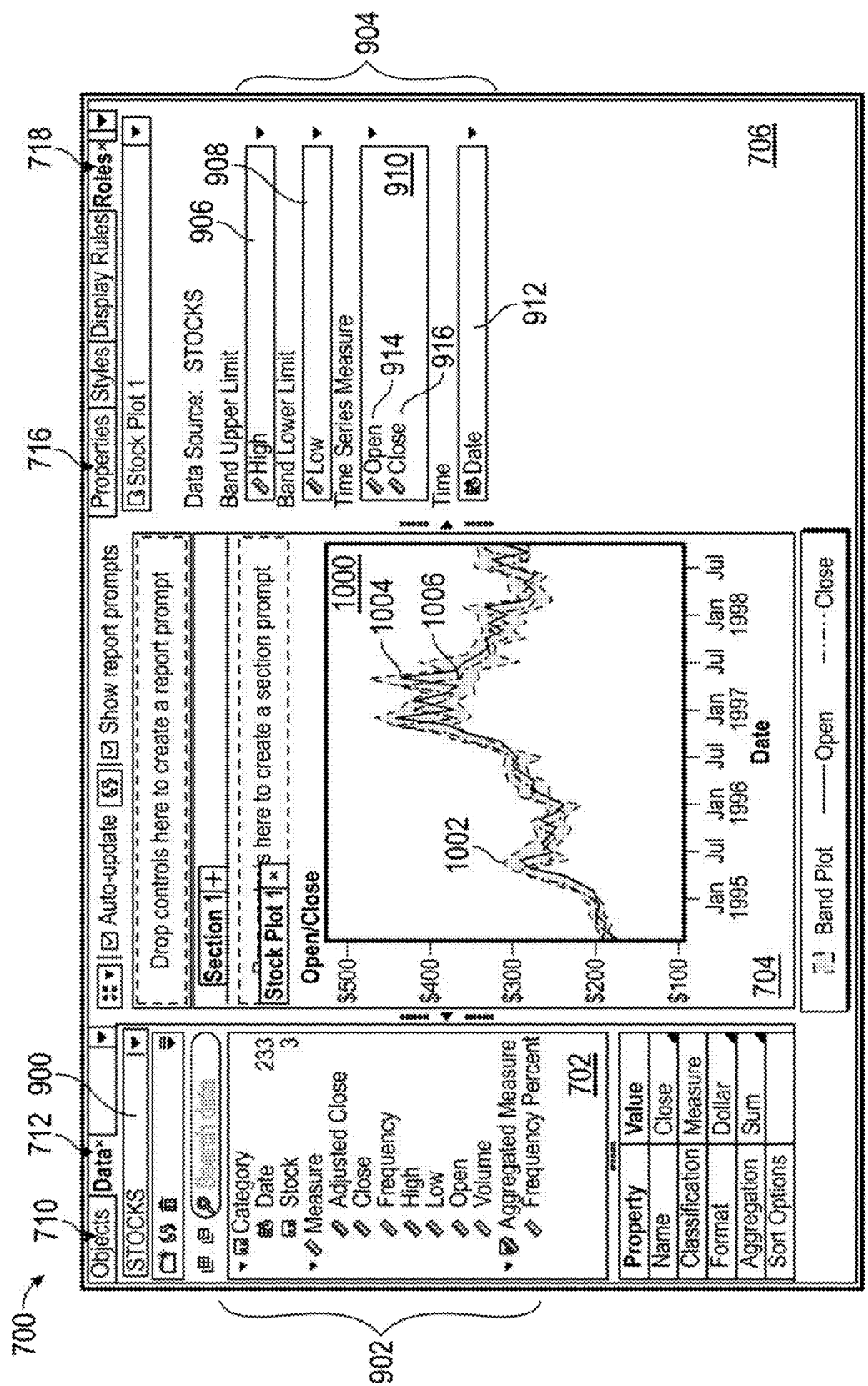

Referring to FIG. 10, second canvas panel 704 includes a stock plot graph 1000 rendered with the selected "STOCKS" dataset using the data columns assigned to the roles as indicated in second customization panel 706. Instead of being rendered using sample data generated by graph design application 122 and graph renderer application 222 as shown in FIGS. 5, 8, and 9, stock plot graph 1000 represents data generated external to graph design application 122 and graph renderer application 222. Stock plot graph 1000 includes a band plot 1002, an opening value curve 1004, and a closing value curve 1006. A different graph having the same style can be generated by selecting a different dataset from data warehouse 224 or by selecting a different column of data from the selected dataset for any role. Stock plot graph 1000 can be further customized using properties included in second properties tab 716. Stock plot graph 1000 can be stored for viewing later, for inclusion in a report, etc. as understood by a person of skill in the art.

Figure 11:
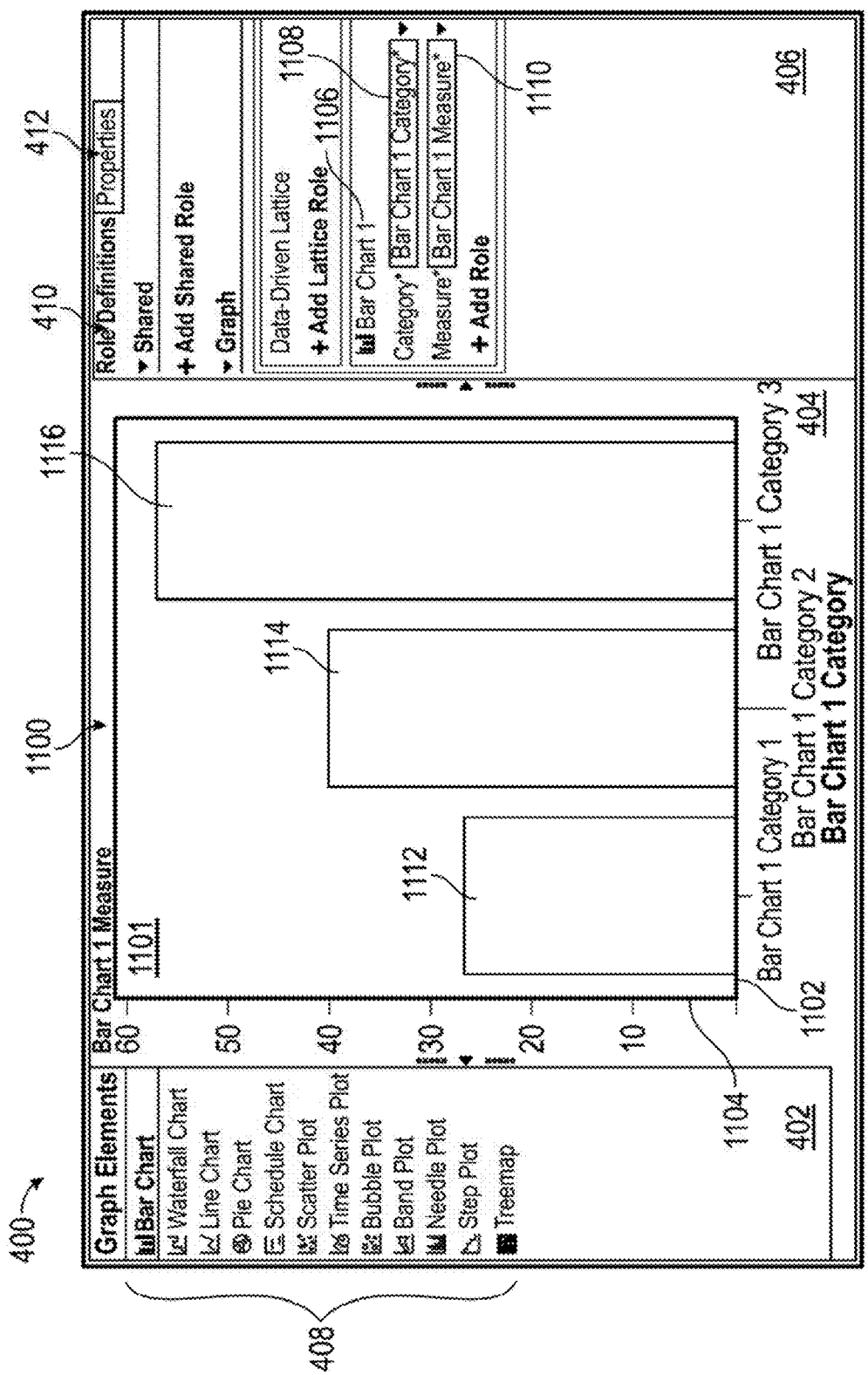

Referring to FIG. 11, first user interface window 400 including a template graph 1100 presented in canvas panel 404 is shown in accordance with an illustrative embodiment. In FIG. 11, template graph 1100 includes a first cell graph 1101, which includes a bar chart. First cell graph 1101 is created by selecting a bar chart graph element selector from the plurality of graph element type selectors 408 and dragging and dropping the bar chart graph element selector onto canvas panel 404. First cell graph 1101 includes an x-axis 1102 and a y-axis 1104. The two roles associated with the bar chart by default are category that is associated with x-axis 1102 and measure that is associated with y-axis 1104 as shown in Table I. By default, x-axis 1102 is labeled "Bar Chart 1 Category" because it is the first bar chart added to template graph 1100, and the x-axis is a category variable. By default, y-axis 1104 is labeled "Bar Chart 1 Measure" because the y-axis is a measure variable. Role tab 410 by default includes a bar chart designator 1106 named "Bar Chart 1 ", a category selector 1108, and a measure selector 1110. By default, category selector 1108 is labeled "Bar Chart 1 Category" because the x-axis is the category variable. By default, measure selector 1110 is labeled "Bar Chart 1 Measure" because the y-axis is the measure variable.

The bar chart is rendered with sample data determined as discussed further below. For example, the sample data is created with two columns and three rows of sample data as illustrated in Table II to define a first bar 1112, a second bar 1114, and a third bar 1116:

TABLE II

| Data point Number | x-axis | y-axis |
| --- | --- | --- |
| 1 | Bar Chart 1 Category 1 | 27 |
| 2 | Bar Chart 1 Category 2 | 40 |
| 3 | Bar Chart 1 Category 3 | 57 |

The x-axis column values were created by appending a unique point number to the label "Bar Chart 1 Category", and the y-axis values are created by randomly drawing values within a predefined range of values as discussed further below.

Figure 12:
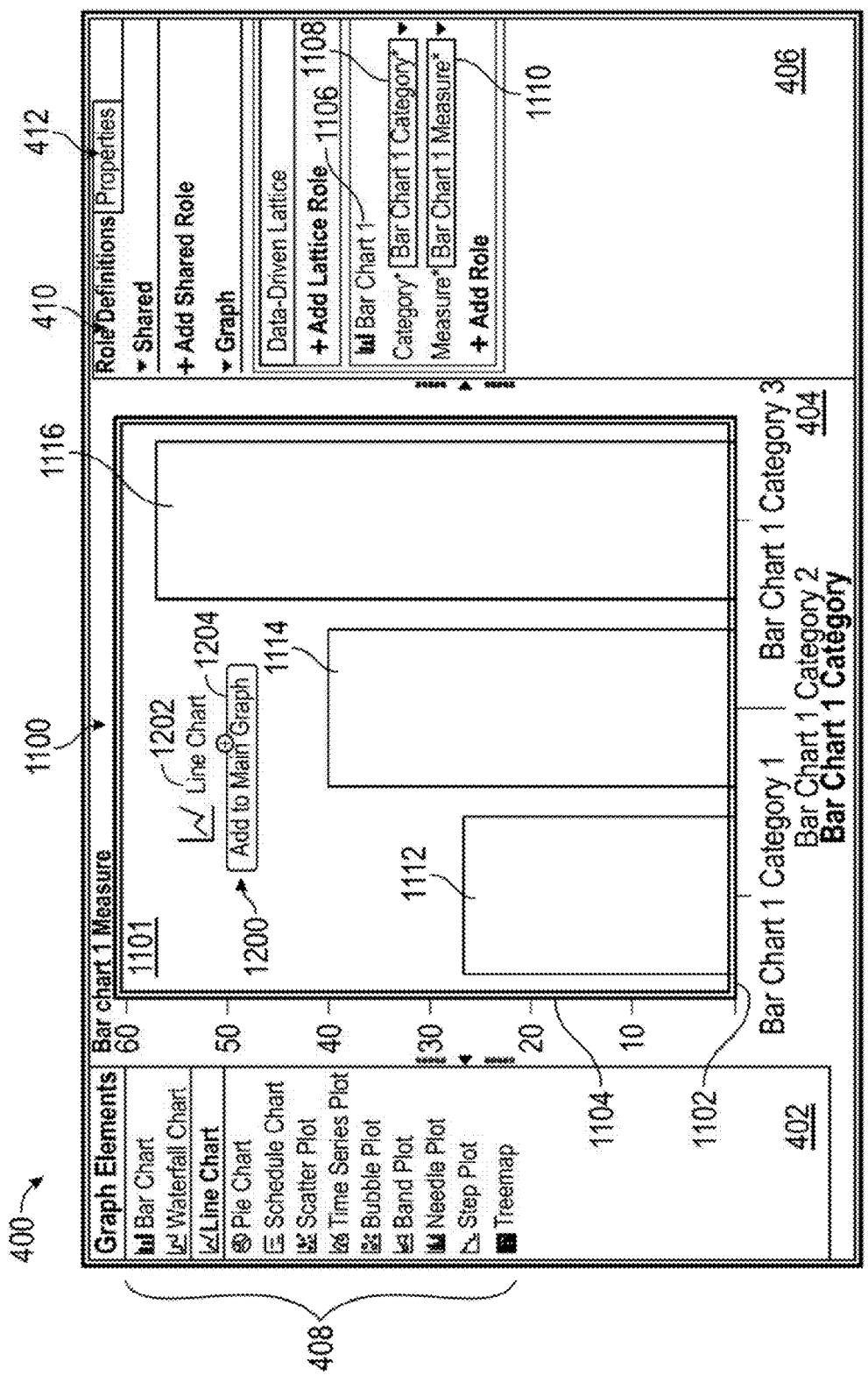

Referring to FIG. 12, a graph element indicator 1200 is shown in accordance with an illustrative embodiment. Graph element indicator 1200 indicates that a line chart graph element has been selected and dragged onto first cell graph 1101. Graph element indicator 1200 further indicates that the line chart graph element is compatible with the other graph elements included in first cell graph 1101 with a "+" symbol. Graph element indicator 1200 includes a graph element type indicator 1202 and a drop zone indicator 1204. In the illustrative embodiment, graph element type indicator 1202 indicates that the "line chart" graph element selector is selected from graph element type selectors 408. Drop zone indicator 1204 indicates that the current drop zone is within first cell graph 1101. Additionally, first cell graph 1101 may be highlighted to indicate the current drop zone is compatible with the line chart graph element. For example, positions in which the "line chart" graph element selector can be dropped within canvas panel 404 may be highlighted and outlined in green, and the "+" symbol may appear next to a cursor indicator adjacent drop zone indicator 1204.

Figure 13:
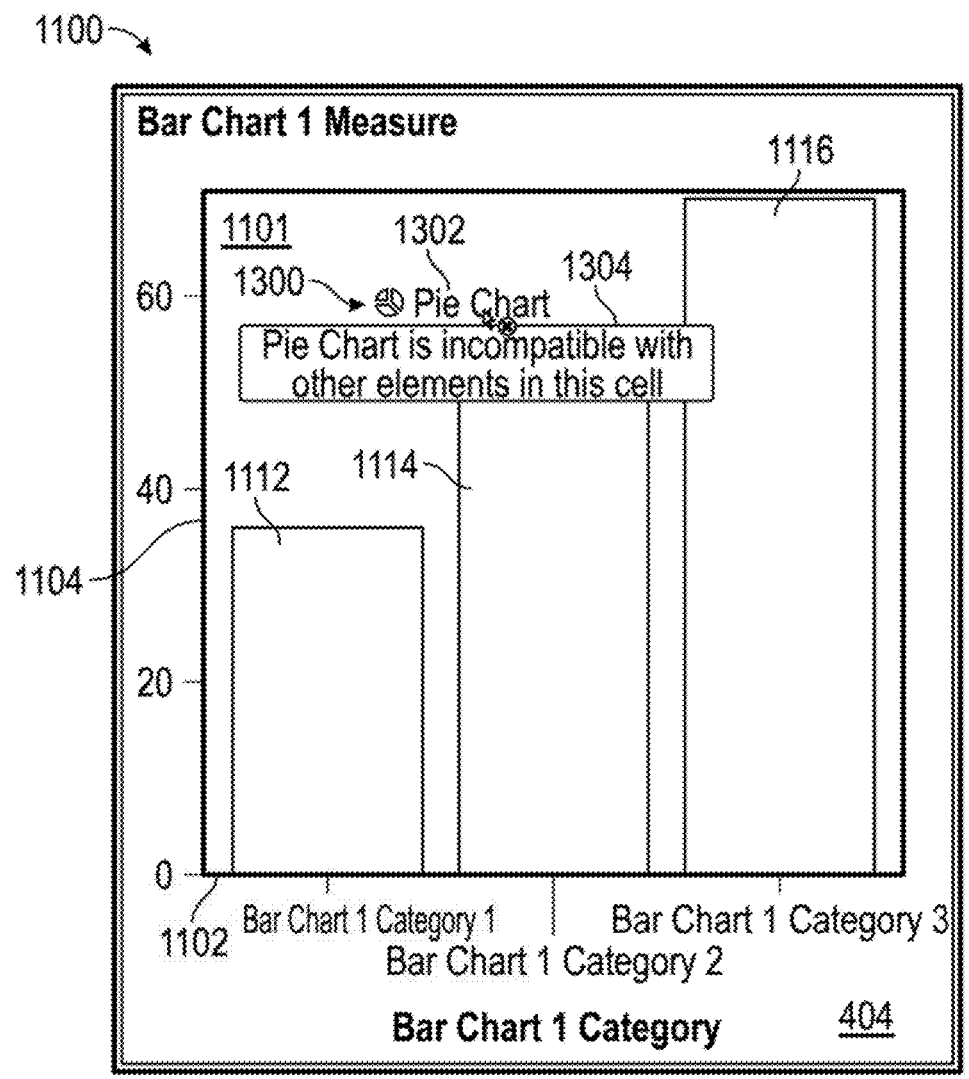

Referring to FIG. 13, a second graph element indicator 1300 is shown in accordance with an illustrative embodiment. Second graph element indicator 1300 indicates that a pie chart graph element has been selected and dragged onto first cell graph 1101. Second graph element indicator 1300 includes a second graph element type indicator 1302 and an incompatibility indicator 1304. In the illustrative embodiment, second graph element type indicator 1302 indicates that the "pie chart" graph element selector is selected from graph element type selectors 408. Incompatibility indicator 1304 indicates that the "pie chart" is not compatible with the bar chart graph element in first cell graph 1101. Additionally, first cell graph 1101 may not be highlighted, and an "x" symbol may appear next to a cursor indicator adjacent incompatibility indicator 1304 to indicate that the current drop zone is incompatible with the pie chart graph element.

Table III summarizes compatibility between different graph element types where "Y" indicates compatible graph element types, "N" indicates incompatible graph element types, "V Bar" indicates vertical bar chart, and "H Bar" indicates horizontal bar chart:

TABLE III

| H Bar | Y | | | | | | | | |
| --- | --- | --- | --- | --- | --- | --- | --- | --- | --- |
| V Bar | N | Y | | | | | | | |
| Line | N | Y | Y | | | | | | |
| Waterfall | N | Y | Y | N | | | | | |
| Scatter | Y | Y | Y | Y | Y | | | | |
| Time series | N | Y | Y | Y | Y | Y | | | |
| Bubble | Y | Y | Y | Y | Y | Y | Y | | |
| Band | N | Y | Y | Y | Y | Y | Y | Y | |
| Needle | N | Y | Y | Y | Y | Y | Y | Y | Y |

TABLE III-continued

| Step | N | Y | Y | Y | Y | Y | Y | Y | Y | Y | |
| Schedule | N | N | N | N | Y | N | Y | N | N | N | Y |
| Graph element type | H Bar | V Bar | Line | Waterfall | Scatter | Time series | Bubble | Band | Needle | Step | Schedule |

For example, a "Line" graph element type can be dropped on any other type of graph element type except a "Horizontal Bar" chart graph element type and a "Schedule" graph element type. The tree map graph element type and the pie chart graph element type may not be compatible with any other graph element type and are not listed in the example table of Table III.

Figure 14:
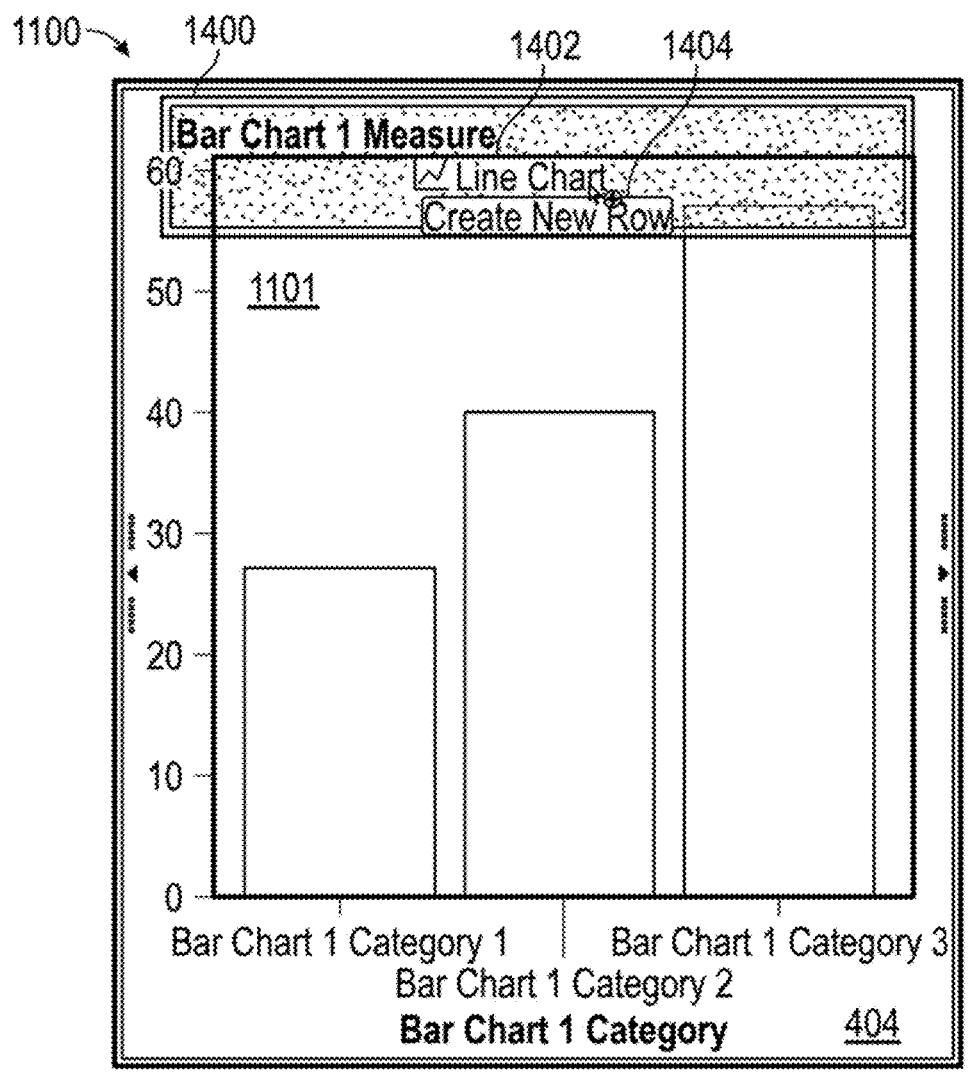

Referring to FIG. 14, a third graph element indicator 1400 is shown in accordance with an illustrative embodiment. Third graph element indicator 1400 indicates that the line chart graph element selector has been selected and dragged onto template graph 1100 above first cell graph 1101. Third graph element indicator 1400 includes a third graph element type indicator 1402 and a second compatibility indicator 1404. In the illustrative embodiment, third graph element type indicator 1402 indicates that the line chart graph element selector is selected from graph element type selectors 408. Second compatibility indicator 1404 indicates that the "line chart" graph element type can be dropped above first cell graph 1101 and will create a new row of cells in template graph 1100. Similarly, third graph element indicator 1400 could be positioned below first cell graph 1101 to indicate that a new row of cells can be added below first cell graph 1101.

Figure 15:
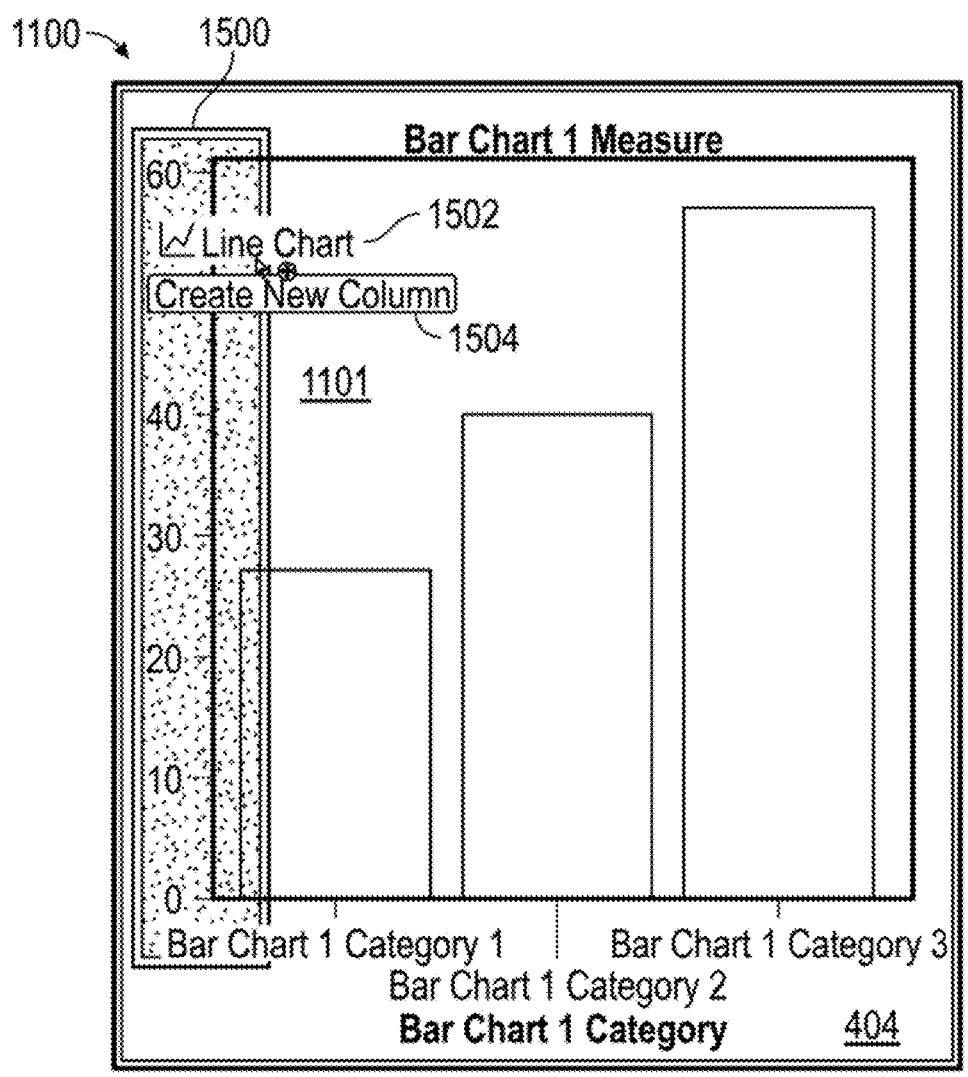

Referring to FIG. 15, a fourth graph element indicator 1500 is shown in accordance with an illustrative embodiment. Fourth graph element indicator 1500 indicates that the line chart graph element selector has been selected and dragged onto template graph 1100 to the left of first cell graph 1101. Fourth graph element indicator 1500 includes a fourth graph element type indicator 1502 and a third compatibility indicator 1504. In the illustrative embodiment, fourth graph element type indicator 1502 indicates that the "line chart" graph element type selector is selected from graph element type selectors 408. Third compatibility indicator 1504 indicates that the line chart graph element type can be dropped to the left of first cell graph 1101 and will create a new column of cells in template graph 1100. Similarly, fourth graph element indicator 1500 could be positioned to the right of first cell graph 1101 to indicate that a new column of cells can be added to the right of first cell graph 1101.

Figure 16:
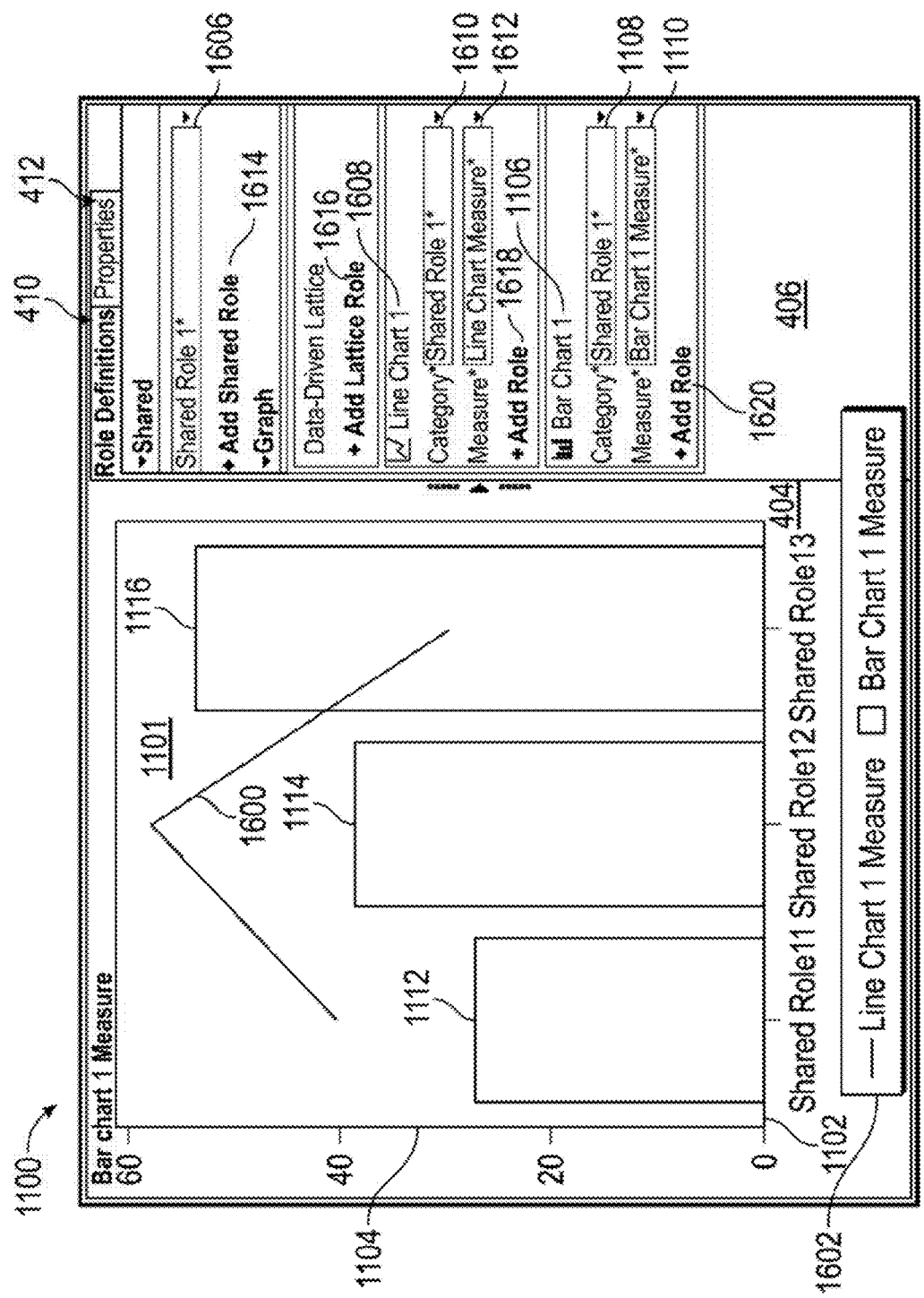

Referring to FIG. 16, template graph 1100 is presented in canvas panel 404 after overlaying a line chart 1600 in first cell graph 1101 that already includes the bar chart in accordance with an illustrative embodiment. A legend 1602 is added to label each measure included in first cell graph 1101. Line chart 1600 is rendered with sample data determined as discussed further below. X-axis 1102 and y-axis 1104 are updated based on the addition of line chart 1600 as shown in Table IV for illustration.

TABLE IV

| Data point number | x-axis | y-axis bar chart | y-axis line chart |
|---|---|---|---|
| 1 | Shared Role 1.1 | 27 | 43 |
| 2 | Shared Role 1.2 | 40 | 3 |
| 3 | Shared Role 1.3 | 57 | 31 |

By default, x-axis 1102 is now labeled "Shared Role 1" because, by default, the x-axis role (data variable) is shared for both the bar chart and line chart 1600. A shared role selector 1606 is now included in role tab 410. The two roles associated with line chart 1600 are category that is associated with x-axis 1102 and measure that is associated with y-axis 1104. Role tab 410 by default now also includes a line chart designator 1608, a second category selector 1610, and a second measure selector 1612. By default, line chart designator 1608 is named "Line Chart 1" because line chart 1600 is the first line chart added to template graph 1100. By default, second category selector 1610 is labeled "Shared Role 1". By default, second category measure 1612 is labeled "Line Chart 1 Measure" because the y-axis is the measure variable of line chart 1600.

Figure 17:
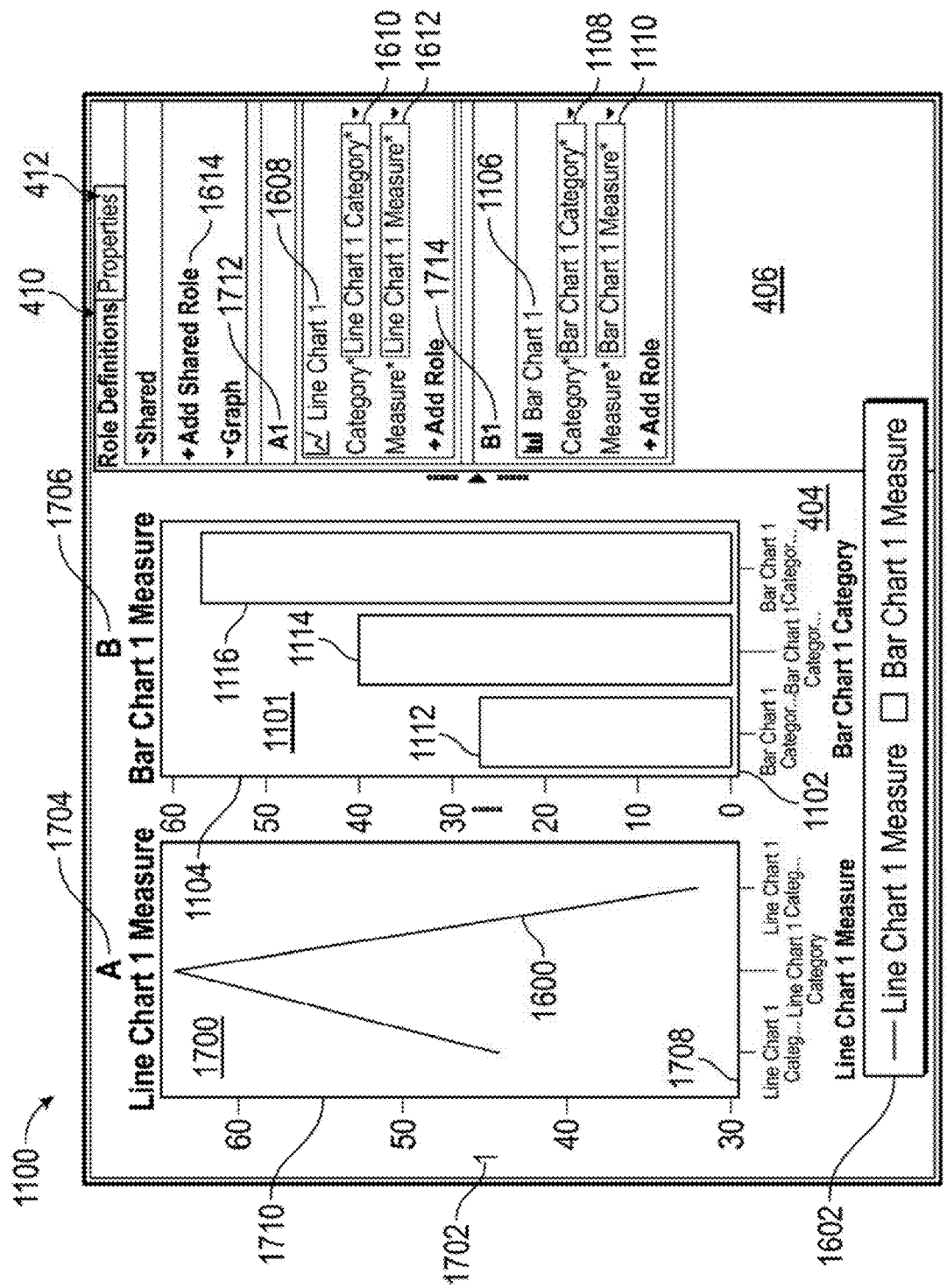

A user can unshare the x-axis role between the bar chart and line chart 1600 using either first category selector 1108 or second category selector 1610. As another option, the user can drag line chart 1600 from first cell graph 1101 and drop line chart 1600 in a new cell to the left (right, above, or below) of first cell graph 1101 creating a second cell graph 1700 as shown with reference to FIG. 17. Referring to FIG. 17, second cell graph 1700 is included in a first row, as indicated by a first row indicator 1702, and in a first column, as indicated by a first column indicator 1704. First cell graph 1101 is included in the first row and in a second column, as indicated by a second column indicator 1706. X-axis 1102 is now relabeled "Bar Chart 1 Category" because the x-axis is no longer shared with line chart 1600.

Second cell graph 1700 includes a second x-axis 1708 and a second y-axis 1710. The two roles associated with the bar chart are category, which is associated with x-axis 1102, and measure, which is associated with y-axis 1104. Second category selector 1610 now indicates "Line Chart 1 Category", by default, and category selector 1108 again indicates "Bar Chart 1 Category", by default because the roles are no longer shared.

Role tab 410 includes a first cell indicator 1712 and a second cell indicator 1714. First cell indicator 1712 indicates that line chart 1600 is positioned in a grid location "A1", and second cell indicator 1714 indicates that the bar chart is positioned in a grid location "B1". A user can again share the x-axis role between the bar chart and line chart 1600 by adding a shared role using an add shared role selector 1614 and selecting the added shared role using either first category selector 1108 or second category selector 1610. A different default behavior may maintain the shared roles even when the charts are moved into different cells.

Figure 18:
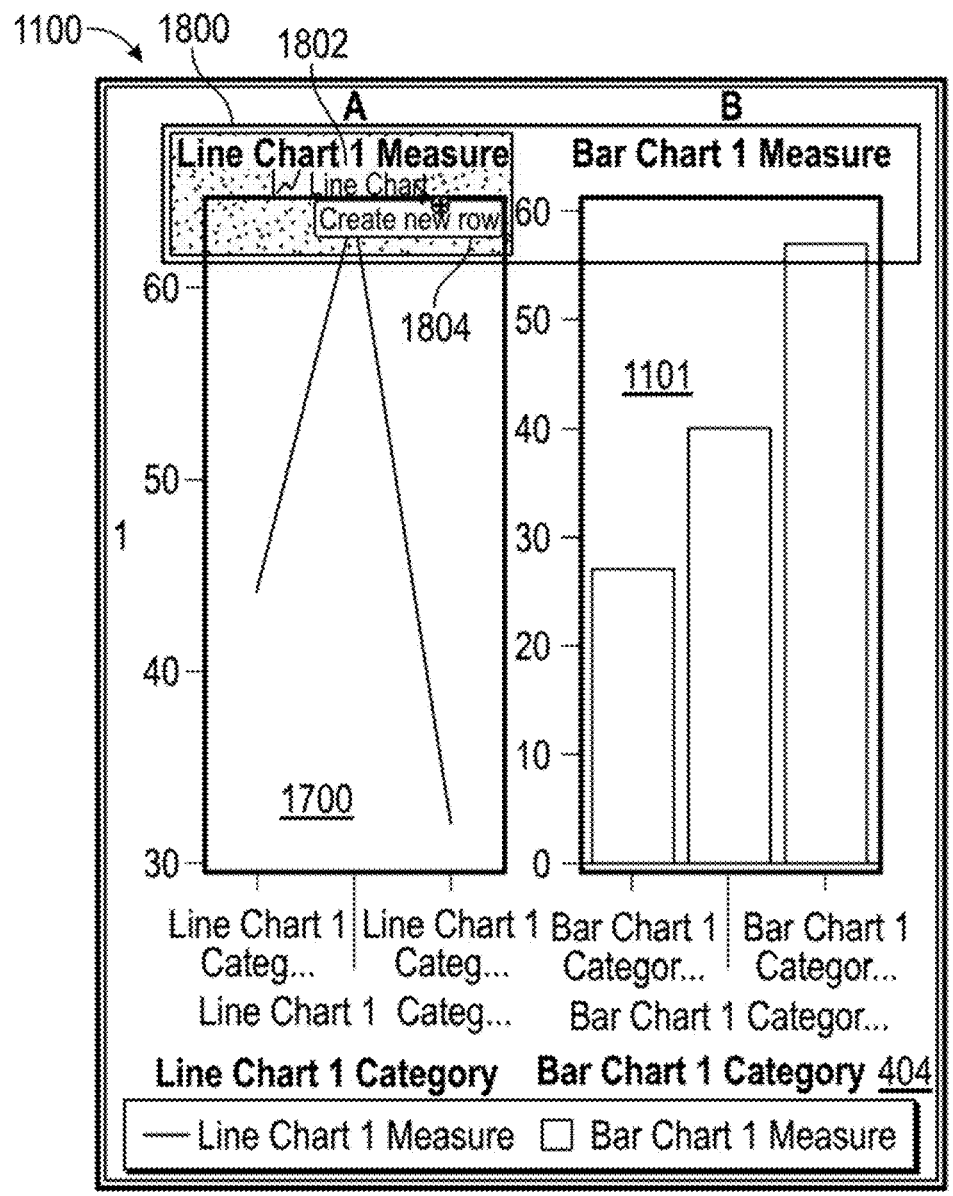

Referring to FIG. 18, a fifth graph element indicator 1800 is shown in accordance with an illustrative embodiment. Fifth graph element indicator 1800 indicates that the line chart graph element selector has been selected again and dragged onto template graph 1100 above second cell graph 1700. Fifth graph element indicator 1800 includes a fifth graph element type indicator 1802 and a fourth compatibility indicator 1804. In the illustrative embodiment, fifth graph element type indicator 1802 indicates that the "line chart" graph element type selector is selected from graph element type selectors 408. Fourth compatibility indicator 1804 indicates that the "line chart" graph element type can be dropped above second cell graph 1700 and will create a new row of cells in template graph 1100 above second cell graph 1700 and above first cell graph 1101. Similarly, fifth graph element indicator 1800 could be positioned below either second cell graph 1700 or first cell graph 1101 to indicate that a new row of cells can be added below first cell graph 1101 and second cell graph 1700. Fifth graph element indicator 1800 highlighted with a fill area above second cell graph 1700 may indicate that a new line chart graph element instance is added above second cell graph 1700 instead of above first cell graph 1101. In an alternative embodiment, fifth graph element indicator 1800 may indicate that the new line chart graph element instance will be centered above first cell graph 1101 and second cell graph 1700.

Figure 19:
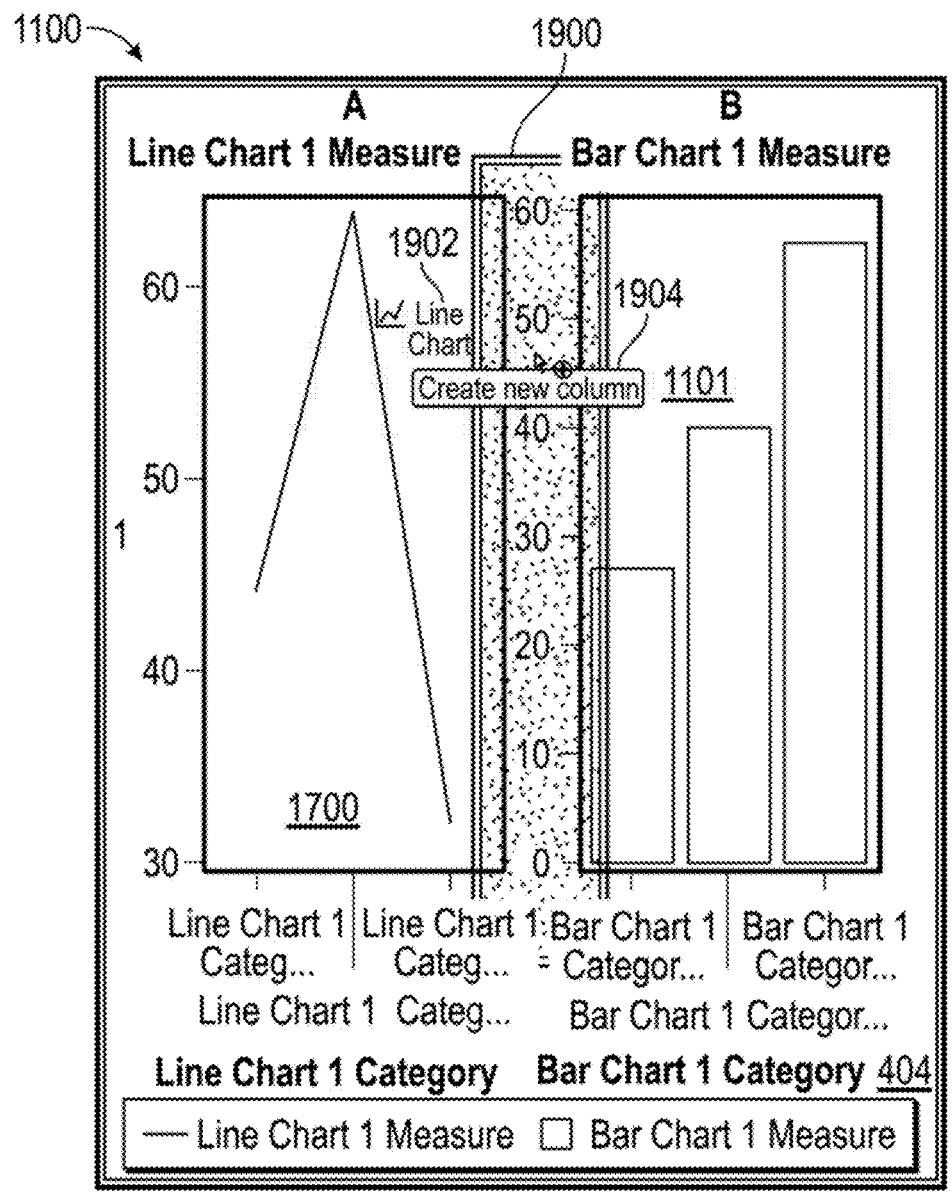

Referring to FIG. 19, a sixth graph element indicator 1900 is shown in accordance with an illustrative embodiment. Sixth graph element indicator 1800 indicates that the line chart graph element selector has been selected again and dragged onto template graph 1100 between first cell graph 1101 and second cell graph 1700. Sixth graph element indicator 1900 includes a sixth graph element type indicator 1902 and a fifth compatibility indicator 1904. In the illustrative embodiment, sixth graph element type indicator 1902 indicates that the "line chart" graph element type selector is selected from graph element type selectors 408. Fifth compatibility indicator 1904 indicates that the "line chart" graph element type can be dropped between first cell graph 1101 and second cell graph 1700 and will create a new column in template graph 1100.

New graph element instances can be dropped onto (assuming the graph element types are compatible), above, below, left, or right of any existing cell graph or between existing cell graph rows or columns. A new row or column is created unless the cell is empty or the new graph element is dropped onto an existing cell graph. Table V indicates the compatibility and default role sharing classification data type between different graph element types, where "C" indicates the category classification data type, "D" indicates the date-time classification data type, "A" indicates any classification data type, and "No" indicates incompatible graph element types.

Figure 20:
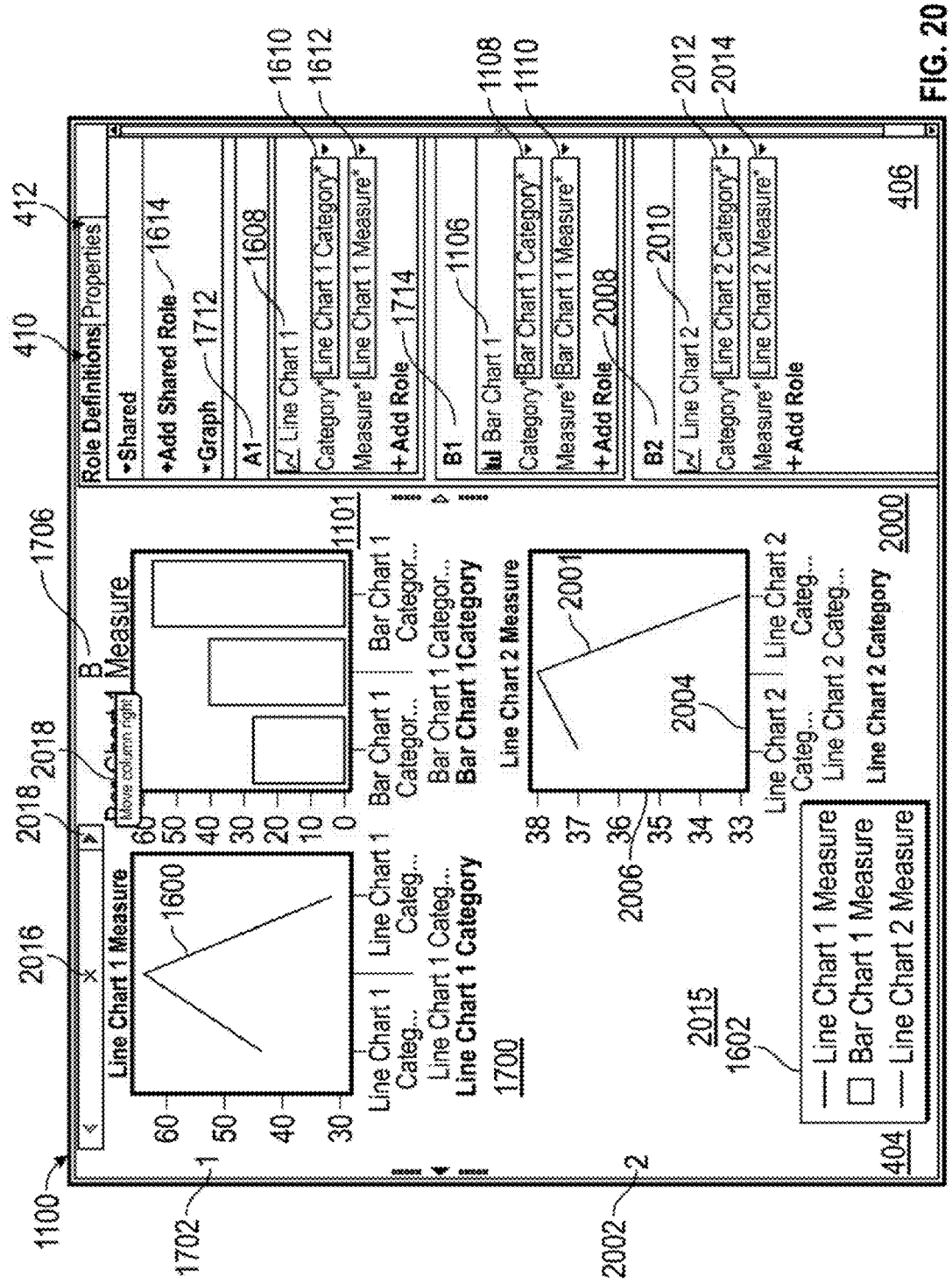

Referring to FIG. 20, template graph 1100 is presented in canvas panel 404 after adding a third cell graph 2000 below first cell graph 1101. Third cell graph 2000 includes a second line chart 2001. Legend 1602 is updated to add a label for the set of points included in second line chart 2001. Second line chart 2001 is rendered with sample data determined as discussed further below. Third cell graph 2000 is included in a second row, as indicated by a second row indicator 2002, and in the second column, as indicated by second column indicator 1706. Template graph 1100 may include an empty cell 2015 in the second row and the first column.

Third cell graph 2000 includes an x-axis 2004 and a y-axis 2006. The two roles associated with second line chart 2001 are category that is associated with x-axis 2004 and measure that is associated with y-axis 2006. A third cell indicator 2008 indicates that second line chart 2001 is positioned in a grid location "B2".

By default, x-axis 2004 is labeled "Line Chart 2 Category" because it is the second line chart added to template graph 1100, and the x-axis is the category variable according to the default behavior summarized in Table I. Similarly, by default, y-axis 2006 is labeled "Line Chart 2 Measure" because the y-axis is the measure variable. Role tab 410, by default, includes a second line chart designator 2010 named "Line Chart 2", a third category selector 2012, and a third measure selector 2014. By default, third category selector 2012 is labeled "Line Chart 2 Category" because the x-axis is the category variable. By default, third measure selector 2014 is labeled "Line Chart 2 Measure" because the y-axis is the measure variable. A user can share the x-axis role between the bar chart, line chart 1600, and/or second line chart 2001 using add shared role selector 1614 and selecting the shared role using first category selector 1108, second category selector 1610, and/or third category selector 2012.

A column of cell graphs can be moved left or right or removed, and a row of cell graphs can be moved up or down or removed. For example, a column selector 2016 indicates that a user has selected first column indicator 1704, which renders first column indicator 1704 invisible. An arrow and

TABLE V

| | | | | | | | |
|---|---|---|---|---|---|---|---|
| V Bar Waterfall Line | X = C | | | | | | |
| H Bar | N | Y = C | | | | | |
| Schedule | N | N | Y = C | | | | |
| Band | X = C | N | N | X = A | | | |
| Scatter Bubble | X = C | Y = C | Y = C | X = A | not shared | | |
| Needle Step | X = C | N | N | X = A | X = A | X = A | |
| Time series | X = D | N | N | X = D | X = D | X = D | X = D |
| Graph element type | V Bar Waterfall Line | H Bar | Schedule | Band | Scatter Bubble | Needle Step | Time series |

Compatible graph element types may be defined when axis role classification options overlap by at least one option for each axis. For example, a scatter plot can be overlaid with a bar chart because the classifications allowed for the x-axis of the scatter plot are category, date-time, or measure, and the classification allowed for the x-axis of the bar chart is category or date-time; and the classifications allowed for the y-axis of the scatter plot are category, date-time, or measure, and the classification allowed for the y-axis of the bar chart is measure. For both sets of axes there is at least one classification in common, which means the graph element types are compatible. Graph element types also may be considered incompatible if combining them does not produce a useful visual, such as a horizontal bar chart overlaid on a band plot.

tool tip 2018 indicates that the first column can be moved right.

Figure 21:
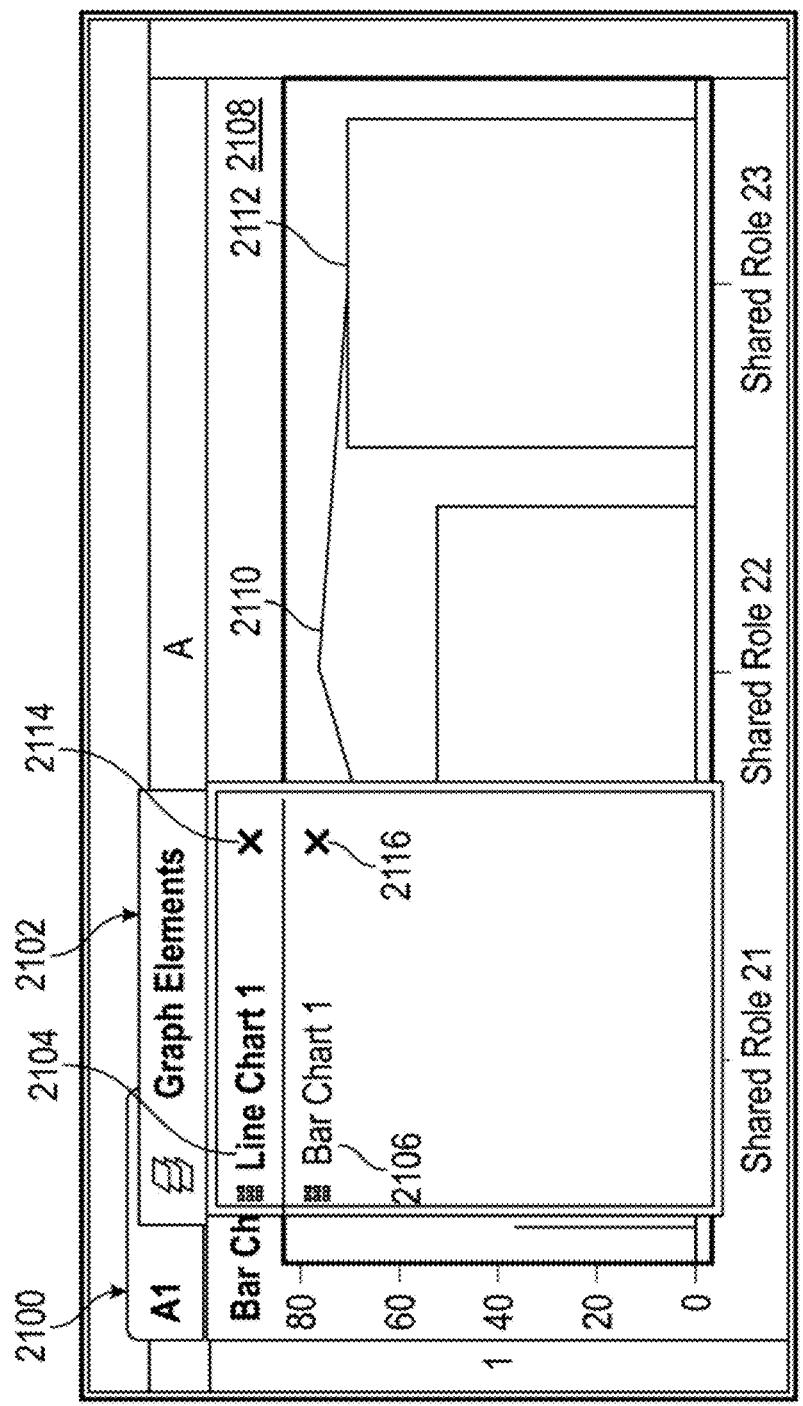

Referring to FIG. 21, when template graph 1100 includes a single cell that includes a plurality of graph elements or includes multiple cells, selection of an area of a cell graph may trigger appearance of a tab indicator 2100. Selection of tab indicator 2100 may trigger presentation of a tab 2102 that lists each graph element included in the cell graph. For example, tab 2102 includes a line chart 1 indicator 2104 and a bar chart 1 indicator 2106 because an A1 cell graph 2108 includes a first line chart 2110 and a first bar chart 2112. First line chart 2110 and first bar chart 2112 can be reordered in A1 cell graph 2108, for example, by dragging line chart 1 indicator 2104 below bar chart 1 indicator 2106. First line chart 2110 can be deleted from A1 cell graph 2108 by selecting a first deletion indicator 2114 associated with line chart1 indicator 2104. Similarly, first bar chart 2112 can be deleted from A1 cell graph 2108 by selecting a second deletion indicator 2116 associated with bar chart 1 indicator 2106.

Figure 22:
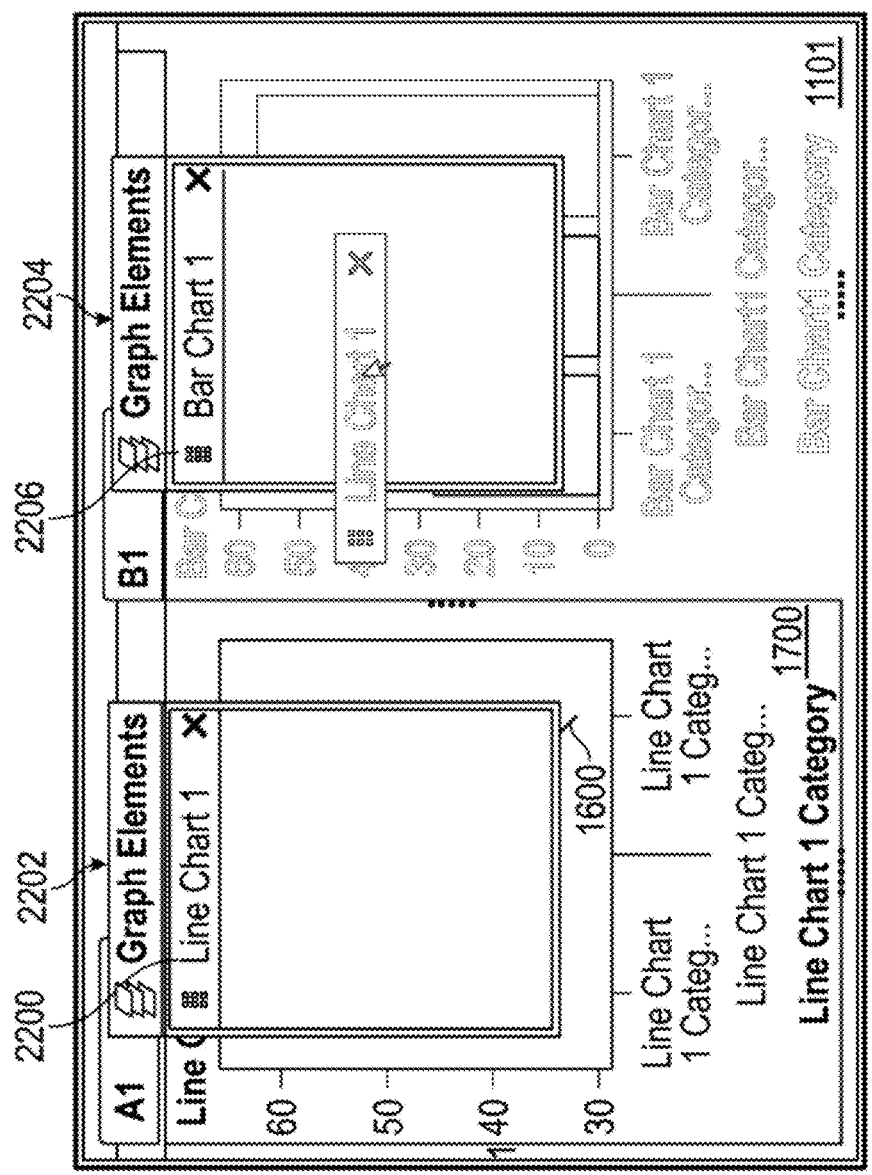

Referring to FIG. 22, a line chart 1 indicator 2200 of a first tab 2202 can be selected and dragged from second cell graph 1700 to first cell graph 1101, which may trigger opening of a second tab 2204 in first cell graph 1101. Line chart 1 indicator 2200 of first tab 2202 can be dropped in second tab 2204 either above or below a bar chart indicator 2206 of second tab 2204 to copy or move line chart 1600 to the bar chart of first cell graph 1101 and to select an overlay order.

Figure 23:
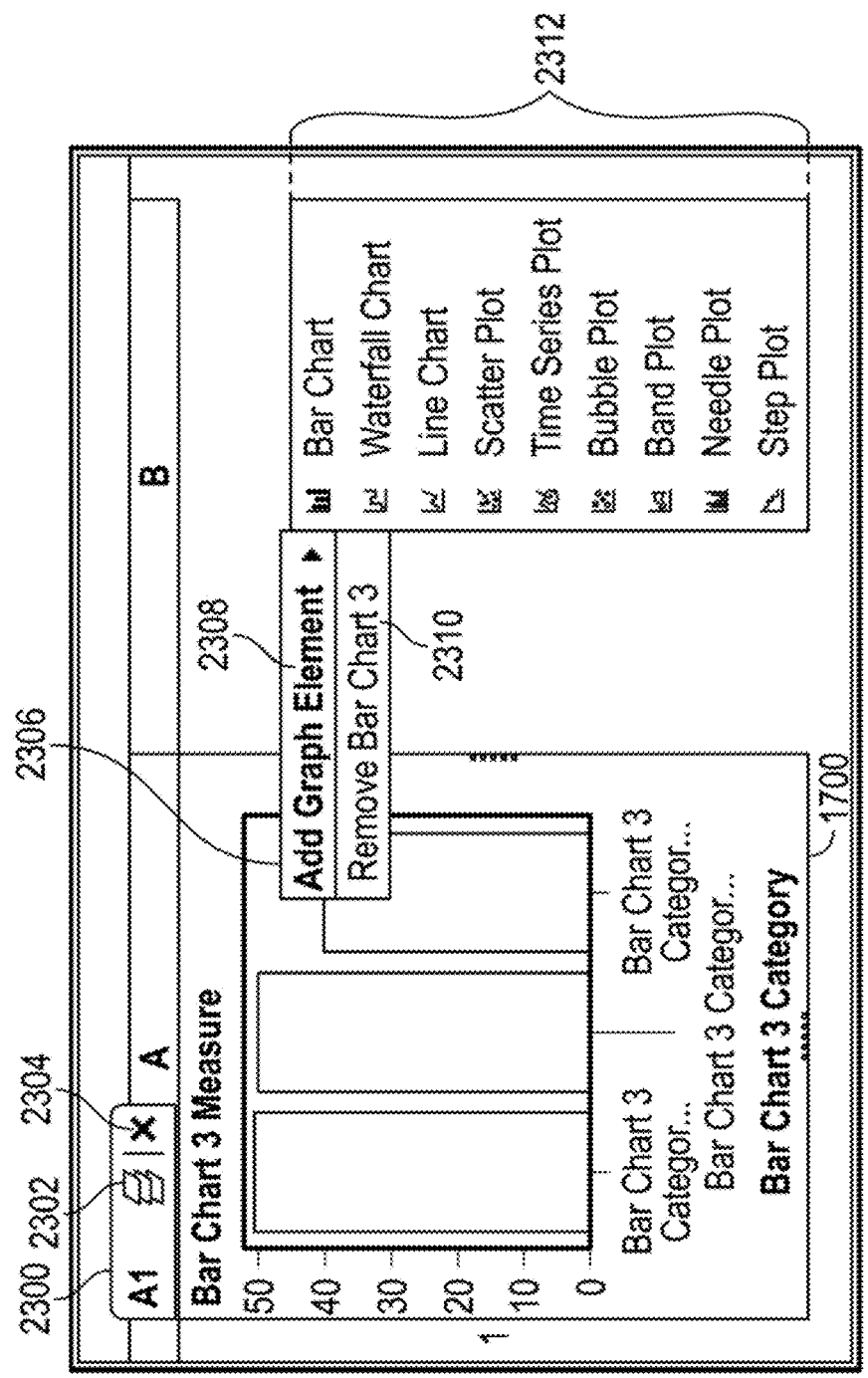

Referring to FIG. 23, a second tab indicator 2300 is shown with a graph element stack selector 2302 and a deletion selector 2304. Selection of graph element stack selector 2302 may result in opening of tab 2102, which lists the one or more graph elements in the cell graph in their order of overlay. Selection of deletion selector 2304 may result in deletion of second cell graph 1700, which, in the illustrative embodiment of FIG. 23, includes a third bar chart. Right clicking in second cell graph 1700 may result in presentation of a cell graph edit tab 2306. Cell graph edit tab 2306 may include an add graph element selector 2308 and a remove graph element selector 2310. Selection of add graph element selector 2308 may result in presentation of a second plurality of graph element type selectors 2312 that are compatible with the graph element(s) currently included in second cell graph 1700. Any selector may be selected from the second plurality of graph element type selectors 2312 to add an instance of the graph element type to second cell graph 1700.

Selection of remove graph element selector 2310 may result in presentation of one or more graph element identifiers included in second cell graph 1700. For example, second cell graph 1700 includes only Bar Chart 3 so only Bar Chart 3 is listed as a graph element that can be removed from second cell graph 1700. A cell without any graph elements may be removed automatically from template graph 1100. Additionally, a column or a row that has no cell graphs may be removed automatically from template graph 1100.

Figure 24:
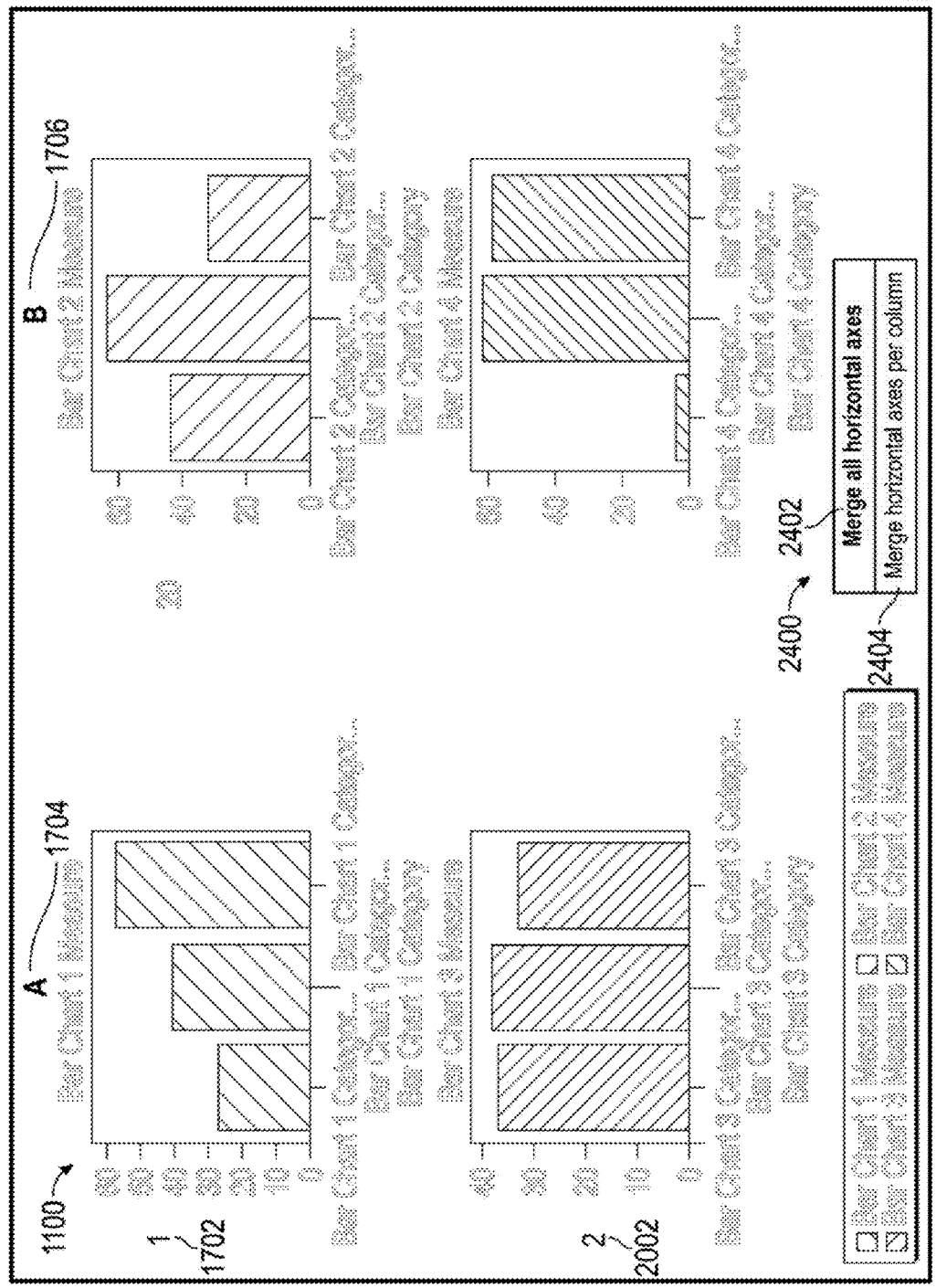

X-axes (horizontal axes) can be merged for one or more columns of template graph 1100 or for all columns of template graph 1100. Similarly, y-axes (vertical axes) can be merged in one or more rows of template graph 1100 or for all rows of template graph 1100. For example, referring to FIG. 24, an x-axis merge menu 2400 may be presented when first row indicator 1702 or second row indicator 2002 is selected and the user right-clicks as understood by a person of skill in the art. As another example, x-axis merge menu 2400 may be presented when an x-axis is selected. X-axis merge menu 2400 includes a merge all horizontal axes selector 2402 and a merge horizontal axes per column selector 2404. Similarly, a y-axis merge menu may be presented when first column indicator 1704 or second column indicator 1706 is selected and the user right-clicks as understood by a person of skill in the art. As another example, the y-axis merge menu may be presented when a y-axis is selected. The y-axis merge menu may include a merge all vertical axes selector and a merge vertical axes per row selector. Merging axes results in a creation of shared roles between the selected axes of the cells within the merged rows or columns.

As discussed previously, when compatible graph element types are overlaid in a cell graph, a shared role for the appropriate axes using the most restrictive classification of all the roles eligible to be merged is defined automatically. For character data, the date-time classification data type is a more specific form of a category classification data type, so it is treated as a more restrictive classification. The measure classification data type is the only available option for numeric roles that produce a linear axis.

Referring again to FIG. 16, add shared role selector 1614, an add lattice role selector 1616, a first add role selector 1618, and a second add role selector 1620 also allow the user to control sharing of roles between axes of cell graphs. Selection of add shared role selector 1614 allows the user to define characteristics of a shared role before the role is used as discussed further below. Selection of add lattice role selector 1616 allows the user to define a lattice or grid of cell graphs automatically based on one or more category values as discussed further below. Selection of first add role selector 1618 allows the user to add another role to the associated graph element such as "Line Chart 1" as discussed further below. Similarly, selection of second add role selector 1620 allows the user to add another role to the associated graph element such as "Bar Chart 1" as discussed further below.

Role sharing may be configured to exhibit various default behaviors as summarized in Table V. Additionally, graph design application 122 can implement various default role sharing behavior as cell graphs are moved and/or copied between cell graphs based on various settings such as merge settings and a content and sharing of existing cell graphs. For example, for graph elements whose x-axes are eligible to be merged and when at least one overlaid graph element has an x-axis that is classified as date-time, a shared role may be created for the x-axis with the classification date-time. For graph elements whose x-axes are eligible to be merged and when at least one of the overlaid graph elements has an x-axis that is classified as category, and none are classified as date-time, a shared role may be created for the x-axis with the classification category. For graph elements whose x-axes are eligible to be merged and when all overlaid graph elements have an x-axis that is classified as any, meaning the graph element can accept data classified as category, date-time, or measure, a shared role is created for the x-axis with the classification any. The y-axes may not be changed and may retain their individual roles. An exception relates to scatter plots and bubble charts that do not result in automatic creation of shared roles when overlaid.

For graph elements whose y-axes are eligible to be merged and when at least one overlaid graph element has a y-axis that is classified as category, a shared role may be created for the y-axis with the classification category. The x-axes may not be changed and may retain their individual roles.

When two compatible charts are overlaid, the shared role listed at their crossing in Table V is created automatically. For example, when a graph element is overlaid on another graph element that is not using a shared role (regardless of axis merging, for example, using x-axis merge menu 2400), a new shared role is created for the axis denoted at the crossing in Table V, and the overlaid plots use the new shared role. When a graph element is overlaid on one or more graph elements that are already using a shared role (regardless of axis merging), the new graph element uses the same shared role as the existing one or more graph elements automatically. When a graph element is overlaid on two or more graph elements that are not using a shared role (regardless of axis merging), the new graph element retains its default graph role based on its graph element type as defined in Table I. Role sharing does not occur automatically though the user can alter the default behavior using a selector of role tab 410 and selecting a shared role.

When a graph element with an automatically shareable left y-axis is overlaid on a graph element that has an automatically shareable right y-axis (regardless of axis merging), the new graph element retains its default graph role based on its graph element type as defined in Table I. For example, under properties tab 412 of customization panel 406, a y-axis can be moved from a left side to a right side for a selected graph element. Role sharing does not occur automatically though the user can alter the default behavior using a selector of role tab 410 and selecting a shared role.

After one or more columns or rows are merged, for example, using x-axis merge menu 2400, the default behavior can effectively be turned off for a column or row using, for example, any of category selector 1108, measure selector 1110, second category selector 1610, second measure selector 1612, etc., to unselect the shared role.

When a graph element is added into an empty cell of an existing row or column of template graph 1100, and the axes are merged for the existing row or column, for example, using x-axis merge menu 2400, and the axes are all using the shared role, the new graph element uses the same shared role as the existing merged one or more graph elements automatically. When addition of the new graph element creates a new column or row, the new graph element uses the same shared role as the existing merged one or more graph elements automatically when all other columns or rows, respectively, are merged and using the same shared role. Otherwise, the new graph element retains its default graph role based on its graph element type as defined in Table I.

For example, if a 4×4 group of cells is merge all and all existing graph elements are using the same shared role, a new graph element added to a cell (empty or occupied) in the group of cells uses the same shared role. As another example, if a 4×4 group of cells is merge all, but not all existing graph elements are using the same shared role, a new graph element added to an empty cell in the group of cells retains its default graph role based on its graph element type as defined in Table I.

As discussed previously, when a graph element using a shared role is moved into a different cell, the moved graph element may stop using the shared role and revert to the default graph role based on its graph element type as defined in Table I by default. If only one other graph element continues to use the shared role, the remaining graph element may stop using the shared role and revert to the default graph role based on its graph element type as defined in Table I by default. If the default graph role was edited during the session using graph design application 122, the modifications to the graph role may be restored.

When a graph element is moved from a cell in which it used a shared role into a cell with one graph element that is not using a shared role (regardless of axis merging), a new shared role is created automatically between the moved graph element and the graph element in the cell. If only one other graph element continues to use the shared role in the cell from which the moved graph element was moved, the remaining graph element may stop using the shared role and revert to the default graph role based on its graph element type as defined in Table I by default. If the default graph role was edited during the session using graph design application 122, the modifications to the graph role may be restored.

When a graph element is moved from a cell in which it used a shared role into a cell with two or more graph elements that are not using a shared role (regardless of axis merging), the moved graph element may stop using the shared role and revert to the default graph role based on its graph element type as defined in Table I by default. If only one other graph element continues to use the shared role, the remaining graph element may stop using the shared role and revert to the default graph role based on its graph element type as defined in Table I by default. If the default graph role was edited during the session using graph design application 122, the modifications to the graph role may be restored.

When a graph element is moved from a cell in which it used a first shared role into a cell with two or more graph elements that are using a second shared role (regardless of axis merging), the moved graph element uses the second shared role used by the two or more graph elements. If only one other graph element continues to use the first shared role, the remaining graph element may stop using the first shared role and revert to the default graph role based on its graph element type as defined in Table I by default. If the default graph role was edited during the session using graph design application 122, the modifications to the graph role may be restored.

When a graph element is moved from a cell in a group of cells that is merged per column to an empty cell in another column, the moved graph element uses the same shared role as the existing merged one or more graph elements in the new column automatically when the cells in the new column are using the same shared role. Otherwise, the new graph element retains or reverts to its default graph role based on its graph element type as defined in Table I. If the default graph role was edited during the session using graph design application 122, the modifications to the graph role may be restored.

If at least two other graph elements remain in the cell from which the graph element is moved, the remaining at least two other graph elements continue to use the shared role. If only one other graph element remains in the cell from which the graph element is moved, the remaining graph element continues to use the same shared role as the existing merged one or more graph elements in the existing column or row when the cells in the existing column or row are using the same shared role. Otherwise, the remaining graph element reverts to its default graph role based on its graph element type as defined in Table I. If the default graph role was edited during the session using graph design application 122, the modifications to the graph role may be restored.

When a graph element with an automatically shareable left y-axis is overlaid with another graph element with an automatically shareable right y-axis, the graph element with the automatically shareable left y-axis is changed to the right y-axis and a new shared role is created that both graph elements use.

When two graph elements are overlaid using the same shared automatically shareable y-axis, one element is changed to the other y-axis and both graph elements stop using the shared role and revert to their default graph role based on their graph element type as defined in Table I.

Different default behaviors may be used than those described.

Figure 25:
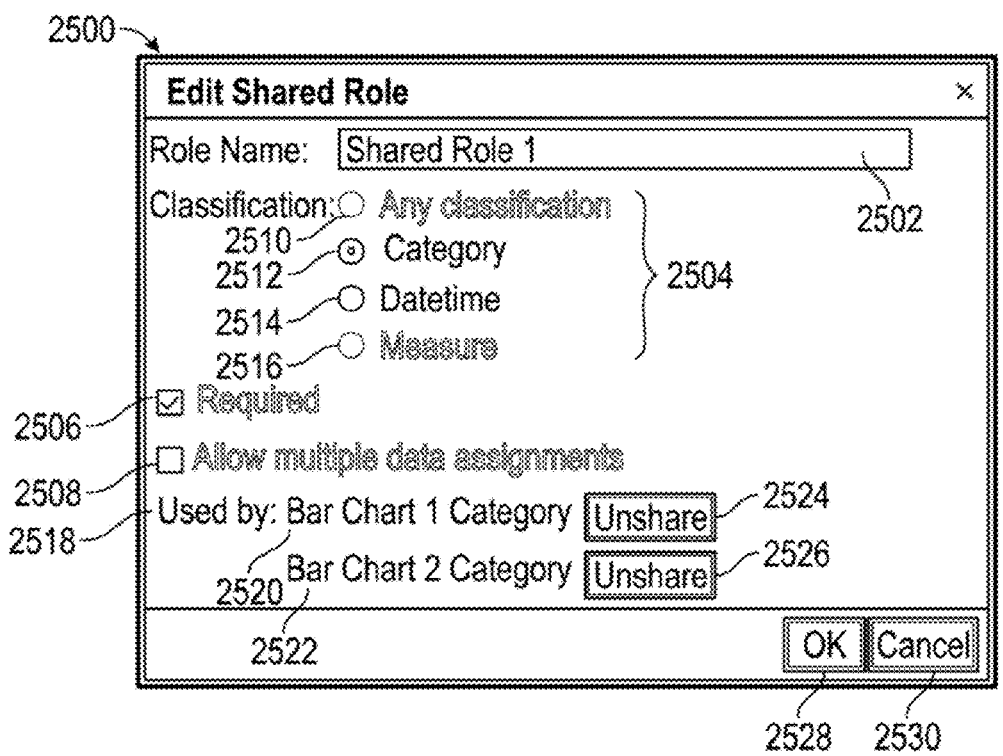

Referring to FIG. 25, an edit shared role window 2500 is shown in accordance with an illustrative embodiment. Opening of edit shared role window 2500 can be triggered, for example, by selecting add shared role selector 1614. Edit shared role window 2500 may include a role name selector 2502, a classification selector 2504, a required selector 2506, and an assignment selector 2508. The name that appears in association with the role field in second customization panel 706 can be defined in role name selector 2502. Though a default role name may be defined by default, such as "Shared Role 1", the name can be edited to help a graph design template user of graph renderer application 222 understand what data to apply to the role. The default name may be appended with incremental numbers to maintain unique names.

Classification selector 2504 may include a radio button for each data type. For example, classification selector 2504 may include an "Any" radio button 2510, a "Category" radio button 2512, a "Datetime" radio button 2514, and a "Measure" radio button 2516. The radio button selection defines the classification of the data item(s) assigned to the role and determines the axis type of the axis to which the role is attached. Depending on the graph element type(s) using the shared role, some of the classifications may be disabled as indicated by graying as understood by a person of skill in the art. For example, in the illustrative embodiment of FIG. 25, "Any" radio button 2510 and "Measure" radio button 2516 are disabled. If only one classification is valid for the graph element type(s) using the shared role, classification selector 2504 may appear as a static value.

Required selector 2506 defines whether or not the shared role is required to be associated with data when the graph design template 124 is used. In the illustrative embodiment, required selector 2506 is a checkbox. If the checkbox is not checked, and the user of graph design template 124 in graph renderer application 222 does not apply data to the shared role, a graph is still rendered. If the checkbox is checked, and the user of graph design template 124 in graph renderer application 222 does not apply data to the shared role, a graph is not rendered, and an error message may be presented to the user. Some shared roles are required to render the graph, so the option to uncheck the checkbox may be disabled as shown in the illustrative embodiment.

Assignment selector 2508 defines whether or not multiple data items can be assigned to the shared role to render additional plots when the graph design template 124 is used in graph renderer application 222. For example, if a line chart is allowed to have multiple data assignments on its Y (linear) axis, the y-axis role can accept multiple measure assignments, and a line is rendered for each measure. In the illustrative embodiment, assignment selector 2508 is a checkbox. Some shared roles do not allow multiple data items to be assigned, so the option to check the checkbox may be disabled as shown in the illustrative embodiment.

For example, if the shared role is for a vertical bar chart, the x-axis receives character data so only "Category" radio button 2512 and "Datetime" radio button 2514 are valid choices for classification selector 2504. "Category" radio button 2512 may be selected as a default classification based on Table I. The required checkbox is checked and disabled because the vertical bar chart must receive data for the x-axis role to render. The vertical bar chart cannot receive multiple data assignments on the x-axis, so Assignment selector 2508 is unchecked and disabled.

When the shared role is already being used by one or more roles, a Used by field 2518 is included in edit shared role window 2500, and the roles that use the shared role are listed. For example, a "Bar Chart 1 Category" indicator 2520 and a "Bar Chart 2 Category" indicator 2522 are listed as using the shared role. The Bar Chart 1 Category can be unshared using a first unshared selector 2524, and the Bar Chart 2 Category can be unshared using a second unshared selector 2526.

Selection of an "Ok" selector 2528 saves the selector values entered in edit shared role window 2500 and closes edit shared role window 2500. Selection of a "Cancel" selector 2530 discards the selector values entered in edit shared role window 2500 and closes edit shared role window 2500.

To create a shared role for two graph roles, an arrow next to one of the roles may be selected. For example, selecting either first category selector 1108 or second category selector 1610 may result in presentation of a select role window 2600 shown with reference to FIG. 26. Select role window 2600 may include an edit role selector 2602, a use shared role selector 2604, and a create shared role selector 2606. Selection of edit role selector 2602 may result in presentation of edit shared role window 2500. If the associated graph element instance is not already sharing a role, Used by field 2518 of edit shared role window 2500 may be empty.

Selection of use shared role selector 2604 may be grayed out if no compatible shared roles have been created. Referring to FIG. 27, selection of use shared role selector 2604 may result in presentation of a shared role selector 2700 when one or more compatible shared roles have been created either by the user or automatically. Shared role selector 2700 may include a list of the one or more shared roles that have been created and are compatible with the associated graph role. For example, in the illustrative embodiment, a single shared role has been created and is named "Shared Role 1". Selection of a shared role of the one or more shared roles results in sharing of the selected shared role that is included in the associated role selector such as second category selector 1610.

Referring again to FIG. 26, selection of create shared role selector 2606 may result in presentation of a role selector 2608 when one or more other roles have been created. Role selector 2608 may include a list of the one or more other roles that have been created. For example, in the illustrative embodiment, a single other role has been created and is named "Bar Chart 1 Category". Selection of a role of the one or more other roles results in sharing the role between the selected role that is included in the associated role selector such as second category selector 1610.

Figure 28:
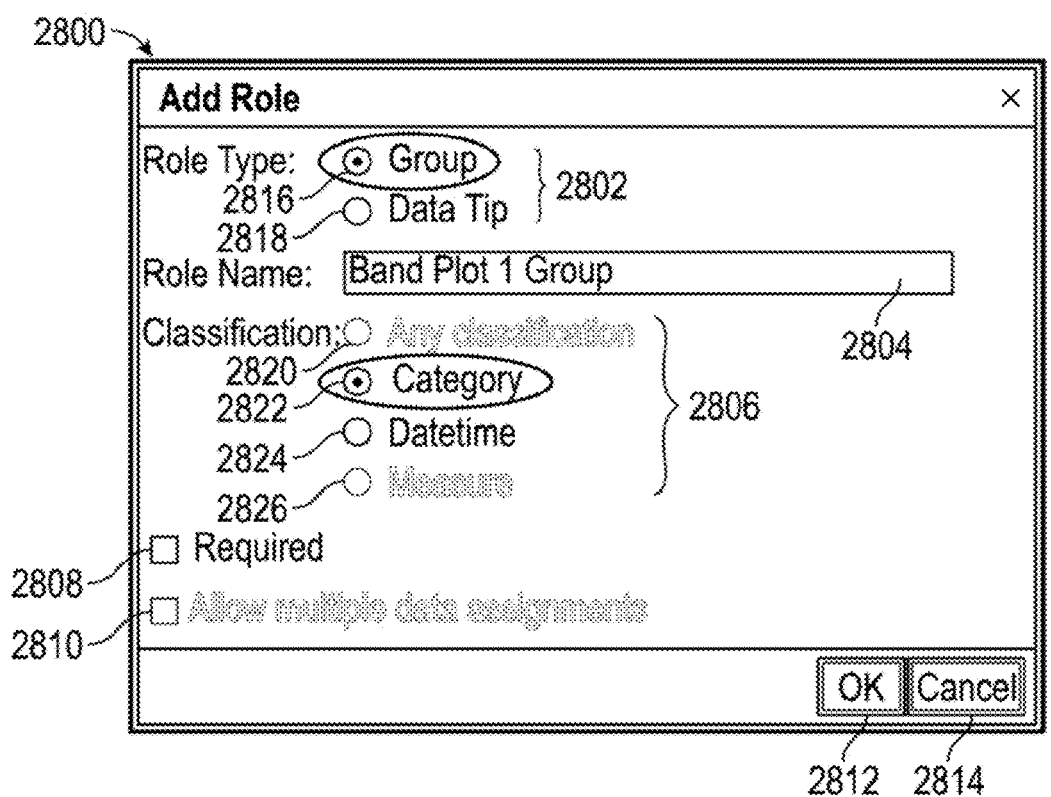

Referring to FIG. 28, selection of first add role selector 1618 or second add role selector 1620 may result in presentation of an add role window 2800. Add role window 2800 may include a role type selector 2802, a second role name selector 2804, a second classification selector 2806, a second required selector 2808, and a second assignment selector 2810. Additional illustrative role type selectors of role type selector 2802 may include a category selector, a measure selector, an X selector, a Y selector, a time selector, a color selector, a data label selector, a target selector, a tiles selector, a size selector, an X origin selector, a Y origin selector, an upper limit selector, a lower limit selector, a task selector, a start selector, a finish selector, etc. The available selectors may depend on the graph element type.

Similar to role name selector 2502, the name that appears in association with the role field in second customization panel 706 can be defined in second role name selector 2804. Similar to classification selector 2504, second classification selector 2806 defines the classification of the data item(s) assigned to the role and determines the axis type of the axis to which the role is attached. For example, second classification selector 2806 may include a second "Any" radio button 2820, a second "Category" radio button 2822, a second "Datetime" radio button 2824, and a second "Measure" radio button 2826. Similar to required selector 2506, second required selector 2808 defines whether or not the shared role is required to be associated with data when the graph design template 124 is used. Similar to assignment selector 2508, second assignment selector 2810 defines whether or not multiple data items can be assigned to the shared role to render additional plots when the graph design template 124 is used in graph renderer application 222.

Role type selector 2802 may include a radio button for a group selector 2816 and a data tip selector 2818. Role type selector 2802 may include additional role type selectors such as a color role selector (not shown) depending on the graph element associated with the add role selector selected from role tab 410. Selection of group selector 2816 specifies a data column that is used to group the data. The graph elements for each unique group value are automatically distinguished by different visual attributes, such as color, line style, marker, etc. The group role data type when group selector 2816 is selected can be second "Category" radio button 2822 or second "Datetime" radio button 2824. Selection of data tip selector 2818 specifies a data column that is used for data tips. The group role data type when data tip selector 2818 is selected is second "Measure" radio button 2826. The Color role selector specifies a data column that is used to color the data. The group role data type when the color role selector is selected can be any of second "Any" radio button 2820, second "Category" radio button 2822, second "Datetime" radio button 2824, or second "Measure" radio button 2826.

Selection of a second "Ok" selector 2812 enters the selector values in add role window 2800 and closes add role window 2800. Selection of a second "Cancel" selector 2814 discards the selector values entered in add role window 2800 and closes add role window 2800.

Figure 29:
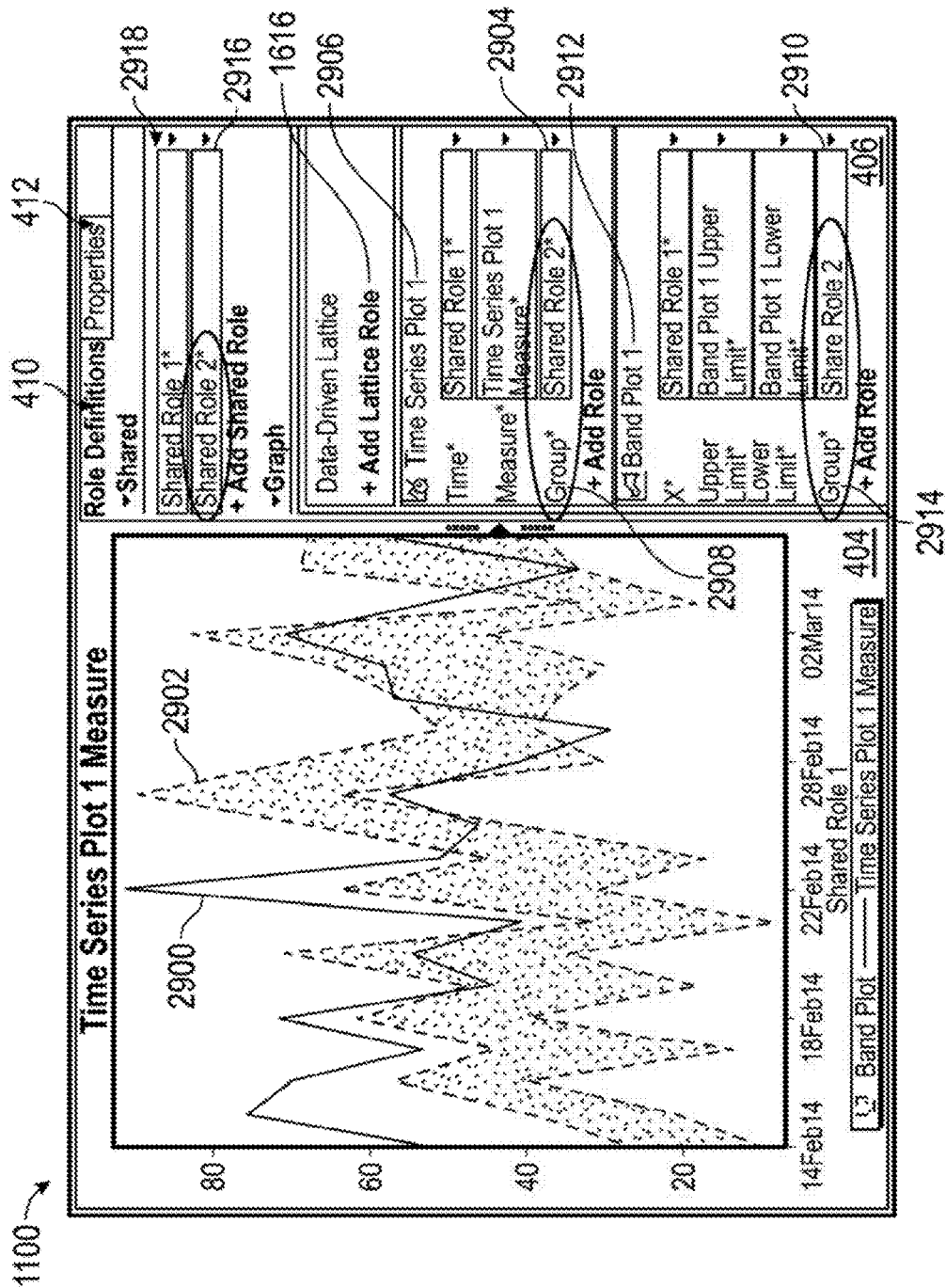

As an example, referring to FIG. 29, a "Shared Role 2" has been created using add role window 2800 and is being shared between a "Time Series Plot 1" graph element 2900 and a "Band Plot 1" graph element 2902. A "Shared Role 2 " selector 2904 is included in association with a "Time Series Plot 1" indicator 2906. "Shared Role 2" selector 2904 is a "Group" role indicating selection of group selector 2816 as indicated by a "Group" indicator 2908. A second "Shared Role 2" selector 2910 is included in association with a "Band Plot 1" indicator 2912. Second "Shared Role 2 " selector 2910 is a "Group" role indicating selection of group selector 2816 as indicated by a second "Group" indicator 2914. A third "Shared Role 2" selector 2916 is also added to a shared role section 2918 of role tab 410 of customization panel 406. The group role sharing may be undone by selecting either of "Shared Role 2 " selector 2904 or second "Shared Role 2 " selector 2910 and unsharing "Shared Role 2" or by selecting third "Shared Role 2" selector 2916 and deleting the shared role.

Figure 30:
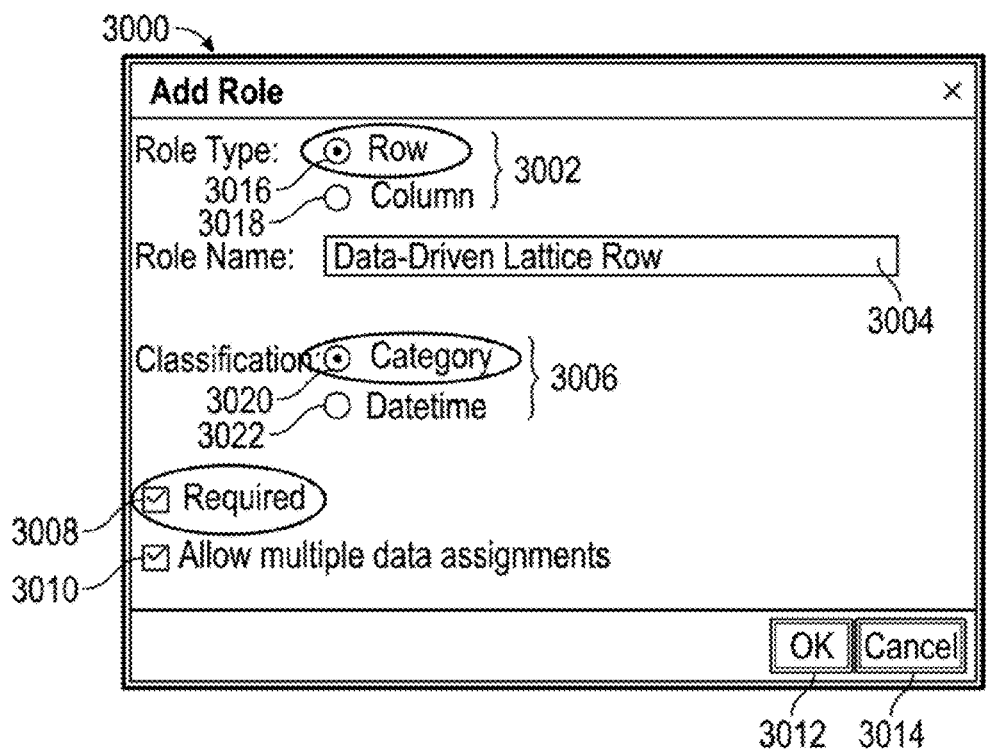

Selection of add lattice role selector 1616 may result in presentation of an add lattice role window 3000 shown with reference to FIG. 30 in accordance with an illustrative embodiment. A lattice is a multiple cell graph object in which the data used to construct the graph elements in each cell are determined by the values of one or more class variables. The number of cells created is determined by the unique values of the class variables. Each cell of the lattice has the same group of graph elements though one or more graph elements can be included in each cell. However, the graph elements in different cells have different values for the class variables.

Add lattice role window 3000 may include a second role type selector 3002, a third role name selector 3004, a third classification selector 3006, a third required selector 3008, and a third assignment selector 3010. Similar to role name selector 2502, the name that appears in association with the role field in second customization panel 706 can be defined in third role name selector 3004. Similar to classification selector 2504, third classification selector 3006 defines the classification of the data item(s) assigned to the role and determines the axis type of the axis to which the role is attached. For example, third classification selector 3006 may include a third "Category" radio button 3020 and a third "Datetime" radio button 3022. Similar to required selector 2506, third required selector 3008 defines whether or not the lattice role is required to be associated with data when the graph design template 124 is used. Similar to assignment selector 2508, third assignment selector 3010 defines whether or not multiple data items can be assigned to the lattice role to render additional plots when the graph design template 124 is used in graph renderer application 222.

Second role type selector 3002 may include a radio button for a row selector 3016 and a column selector 3018. Selection of row selector 3016 specifies that the role is a row lattice that includes a plurality of rows. Selection of column selector 3018 specifies that the role is a column lattice that includes a plurality of columns. In an illustrative embodiment, both a row lattice role and a column lattice role can be created, but a plurality of row lattice roles or a plurality of column lattice roles cannot be created.

Selection of a third "Ok" selector 3012 enters the selector values in add lattice role window 3000 and closes add lattice role window 3000. Selection of a third "Cancel" selector 3014 discards the selector values entered in add lattice role window 3000 and closes add lattice role window 3000.

Figure 31:
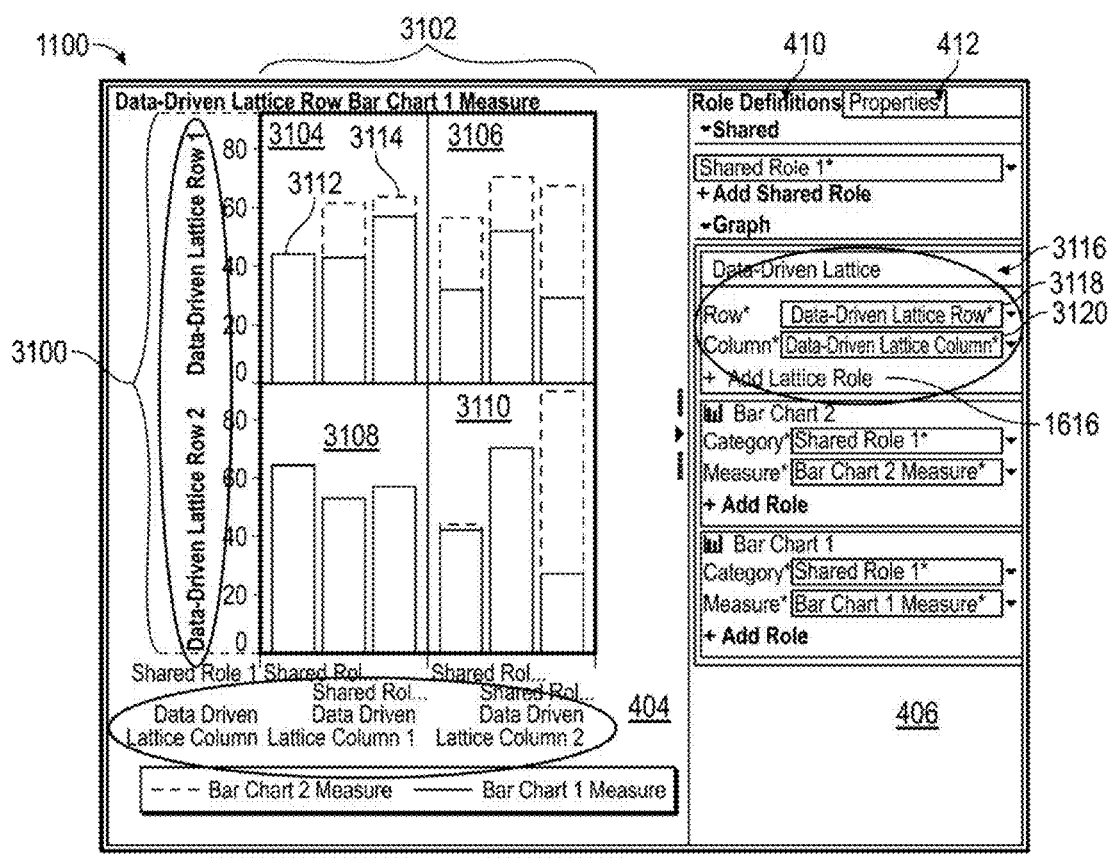

Referring to FIG. 31, template graph 1100 includes a lattice created using add lattice role selector 1616 to create a row lattice 3100 and a column lattice 3102 in accordance with an illustrative embodiment. Because both row lattice 3100 and column lattice 3102 were created, template graph 1100 includes a first cell 3104, a second cell 3106, a third cell 3108, and a fourth cell 3110. Each of first cell 3104, second cell 3106, third cell 3108, and fourth cell 3110 include a first bar chart 3112 and a second bar chart 3114. A row selector 3118 and a column selector 3120 are added to a lattice role section 3116 of role tab 410 of customization panel 406. The style of the created bar charts is replicated in second canvas panel 704 according to the data values of the classification variable that is assigned to row selector 3118 and the data values of the classification variable that is assigned to column selector 3120 using roles tab 718 of graph renderer application 222. Thus, a number of cells created in a graph using graph design template 124 defined based on template graph 1100 shown in FIG. 31 depends on the classification variables assigned to row selector 3118 and column selector 3120 using roles tab 718 of graph renderer application 222.

A single dimensional lattice instead of two dimensional lattice can be created by creating only one of row selector 3118 or column selector 3120. Add lattice role selector 1616 is shown with gray lettering in FIG. 31 because row selector 3118 and column selector 3120 have been created so no additional lattice roles can be created.

Figure 45:
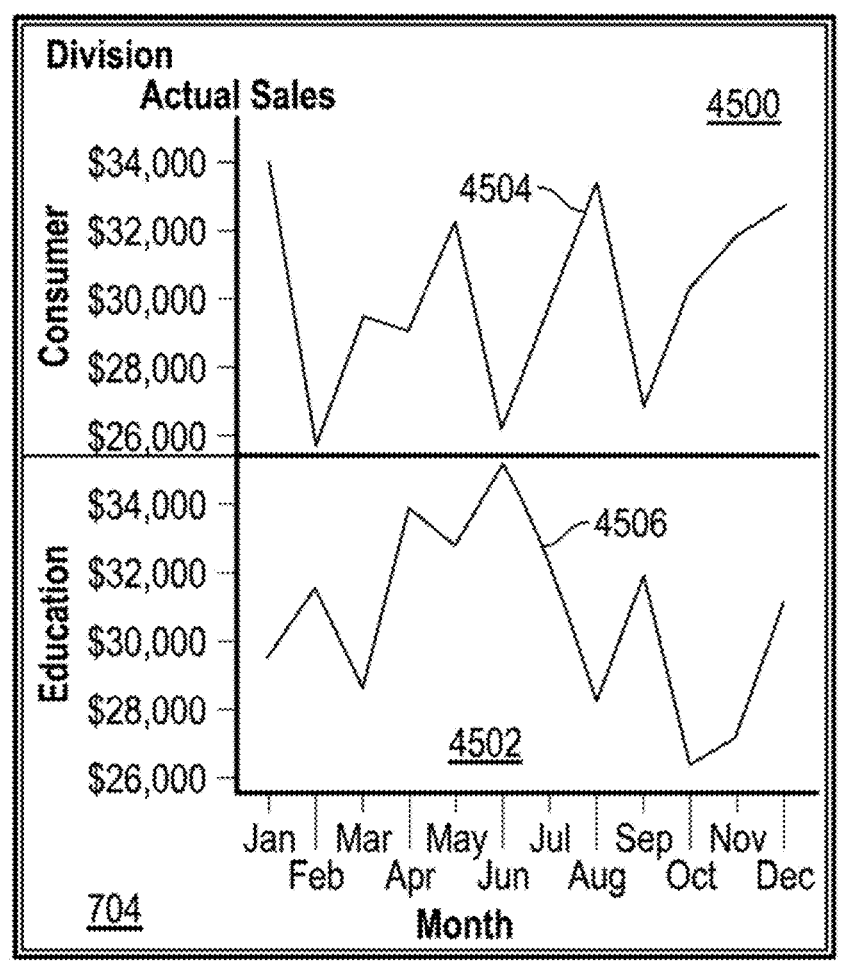

Row selector 3118 controls replication of a graph object that includes instances of a graph element type in each cell of a plurality of rows based on unique values of a class variable assigned to the row selector when a graph with the graph object is rendered. Each unique value of the class variable assigned to the row selector results in a separate graph rendered in a separate cell. For example, referring to FIG. 45, second canvas panel 704 includes a first row cell 4500 and a second row cell 4502. First row cell 4500 includes a first line chart graph element 4504 rendered for a unique value of "Consumer" for the class variable "Division" assigned to row selector 3118 using graph renderer application 222. Second row cell 4502 includes a second line chart graph element 4506 rendered for a unique value of "Education" for the same class variable assigned to row selector 3118. The graph object included a line chart graph element object type. Similarly, column selector 3120 may control replication of a graph object that includes instances of the graph element type in each cell of a plurality of columns based on unique values of a class variable assigned to the column selector when a graph with the graph object is rendered.

Figure 32:
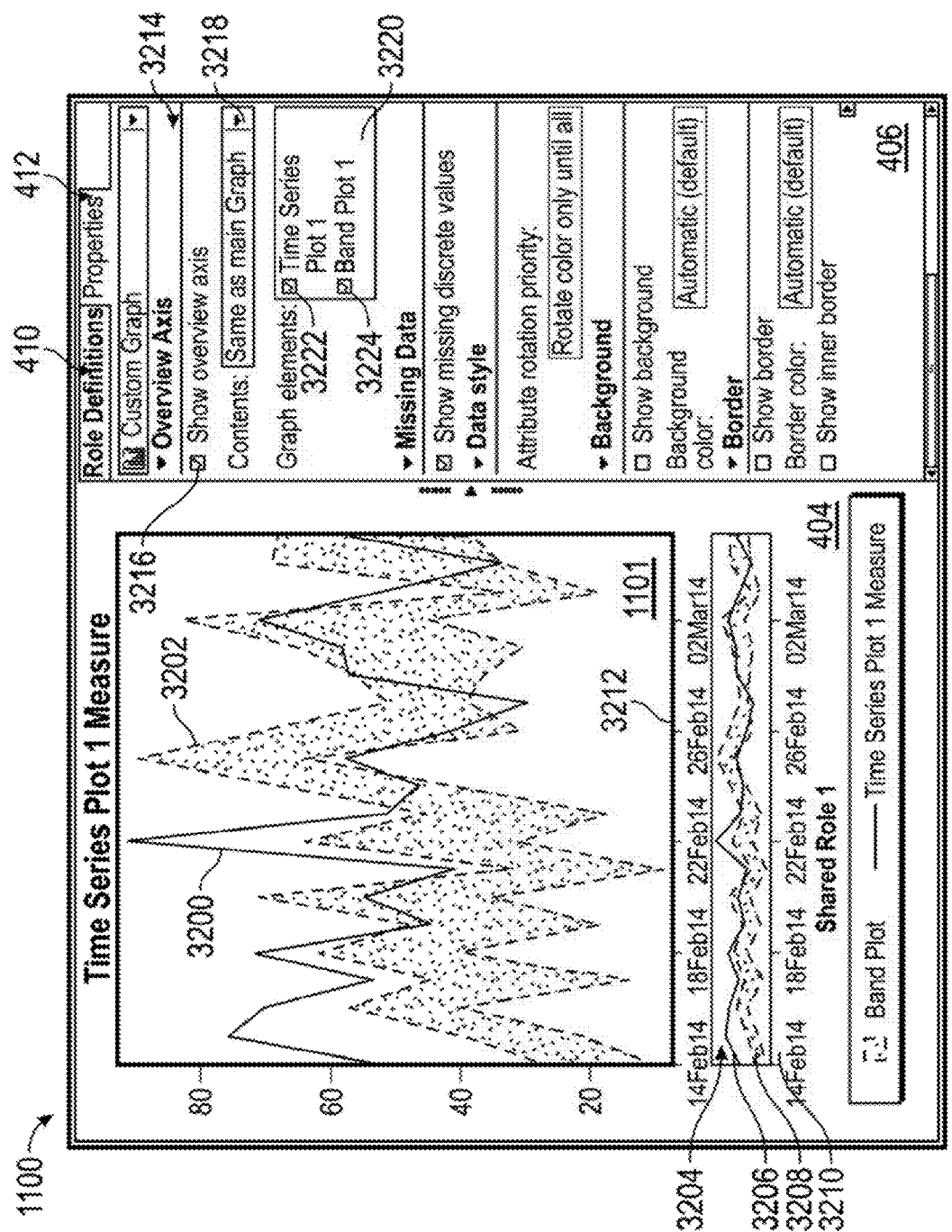

Referring to FIG. 32, first cell graph 1101 of template graph 1100 includes a time series plot 3200, a band plot 3202, and an overview axis 3204 in accordance with an illustrative embodiment. Overview axis 3204 includes a second time series plot 3206, a second band plot 3208, and a scroll bar 3210. As understood by a person of skill in the art, scroll bar 3210 can be selected by a user and used to adjust an x-axis 3212 of time series plot 3200 and band plot 3202 included in first cell graph 1101. For example, dragging from an end of scroll bar 3210 adjusts a corresponding end of x-axis 3212 and shortens a scale of x-axis 3212 so that only a remaining portion of time series plot 3200 and band plot 3202 is shown in first cell graph 1101. Overview axis 3204 is not shortened, but indicates graphically which portion of the original x-axis 3212 is presented in first cell graph 1101 as understood by a person of skill in the art.

Properties tab 412 of customization panel 406 includes an overview section 3214 that includes an overview axis selector 3216, an overview graph selector 3218, and a graph element selector window 3220. Overview axis selector 3216 defines whether or not template graph 1100 includes overview axis 3204. In the illustrative embodiment, overview axis selector 3216 is a checkbox that is selected resulting in inclusion of overview axis 3204. Selection of overview axis selector 3216 supplement x-axis 3212 of first cell graph 1101 with overview axis 3204. Overview axis 3204 contains overlays that provide an overview or context of what is being zoomed into as shown by an example with reference to FIGS. 43 and 44.

Overview graph selector 3218 defines the graph style used to define overview axis 3204. By default, overview graph selector 3218 is defined to be the same graph style as shown in first cell graph 1101. As a result, referring to the illustrative embodiment of FIG. 32, graph element selector window 3220 includes a first selector 3222 associated with time series plot 3200 and a second selector 3224 associated with band plot 3202. In the illustrative embodiment, first selector 3222 and second selector 3224 are checkboxes that are selected by default resulting in inclusion of second time series plot 3206 and second band plot 3208 in overview axis 3204 when overview axis selector 3216 is switched on to indicate inclusion of overview axis 3204. Either of first selector 3222 and second selector 3224 may be unselected to remove second time series plot 3206 and/or second band plot 3208, respectively, from overview axis 3204.

Figure 33:
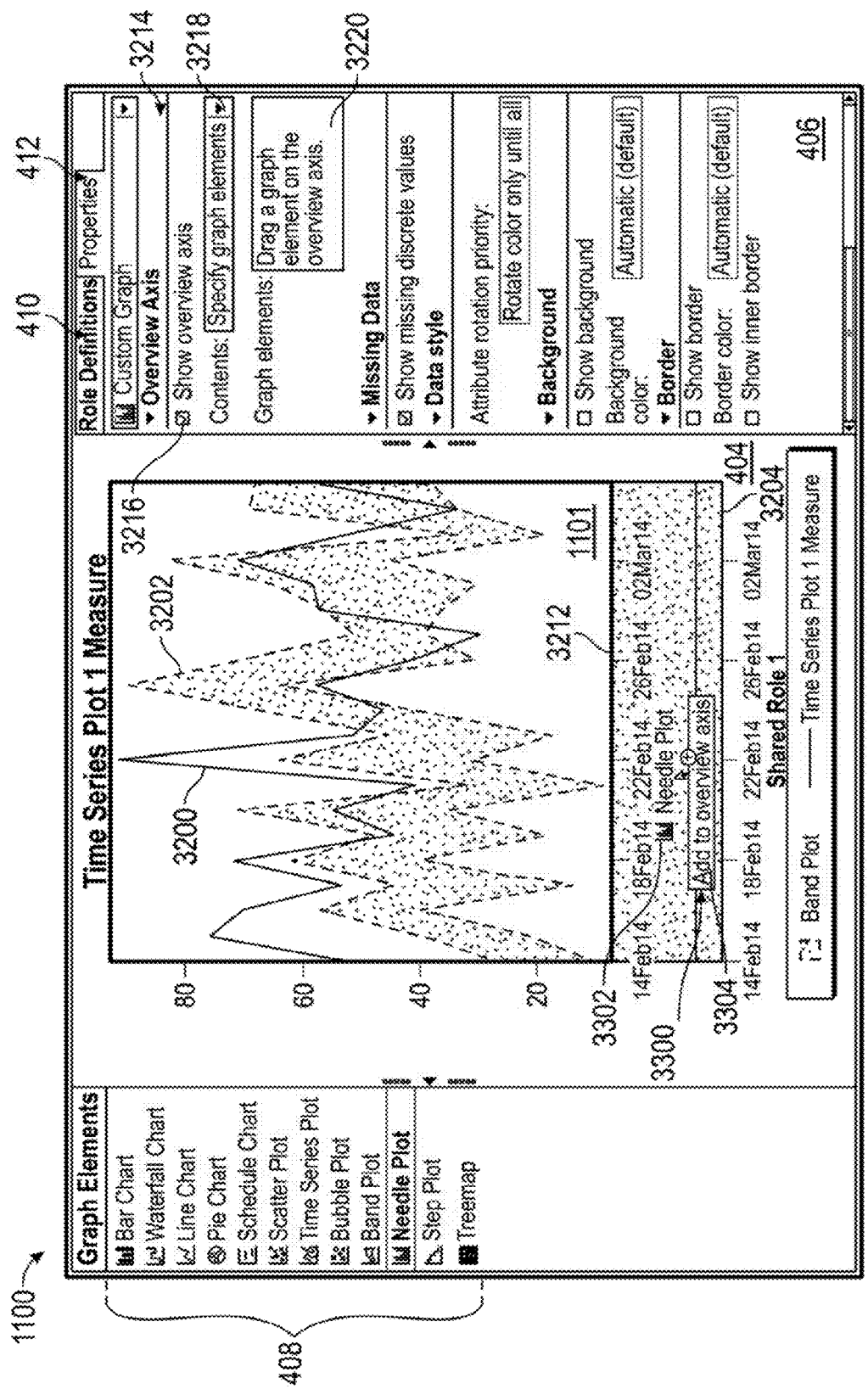

Overview graph selector 3218 further may be used to select an option such as "Specify graph elements" as shown with reference to FIG. 33. After switching Overview graph selector 3218 to "Specify graph elements", one or more graph element selectors can be selected from graph element type selectors 408. The one or more graph element selectors may be of the same or different graph element types relative to each other and relative to the graph element instance included in first cell graph 1101.

A graph element selector of the one or more graph element selectors can be dragged to overview axis 3204 and dropped into overview axis 3204. For example, referring to FIG. 33, a selected graph element indicator 3300 is shown in accordance with an illustrative embodiment. Selected graph element indicator 3300 includes a graph element type indicator 3302 and a drop zone indicator 3304. Graph element type indicator 3302 indicates that a needle plot graph element has been selected. Drop zone indicator 3304 indicates that the needle plot graph element has been dragged onto overview axis 3204 and can be added to overview axis 3204. Additionally, overview axis 3204 may be highlighted and the "+" symbol may appear next to a cursor indicator adjacent drop zone indicator 3304 to indicate the current drop zone is acceptable.

Figure 34:
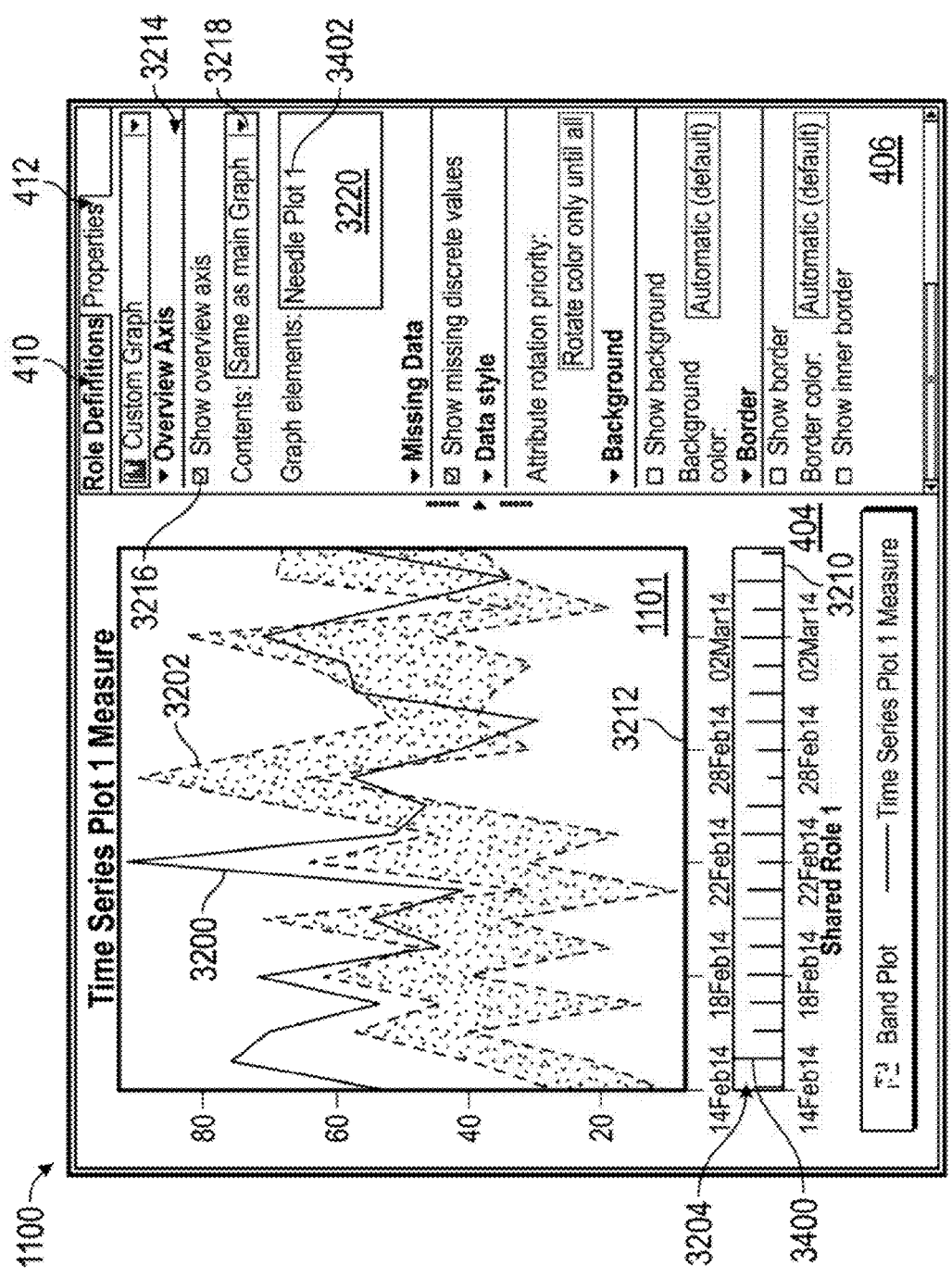
Figure 35:
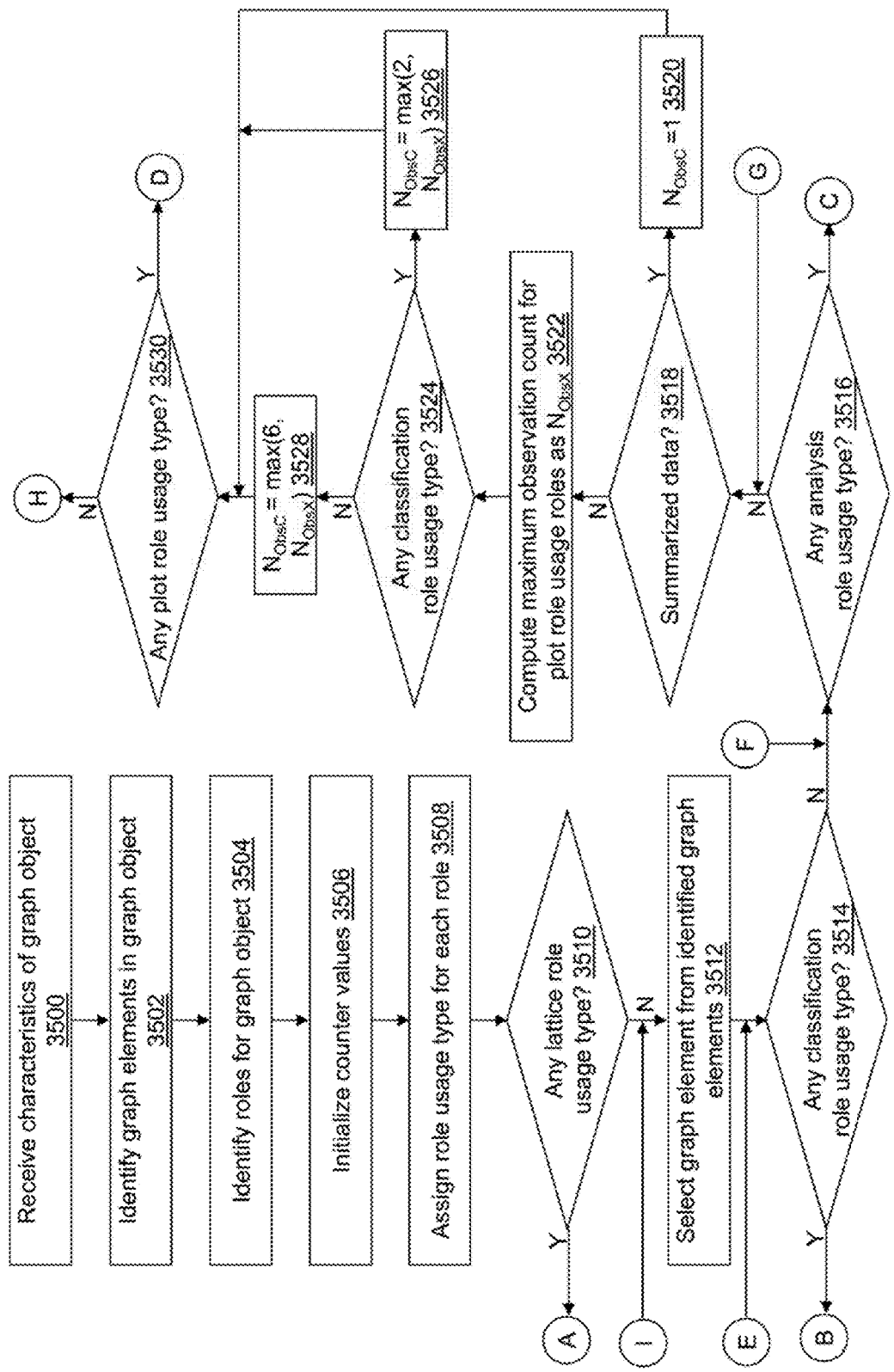
FIGS. 35-40 depict flow diagrams illustrating examples of operations performed by the graph design application of the graph design device of FIG. 1 in accordance with an illustrative embodiment.

Referring to FIG. 34, a needle plot 3400 is included in overview axis 3204 after dropping selected graph element indicator 3300 onto overview axis 3204. Graph element selector window 3220 includes a third selector 3402 associated with needle plot 3400. One or more graph element types can be used to define overview axis 3204. Compatibility between the graph element types in first cell graph 1101 and the graph element types included in overview axis 3204 may follow similar compatibility behaviors as those summarized in Table V and discussed above.

Figure 41:
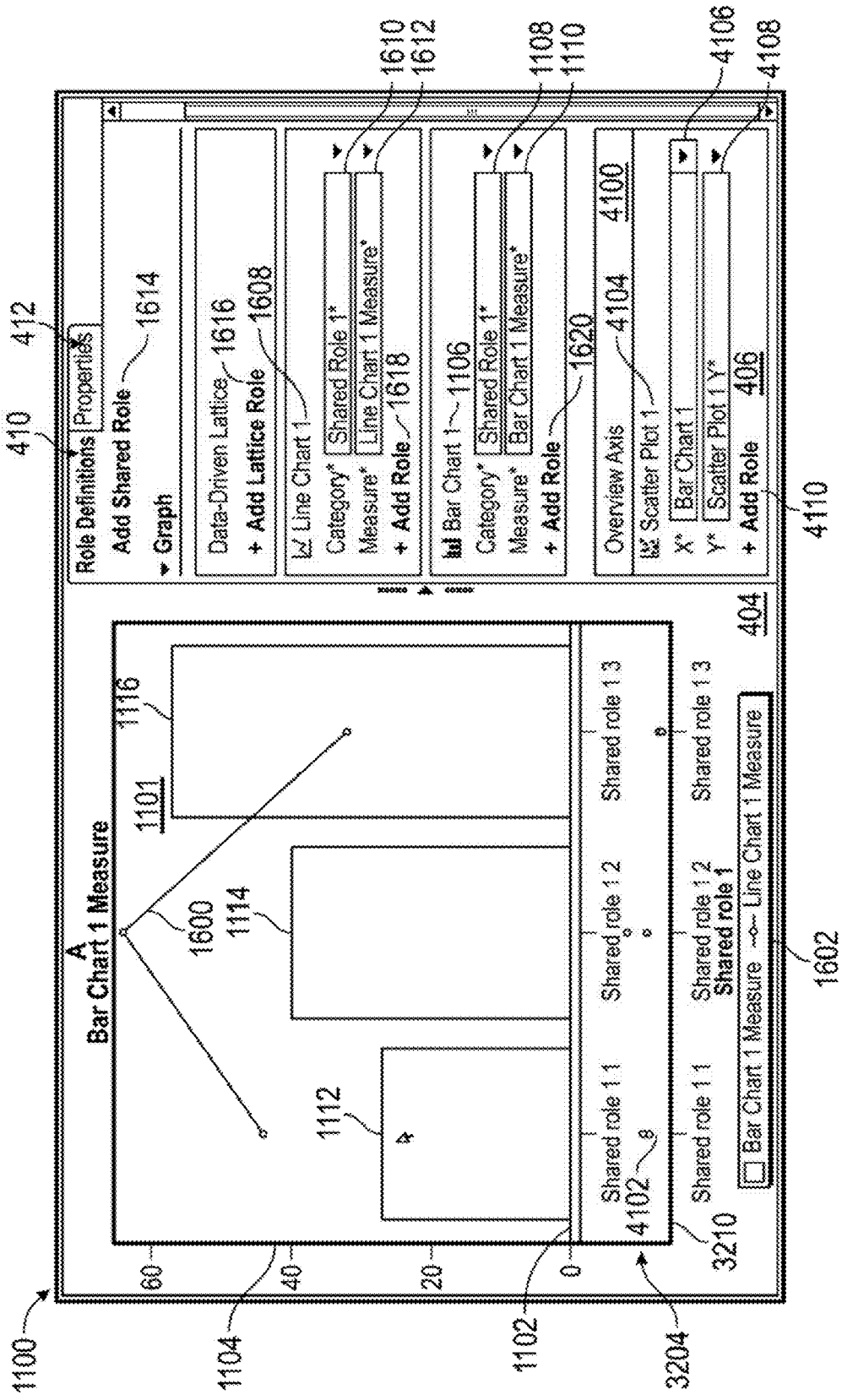

By default, an overview axis section may be added to role tab 410 below the other graph element sections. For example, referring to FIG. 41, an overview axis section 4100 is added below a section associated with line chart 1600 and the bar chart of FIG. 16. In the illustrative embodiment of FIG. 41, overview axis 3204 is included adjacent x-axis 1102 though overview axis 3204 could be associated with y-axis 1104 instead. In FIG. 41, overview axis 3204 includes a scatter plot 4102. Similar to line chart 1600 and the bar chart, overview axis section 4100 includes a scatter plot designator 4104 named "Scatter Plot 1", an x-axis selector 4106, a y-axis selector 4108, and a third add role selector 4110. The role associated with x-axis selector 4106 and y-axis selector 4108 may be changed, for example, as described with reference to category selector 1108 and measure selector 1110. Similar to selection of first add role selector 1618, selection of third add role selector 4110 allows the user to add another role to the associated graph element.

By default, x-axis selector 4106 may automatically share the category role used by line chart 1600 and the bar chart. In an illustrative embodiment, the role assigned to overview axis 3204 may be limited to the roles defined for the associated axis, such as x-axis 3212. For example, the roles selectable for overview axis 3204 in the illustrative embodiment of FIG. 41 may be associated with the x-axis role for line chart 1600 and/or for the bar chart. If there is only one role in use in first cell graph 1101, the role for overview axis 3204 may be presented statically.

Figure 42:
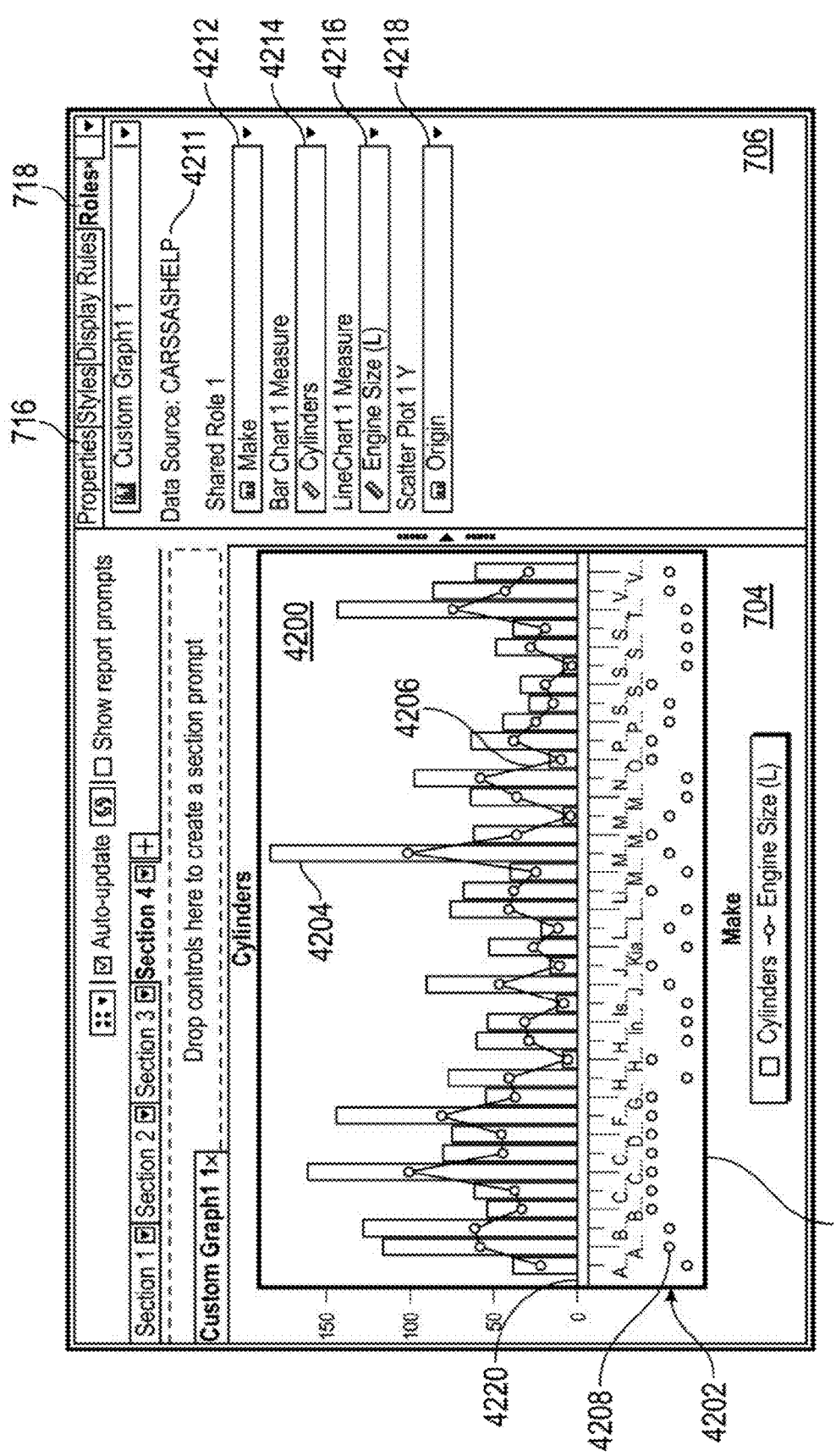
Figure 43:
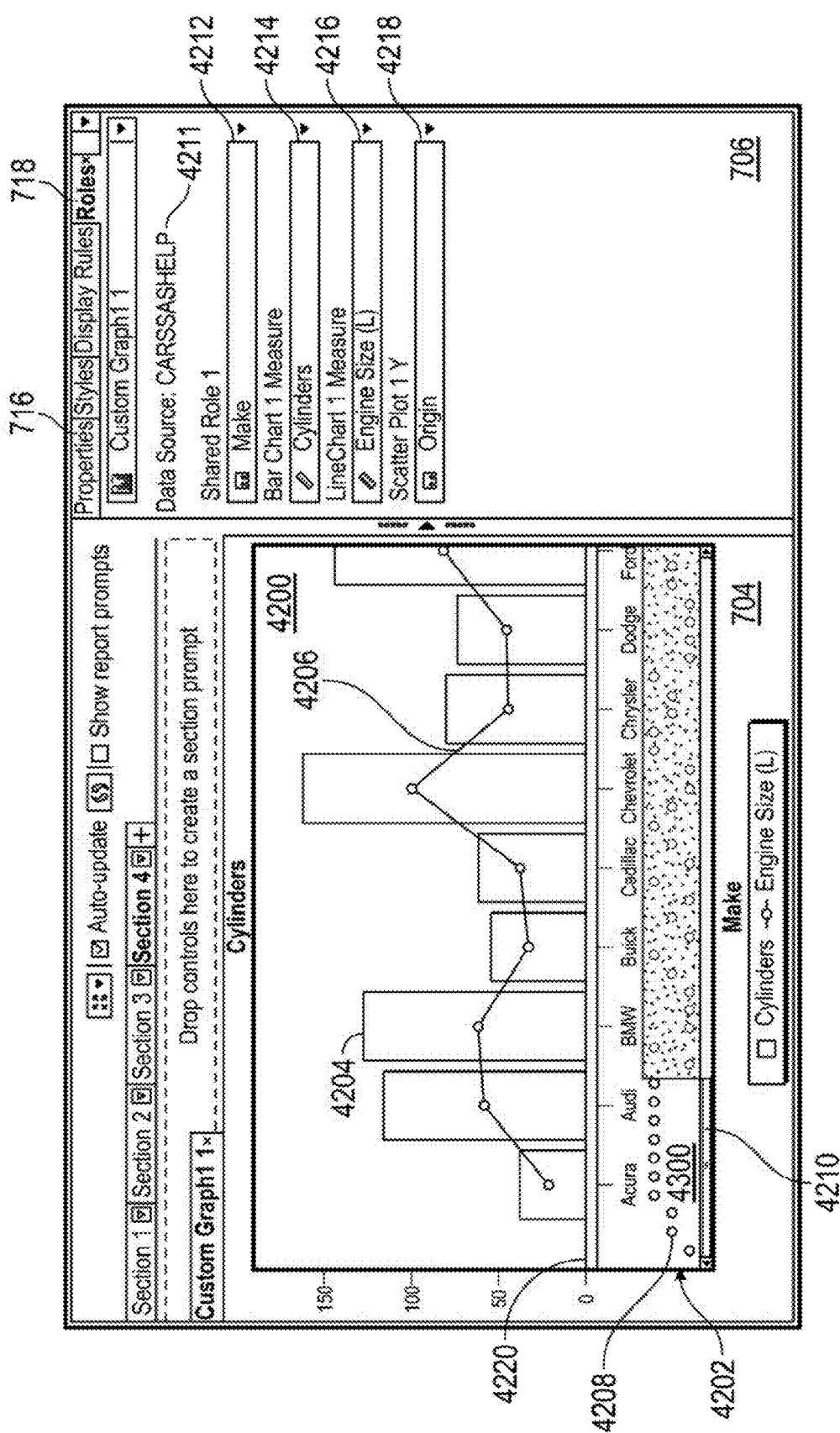
Figure 44:
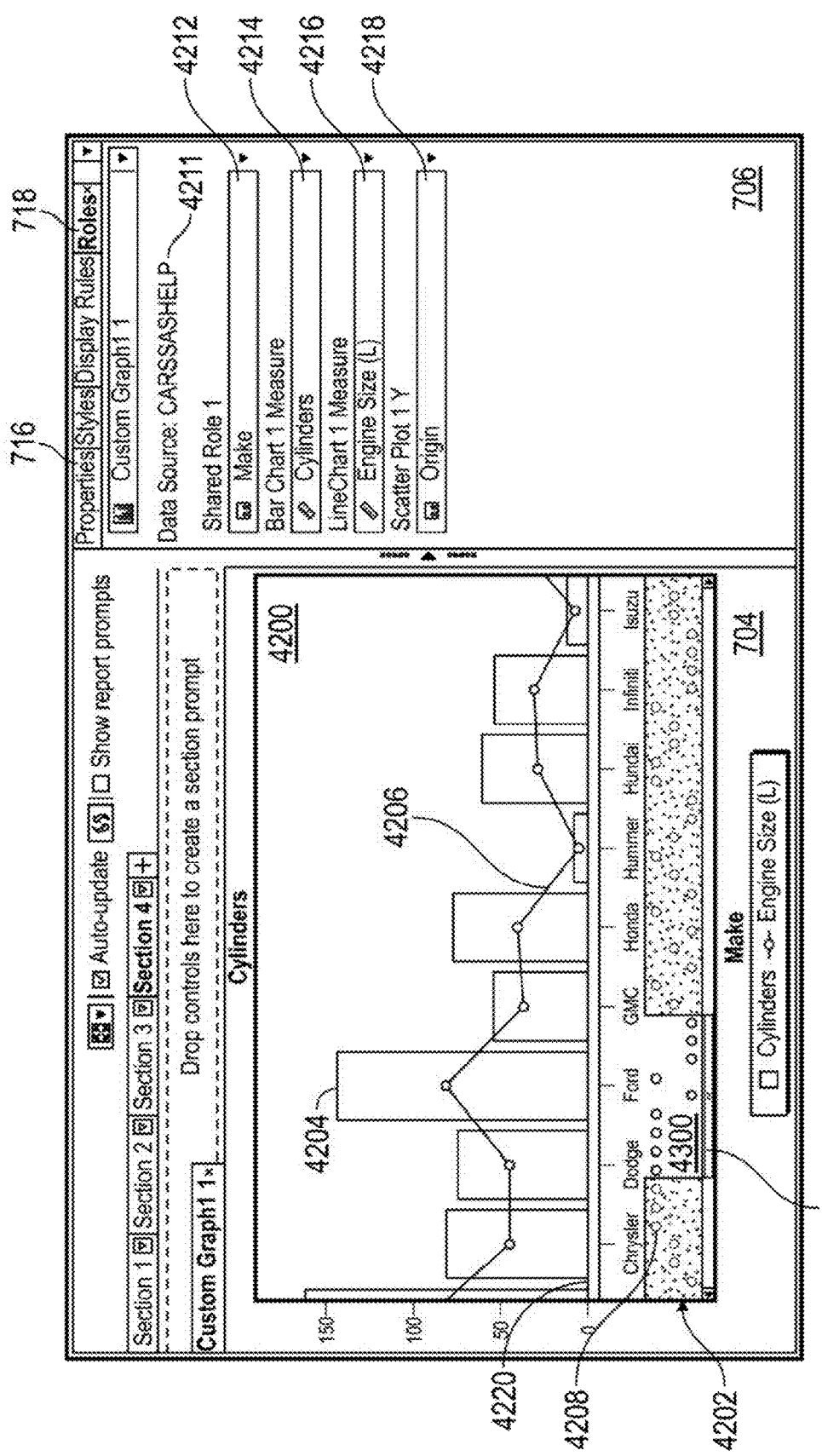

Referring to FIGS. 42-44, second canvas panel 704 and second customization panel 706 may be updated to reflect selection of graph object 1101 illustrated in FIG. 41 from second graph element type selectors 708 and assignment of data columns to the roles associated with graph object 1101. For example, second canvas panel 704 includes a car engine graph 4200 and a car overview axis 4202 rendered using data columns from a selected data source indicated by a "CARSSASHELP" dataset indicator 4211. Data columns from the selected data source are assigned to the roles as indicated in second customization panel 706. Instead of being rendered using sample data generated by graph design application 122 and graph renderer application 222 as shown in FIG. 41, car engine graph 4200 and car overview axis 4202 represent data generated external to graph design application 122 and graph renderer application 222. Car engine graph 4200 includes a cylinder bar chart 4204 and an engine size plot 4206. Car overview axis 4202 includes an origin scatter plot 4208 and a scroll bar 4210.

In the illustrative embodiment of FIG. 42, a "Shared Role 1" data column selector 4212 indicates that the data used to render a "Shared Role 1" between cylinder bar chart 4204, engine size plot 4206, and origin scatter plot 4208 is a make or manufacturer of a car. A "Bar Chart 1 Measure" data column selector 4214 indicates that the data used to render a "Bar Chart 1 Measure" role of cylinder bar chart 4204 is a number of cylinders of the car. A "Line Chart 1 Measure" data column selector 4216 indicates that the data used to render a "Line Chart 1 Measure" role of engine size plot 4206 is an engine size of the car. A "Scatter Plot 1 Y" data column selector 4218 indicates that the data used to render a "Scatter Plot 1 Y" role of origin scatter plot 4208 is an origin of the car. A different graph element type and different y-axis data is assigned to car overview axis 4202 relative to car engine graph 4200. Initially, an extent of car overview axis 4202 may be the same as an extent of an x-axis 4220 of car engine graph 4200.

Referring to FIG. 43, car overview axis 4202 is selected creating a highlighted portion 4300 of car overview axis 4202. Car engine graph 4200 is zoomed to show a portion of x-axis 4220 that corresponds to highlighted portion 4300 of car overview axis 4202. Highlighted portion 4300 of car overview axis 4202 provides an overview or context of what is being zoomed into in car engine graph 4200. Referring to FIG. 44, highlighted portion 4300 can be moved in a direction of x-axis 4220 to change a focus of the data presented in car engine graph 4200.

Referring to FIGS. 35-40, example operations associated with graph design application 122 are described. The example operations may be used to generate sample data when each graph element is added to or modified in graph object 1100. Additional, fewer, or different operations may be performed depending on the embodiment. The order of presentation of the operations of FIGS. 35-40 is not intended to be limiting. Although some of the operational flows are presented in sequence, the various operations may be performed in various repetitions, concurrently (in parallel, for example, using threads), and/or in other orders than those that are illustrated. For example, as described above, a user may execute graph design application 122, which causes presentation of a first user interface window, which may include a plurality of menus and selectors such as drop down menus, buttons, text boxes, hyperlinks, etc. associated with graph design application 122 as understood by a person of skill in the art. An indicator may indicate one or more user selections from a user interface, one or more data entries into a data field of the user interface, one or more data items read from computer-readable medium 108 or otherwise defined with one or more default values, etc. that are received as an input by graph design application 122.

Sample data generation occurs on demand for each graph element in graph object 1100. A goal of the sample data is to provide a good representation of the graph object 1100 for the purpose of the user making template design decisions. A sample dataset may be generated for each graph element of the plot, with the exception of the lattice role defined, for example using add lattice role selector 1616, which may use a single dataset for the entire graph object 1100. An input for each dataset generation task is the graph element type and the roles associated with that graph element type. Aspects needed to create a dataset include a column count, a column type, a column format, a column label, a number of observations, and data values determined for the number of observations for each column. Determination of the aspects may be based on complex interactions between role assignments, shared roles, and data types, which can be user defined or are a result of default behavior.

In an operation 3500, characteristics of graph object 1100 are received. For example, the characteristics include a definition of each graph element included in each cell, each role associated with each graph element, and/or each role associated with overview axis 3204. For example, the characteristics are defined by the user using the various windows and selectors described above and/or by graph design application 122 automatically as described above.

In operation 3502, graph elements are identified in graph object 1100.

In an operation 3504, roles are identified for the graph object from the received characteristics. For example, one or more x-axis roles, one or more y-axis roles, and/or one or more lattice roles may be identified for the graph object. The identified roles further may or may not be shared between graph elements.

In an operation 3506, counter values are initialized. For example, a repeat count, a minimum observation count $M_{nrc}$, and a number of unique classification crossings $N_{UCC}$ may be initialized. For example, the repeat count may be initialized to a value of one. Minimum observation count $M_{nrc}$ may be initialized to a value of one. $N_{UCC}$ may be initialized to one.

In an operation 3508, a role usage type is assigned to each role of the identified roles of the selected graph element. For example, roles may be partitioned by usage type as lattice, classification, analysis, or plot based on how a graph element uses that role. A graph object that includes a lattice role may be assigned a role usage type of lattice. A graph element that includes a role for classification may be assigned a role usage type of classification. A graph element that includes a role for analysis may be assigned a role usage type of analysis. Otherwise, a graph element that does not include a data type that is category or date-time may be assigned a role usage type of plot. Otherwise, a graph element that includes a data type that is category or date-time may be assigned a role usage type of plot if the data does not need to be summarized or may be assigned a role usage type of classification if the data needs to be summarized.

Shared roles are used in different ways by potentially different plots, so usage conflicts can occur. These are resolved by giving precedence in the order of classification, analysis, and plot, so a shared role that is used as a classification role usage type by one plot and as a plot role usage type by another is determined to have a role usage type of classification due to the precedence rules. A role usage type for any role assigned a role usage type of plot, having a data type of category or date-time, and for which data should be summarized, is assigned to have a role usage type of classification. The data type may be defined, for example, by classification selector 2504, second classification selector 2504, or third classification selector 3006.

For illustration, the role usage may be determined based on the role's graph element type and role type as indicated in Table VI below:

TABLE VI

| Graph Element Type | Role Type | Role Usage |
|---|---|---|
| Bar Chart | Category | Classification |
| | Measure | Analysis |
| | Target | Analysis |
| | Group | Classification |
| | Color | Analysis |
| | Data Tip | Plot |
| Waterfall Chart | Category | Classification |
| | Measure | Analysis |
| | Color | Analysis |
| | Data Tip | Plot |
| Line Chart | Category | Classification |
| | Measure | Analysis |
| | Group | Classification |
| | Data Tip | Plot |
| Pie Chart | Category | Classification |
| | Measure | Analysis |
| | Group | Classification |
| | Data Tip | Plot |
| Schedule Chart | Task | Classification |
| | Start | Plot |
| | Finish | Plot |
| | Group | Classification |
| | Data Label | Plot |
| | Data Tip | Plot |
| Scatter Plot | X | Plot |
| | Y | Plot |
| | Group | Classification |
| | Color | Plot |
| | Data Label | Plot |
| | Tip | Plot |
| Time Series Plot | Time | Plot |
| | Measure | Analysis |
| | Group | Classification |
| | Data Tip | Plot |
| Bubble Plot | X | Plot |
| | Y | Plot |
| | Size | Analysis |
| | Group | Classification |
| | Color | Plot |
| | Data Label | Plot |
| | Data Tip | Plot |
| Band Plot | X | Plot |
| | Upper Limit | Plot |
| | Lower Limit | Plot |
| | Group | Classification |
| | Data Tip | Plot |
| Needle Plot | X | Plot |
| | Y | Plot |
| | Color | Classification |
| | Data Tip | Plot |
| Step Plot | X | Plot |
| | Y | Plot |
| | Group | Classification |
| | Data Label | Plot |
| | Data Tip | Plot |
| Series Plot | X | Plot |
| | Y | Plot |
| | Color | Classification |
| | Data Label | Plot |
| | Data Tip | Plot |
| Vector Plot | X | Plot |
| | Y | Plot |
| | X Origin | Plot |
| | Y Origin | Plot |
| | Color | Classification |
| | Group | Classification |
| | Data Tip | Plot |
| Treemap | Tiles | Classification |
| | Size | Analysis |
| | Color | Analysis |
| | Data Tip | Plot |

Note that after the initial role usage is determined from Table VI, plot role usage may be modified by an extra post process step as follows: If the role type is set as 'Any classification', 'Category', or Datetime', AND the graph is summarizing, the role usage is changed from Plot to Classification as discussed above.

In an operation 3510, a determination is made concerning whether or not any lattice role is defined, for example using add lattice role selector 1616. If a lattice role is defined, processing continues in an operation 3600 shown with reference to FIG. 36. If a lattice role is not defined, processing continues in an operation 3512.

In operation 3512, a graph element is selected from the identified graph elements. For example, each graph element is processed successively. On each iteration, a next graph element is selected for processing from the identified graph elements.

In an operation 3514, a determination is made concerning whether or not any role of the identified roles of the selected graph element has a classification role usage type. If any role has a classification role usage type, processing continues in an operation 3700 shown with reference to FIG. 37 to process each role having the classification role usage type. If no role has a classification role usage type, processing continues in an operation 3516.

In operation 3516, a determination is made concerning whether or not any role of the identified roles of the selected graph element has an analysis role usage type. If any role has an analysis role usage type, processing continues in an operation 3800 shown with reference to FIG. 38 to process each role having the analysis role usage type. If no role has an analysis role usage type, processing continues in an operation 3518.

In an operation 3518, a determination is made concerning whether or not data is summarized. If data is summarized, processing continues in an operation 3520. If data is not summarized, processing continues in an operation 3522.

In operation 3520, a number of observations per classification, $N_{ObsC}$, is defined as one, $N_{ObsC}=1$, and processing continues in an operation 3530.

In operation 3522, a maximum observation count value of all roles having a plot role usage type, $N_{ObsX}$, is computed. For example, plot role usage type, $N_{ObsX}$, may be computed by selecting a value from a table such as Table VII below using a graph element type and a role type as indices:

TABLE VII

| Graph Element Type | Role Type | $N_{ObsX}$ |
|---|---|---|
| Band Plot | X | 10 |
| Time Series | Time | 20 |
| All others | | 1 |

In an operation 3524, a determination is made concerning whether or not any role has a classification role usage type. If any role has a classification role usage type, processing continues in an operation 3526. If no role has a classification role usage type, processing continues in an operation 3528.

In operation 3526, $N_{ObsC}=\max(2, N_{ObsX})$, and processing continues in operation 3530.

In operation 3528, $N_{ObsC}=\max(6, N_{ObsX})$, and processing continues in operation 3530.

In operation 3530, a determination is made concerning whether or not any role of the identified roles of the selected graph element has a plot role usage type. If any role has a plot role usage type, processing continues in an operation 3900 shown with reference to FIG. 39 to process each role having the plot role usage type. If no role has a plot role usage type, processing continues in an operation 4000 shown with reference to FIG. 40 to generate observation data values for each row and column of the dataset.

Processing in FIGS. 36-39 define processing for data lattice roles, classification role usage types, analysis role usage types, and plot role usage types, respectively, for each graph element and role identified for graph object 1100.

Figure 36:
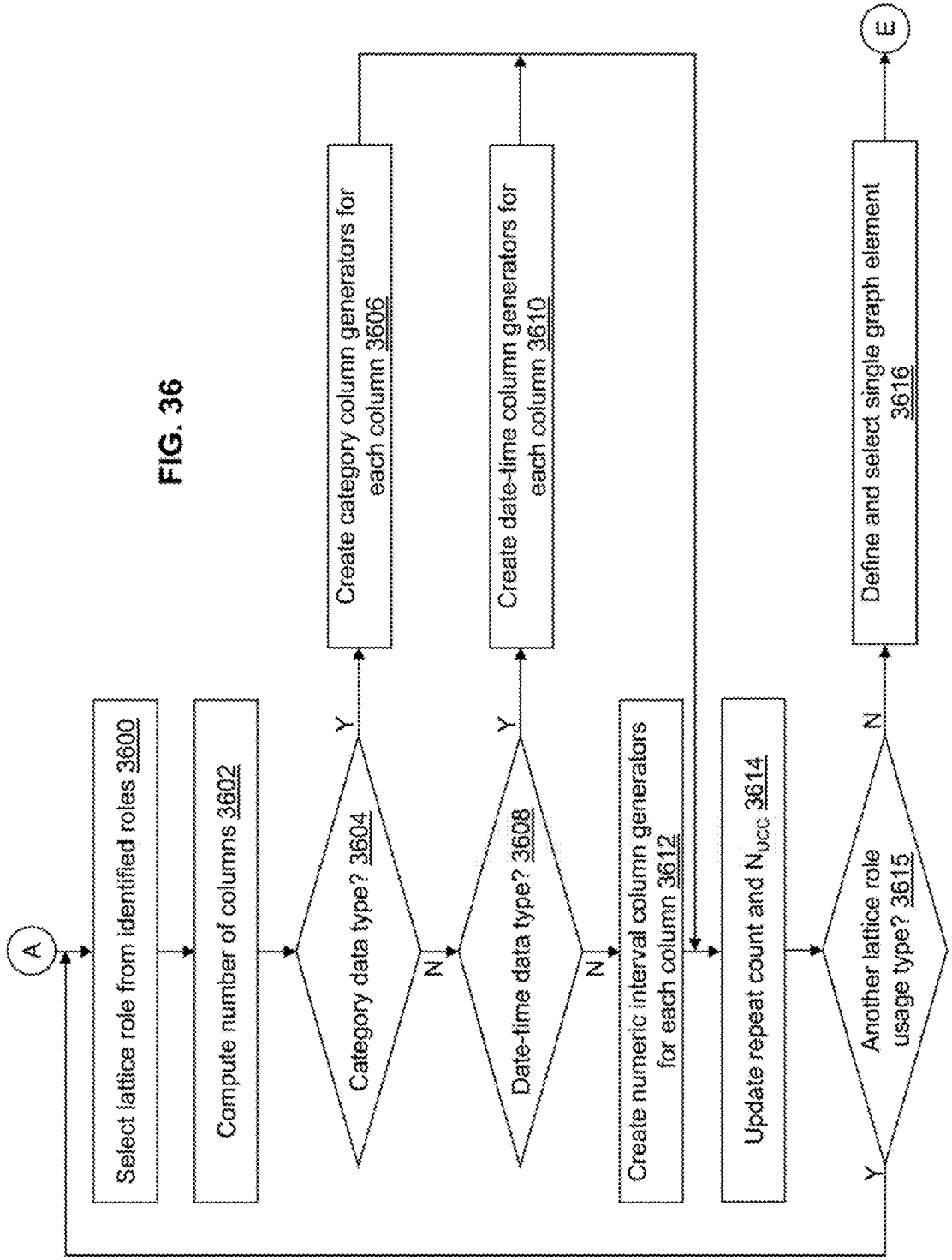

Referring to FIG. 36, additional example operations associated with graph design application 122 are described to create column generators for data lattice roles. In operation 3600, a lattice role is selected.

In an operation 3602, a number of columns for the lattice role is computed. The number of columns is one unless the selected lattice role supports multiple data assignments, for example, as indicated based on third assignment selector 3010. The number of columns is two when the selected lattice role supports multiple data assignments. Columns can have either a "String" type or a "Numeric" type based on the role usage as well as the role's data type.

In an operation 3604, a determination is made concerning whether or not a data type of the lattice role is category. If a data type of the lattice role is category, processing continues in an operation 3606. If a data type of the lattice role is not category, processing continues in an operation 3608.

In operation 3606, a category column generator is created for each of the number of columns computed in operation 3602. By default, the created category column generator may include a number of observation values $R_C$ equal to two, have a column type of "String", no column format, and a label set as a variation of the role label defined by the user or automatically. For example, when two columns are created, each column label is suffixed with a number indicating which one it is (e.g., "Bar Response 1", "Bar Response 2"). Processing continues in an operation 3614.

In an operation 3608, a determination is made concerning whether or not a data type of the lattice role is date-time. If a data type of the lattice role is date-time, processing continues in an operation 3610. If a data type of the lattice role is not date-time, processing continues in an operation 3612.

In operation 3610, a date-time column generator is created for each of the number of columns computed in operation 3602. By default, the created date-time column generator may include the number of observation values $R_C$ equal to two, have a column type of "Numeric", and a label set as a variation of the role label defined by the user or automatically. The column format for each column of the created date-time column generator may be a year format with an offset of a year. Processing continues in operation 3614.

In operation 3612, a numeric interval column generator is created for each of the number of columns computed in operation 3602. By default, the created numeric interval column generator may include the number of observation values $R_C$ equal to two, have a column type of "Numeric", no column format, and a label set as a variation of the role label defined by the user or automatically. Processing continues in operation 3614.

In operation 3614, the repeat count and $N_{UCC}$ are updated. For example, the repeat count may be updated by multiplying the current repeat count value by $R_C$. $N_{UCC}$ may be updated by adding $R_C$ to the current value of $N_{UCC}$.

In operation 3615, a determination is made concerning whether or not another lattice role is defined. For example, a data lattice role can be defined for a row or a column using second role type selector 3002. If another lattice role is defined, processing continues in operation 3600 to process the other lattice role. If another lattice role is not defined, processing continues in an operation 3616.

In operation 3616, a single graph element is defined that includes any other roles defined for graph object 1100, and processing continue in operation 3514 to select and process any other roles defined for graph object 1100.

Figure 37:
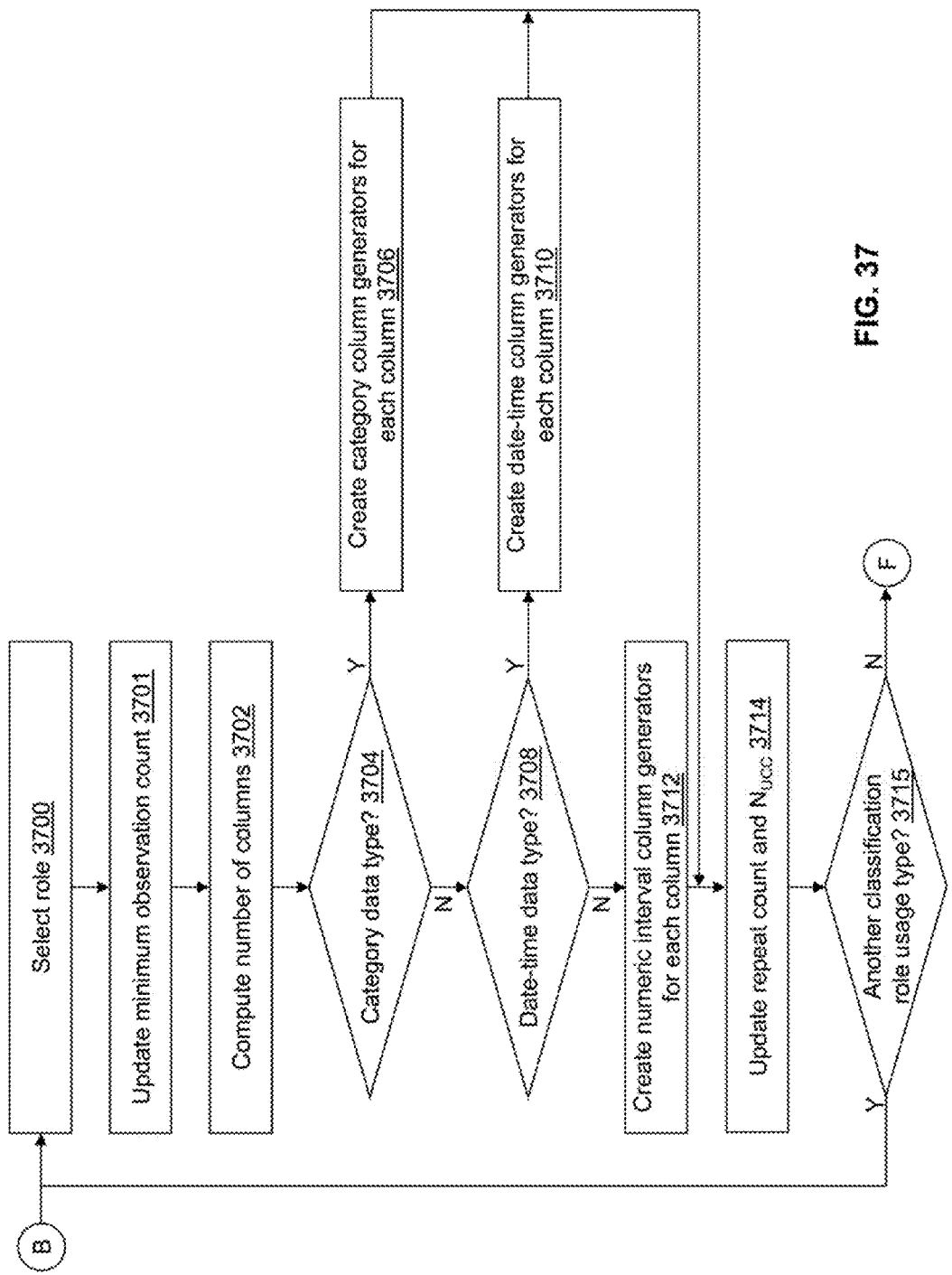

Referring to FIG. 37, additional example operations associated with graph design application 122 are described to create column generators for roles having a classification role usage type. In operation 3700, a role is selected from the roles having a classification role usage type.

In an operation 3701, a minimum observation count $M_{nrc}$ is updated. For example, the value of $M_{nrc}$ may be updated as a maximum of the current value of $M_{nrc}$ and a selection from Table VIII based on each graph element type using the selected role.

TABLE VIII

| Graph element type | $M_{nrc}$ |
|---|---|
| Horizontal Bar | 1 |
| Vertical Bar | 1 |
| Line | 1 |
| Waterfall | 1 |
| Scatter | 1 |
| Time series | 20 |
| Bubble | 1 |
| Band | 10 |
| Needle | 1 |
| Step | 1 |
| Schedule | 1 |

In an operation 3702, a number of columns is computed. The number of columns is one unless the selected role supports multiple data assignments, for example, as indicated based on assignment selector 2508 or second assignment selector 2810. The number of columns is two when the selected role supports multiple data assignments.

In an operation 3704, a determination is made concerning whether or not a data type of the selected role is category. If a data type of the selected role is category, processing continues in an operation 3706. If a data type of the selected role is not category, processing continues in an operation 3708.

In operation 3706, a category column generator is created for each of the number of columns computed in operation 3702. By default, the created category column generator may include the number of observation values $R_C$ equal to max(3, $M_{nrc}$), have a column type of "String", no column format, and a label set as a variation of the role label defined by the user or automatically. Processing continues in an operation 3714.

In an operation 3708, a determination is made concerning whether or not a data type of the selected role is date-time. If a data type of the selected role is date-time, processing continues in an operation 3710. If a data type of the selected role is not date-time, processing continues in an operation 3712.

In operation 3710, a date-time column generator is created for each of the number of columns computed in operation 3702. By default, the created date-time column generator may include the number of observation values $R_C$ equal to max(10, $M_{nrc}$), have a column type of "Numeric", and a label set as a variation of the role label defined by the user or automatically. The column format for each column of the created date-time column generator may be a day format with an offset of a day. Processing continues in operation 3714.

In operation 3712, a numeric interval column generator is created for each of the number of columns computed in operation 3702. By default, the created numeric interval column generator may include number of observation values $R_C$ equal to max(3, $M_{nrc}$), have a column type of "Numeric", no column format, and a label set as a variation of the role label defined by the user or automatically. A minimum value may be defined as one with an increment value of one. Processing continues in operation 3714.

In operation 3714, the repeat count and $N_{UCC}$ are updated. For example, the repeat count may be updated by multiplying the current repeat count value by $R_C$. $N_{UCC}$ may be updated by adding $R_C$ to the current value of $N_{UCC}$.

In an operation 3715, a determination is made concerning whether or not another role having the classification role usage type is defined. If another role is defined, processing continues in operation 3700. If another role is not defined, processing continues in operation 3516.

Figure 38:
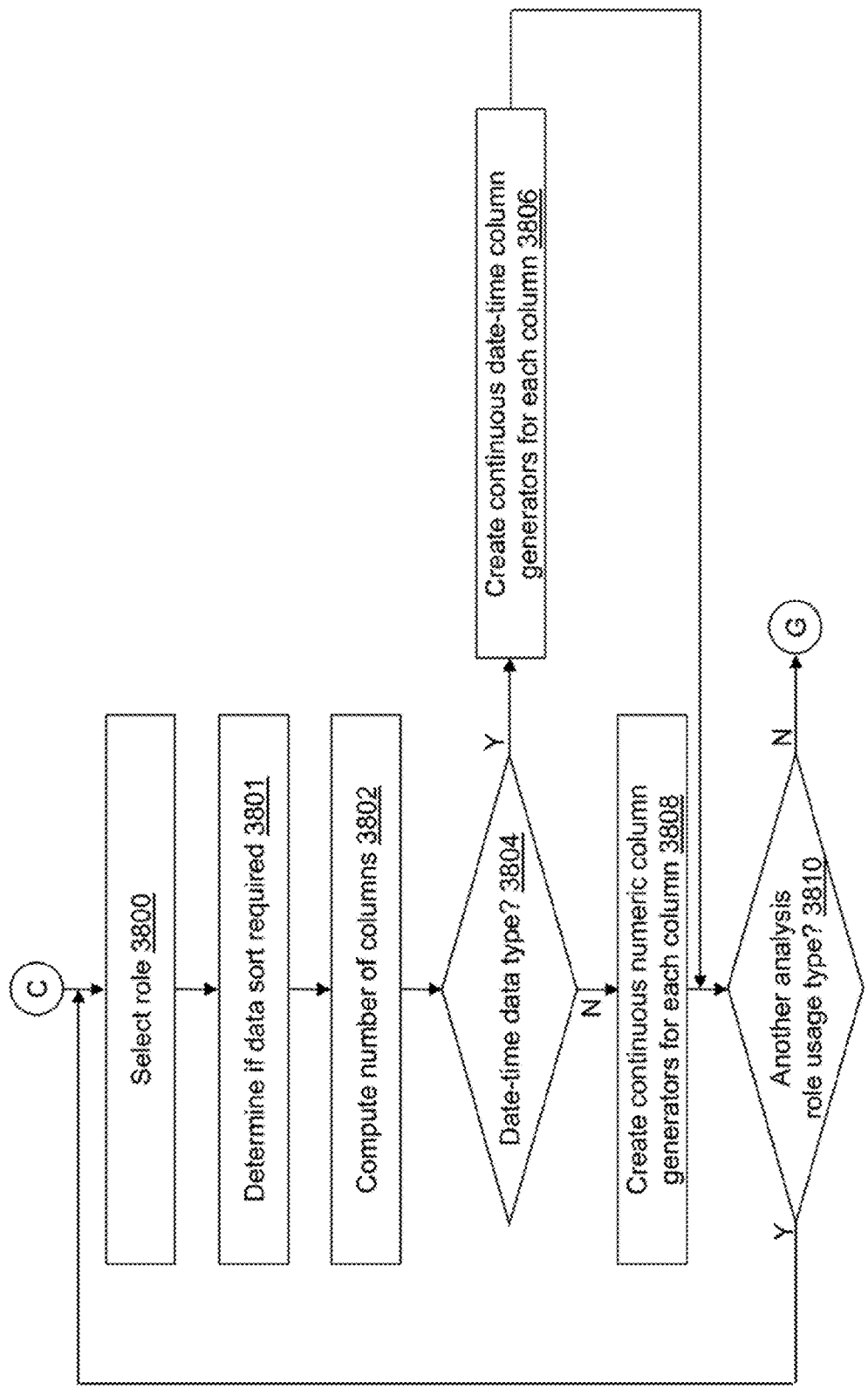

Referring to FIG. 38, additional example operations associated with graph design application 122 are described to create column generators for roles having an analysis role usage type. In operation 3800, a role is selected from the roles having an analysis role usage type.

In an operation 3801, a data sort requirement is determined as true or false. For example, if any graph element type using the selected role requires sorted data, the data sort requirement is determined as true. Graph element types that require sorted data include the "Band" graph element type and the "Step" graph element type.

In an operation 3802, a number of columns is computed. The number of columns is one unless the selected role supports multiple data assignments, for example, as indicated based on assignment selector 2508 or second assignment selector 2810. The number of columns is two when the selected role supports multiple data assignments.

In an operation 3804, a determination is made concerning whether or not a data type of the selected role is date-time. If a data type of the selected role is date-time, processing continues in an operation 3806. If a data type of the selected role is not date-time, processing continues in an operation 3808.

In operation 3806, a continuous date-time column generator is created for each of the number of columns computed in operation 3802. The column format for each column of the created date-time column generator may be a time format. Processing continues in operation 3810.

In operation 3808, a continuous numeric column generator is created for each of the number of columns computed in operation 3802. A minimum value may be defined as zero and a maximum value may be defined as 100. Processing continues in operation 3810.

In operation 3810, a determination is made concerning whether or not another role having the analysis role usage type is defined. If another role is defined, processing continues in operation 3800. If another role is not defined, processing continues in operation 3530.

Figure 39:
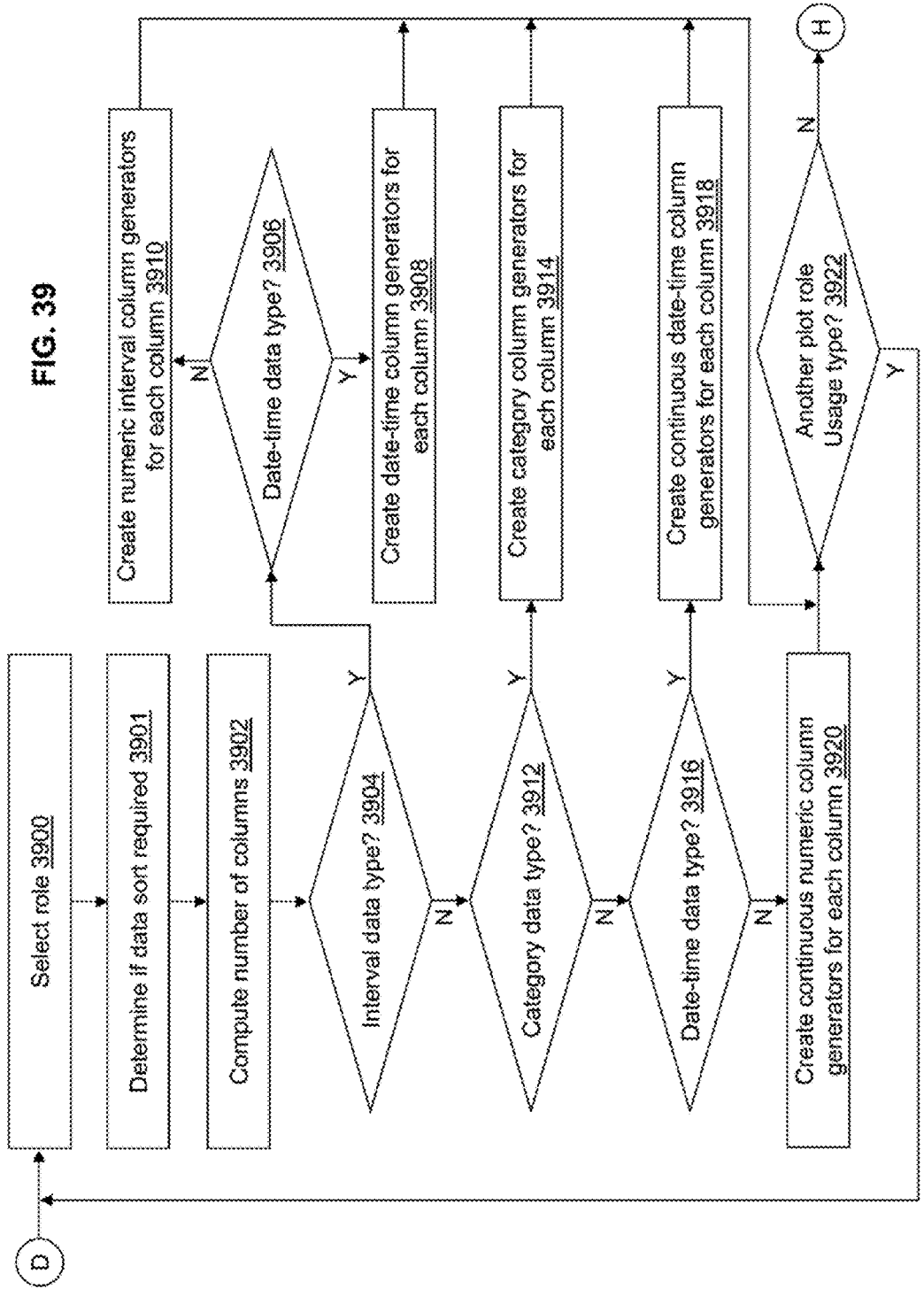

Referring to FIG. 39, additional example operations associated with graph design application 122 are described to create column generators for roles having a plot role usage type. In operation 3900, a role is selected from the roles having a plot role usage type.

In an operation 3901, a data sort requirement is determined as true or false. For example, if any graph element type using the selected role requires sorted data, the data sort requirement is determined as true. Graph element types that require sorted data include the "Band" graph element type and the "Step" graph element type.

In an operation 3902, a number of columns is computed. The number of columns is one unless the selected role supports multiple data assignments, for example, as indicated based on assignment selector 2508 or second assignment selector 2810. The number of columns is two when the selected role supports multiple data assignments.

In an operation 3904, a determination is made concerning whether or not a data type of the selected role is interval. If a data type of the selected role is interval, processing continues in an operation 3906. If a data type of the selected role is not interval, processing continues in an operation 3912. For example, a table lookup by graph element type and data type may be performed to determine if a data type of the selected role is interval. For illustration, a "Band" graph element type "X" role and "Y" role may be defined as interval, and a "Time Series" graph element type "Time" role may be defined as interval.

In an operation 3906, a determination is made concerning whether or not a data type of the selected role is date-time. If a data type of the selected role is date-time, processing continues in an operation 3908. If a data type of the selected role is not date-time, processing continues in an operation 3910.

In operation 3908, a date-time column generator is created for each of the number of columns computed in operation 3902. By default, the created date-time column generator may include the number of observations per classification $N_{ObsC}$, have a column type of "Numeric", and a label set as a variation of the role label defined by the user or automatically. The column format for each column of the created date-time column generator is day format with an offset of a day. Processing continues in an operation 3922.

In operation 3910, a numeric interval column generator is created for each of the number of columns computed in operation 3902. By default, the created numeric interval column generator may include the number of observations per classification $N_{ObsC}$, have a column type of "Numeric", no column format, and a label set as a variation of the role label defined by the user or automatically. A minimum value may be defined as one with an increment value of ten. Processing continues in operation 3922.

In operation 3912, a determination is made concerning whether or not a data type of the selected role is category. If a data type of the selected role is category, processing continues in an operation 3914. If a data type of the selected role is not category, processing continues in an operation 3916.

In operation 3914, a category column generator is created for each of the number of columns computed in operation 3902. By default, the created category column generator may include the number of observations per classification $N_{ObsC}$, have a column type of "String", no column format, and a label set as a variation of the role label defined by the user or automatically. Processing continues in operation 3922.

In operation 3916, a determination is made concerning whether or not a data type of the selected role is date-time. If a data type of the selected role is date-time, processing continues in an operation 3918. If a data type of the selected role is not date-time, processing continues in an operation 3920.

In operation 3918, a continuous date-time column generator is created for each of the number of columns computed in operation 3902. By default, the created date-time column generator may include a label set as a variation of the role label defined by the user or automatically. The column format for each column of the created date-time column generator may be a time format. Processing continues in operation 3922.

In operation 3920, a continuous numeric column generator is created for each of the number of columns computed in operation 3902. By default, the created numeric interval column generator may have a column type of "Numeric", no column format, and a label set as a variation of the role label defined by the user or automatically. A minimum value may be defined as zero and a maximum value may be defined as 100. Processing continues in operation 3922.

In operation 3922, a determination is made concerning whether or not another role having a plot role usage type is defined. If another role is defined, processing continues in operation 3900. If another role is not defined, processing continues in operation 4000 to generate observation data values for each row and column of the dataset.

Figure 40:
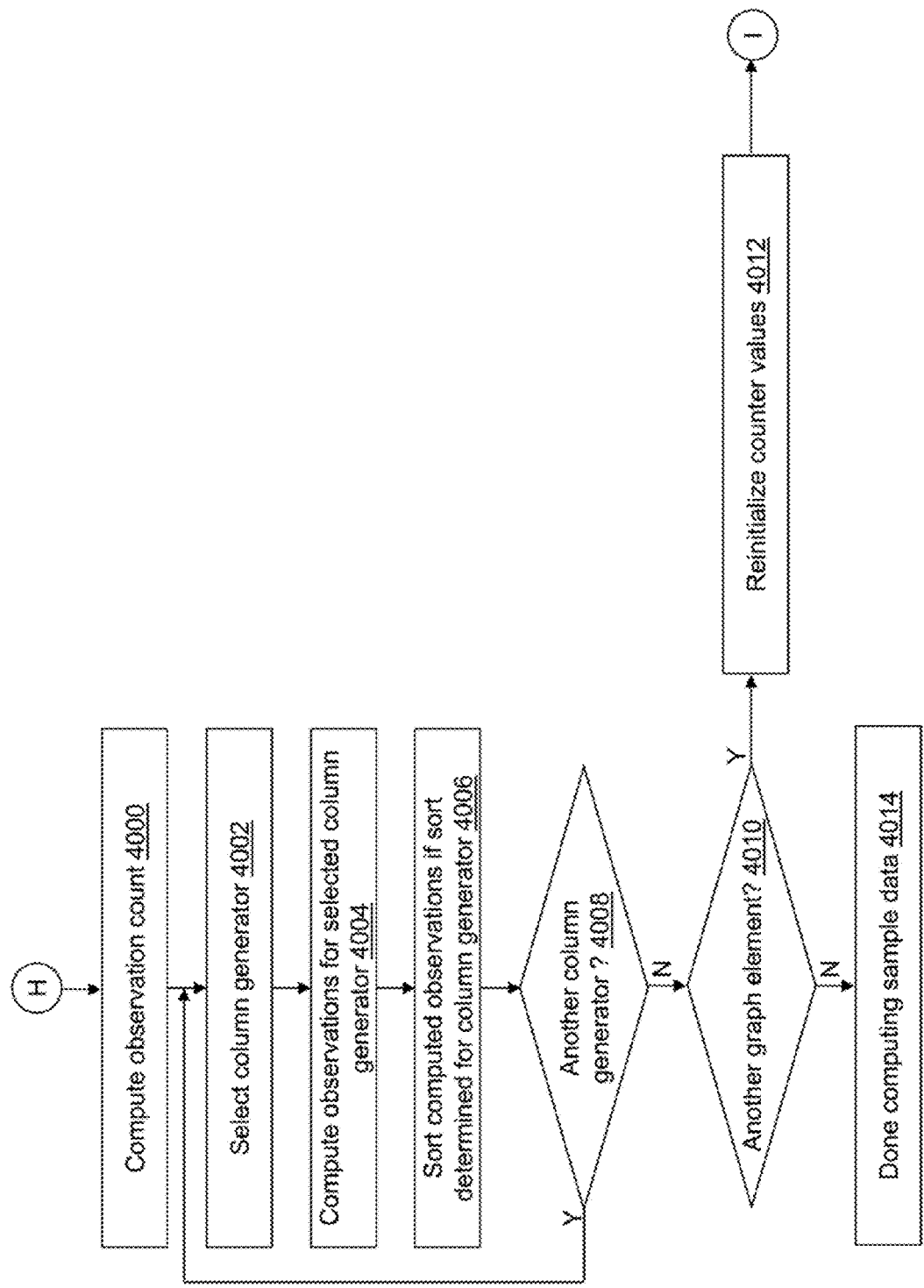

Referring to FIG. 40, additional example operations associated with graph design application 122 are described to create a dataset.

In operation 4000, an observation count is determined as $N_{ObsC} * N_{UCC}$.

In an operation 4002, a column generator is selected from the column generators defined in FIGS. 36-39. In an operation 4004, a column of observation data values is computed and stored to a dataset based on the type of column generator and the parameters such as column format, column type, and column label defined when the column generator was created. A number of observations equal to the determined observation count is created for each column. The column of observations uses the column type, column format, and column label defined for the column generator to generate the observation data values.

For a continuous numeric column generator, a random number within a specified range defined based on the minimum value and the maximum value is computed for each observation of the determined observation count. A continuous numeric column generator can compute values that are bound (upper/lower) by the values of another column generator's values. For example, for the "Band" graph element type, the $i^{th}$ value of an upper bound is greater than the $i^{th}$ value of a lower bound.

For a continuous date-time column generator, a random number within a specified range is computed for each observation of the determined observation count. The specified range has a minimum value of 30 days prior to a current date and a maximum value of the current date.

A numeric interval column generator computes a sorted run of numbers. Each run starts at the specified minimum value and increments by the specified increment value N times where N is the repeat count. The runs are repeated to fill the column with the number of observations.

A date-time column generator computes date/time formatted columns where the values are defined for evenly spaced intervals based on the offset specified for the date-time column generator and with a starting value of the current date.

A category column generator computes string columns, where the data values are a combination of a root string prefix and a numeric suffix, enumerated by the number of desired unique values. For example, "category 1", "category 2", etc. Each generator repeats each unique value N times before moving to the next value where N is the repeat count. When the generator runs out of unique values it starts over. This allows for the total of all column generators to compute the appropriate combination of all classification values across all rows. Table IX illustrates this process with 3 classifier columns each with 2 values and with repeat counts of 1, 2, and 4 respectively.

TABLE IX

| Column 1 | Column 2 | Column 3 |
|---|---|---|
| A | N | X |
| B | N | X |
| A | O | X |
| B | O | X |
| A | N | Y |
| B | N | Y |
| A | O | Y |
| B | O | Y |

In an operation 4006, the computed column of observation data values is sorted if the data sort requirement is determined as true for the column generator.

In an operation 4008, a determination is made concerning whether or not another column generator was created. If another column generator was created, processing continues in operation 4002 to select the next column generator. If another column generator was not created, processing continues in an operation 4010.

In operation 4010, a determination is made concerning whether or not there is another graph element of the identified graph elements to process. If there is another graph element to process, processing continues in an operation 4012. If there is not another graph element of the identified graph elements to process, processing continues in an operation 4014.

In operation 4012, the counter values are reinitialized. For example, the repeat count, the minimum observation count $M_{nrc}$, and the number of unique classification crossings $N_{UCC}$ may be reinitialized. For example, the repeat count may be reinitialized to a value of one. Minimum observation count $M_{nrc}$ may be reinitialized to a value of one. $N_{UCC}$ may be reinitialized to one. Processing continues in operation 3512 to create another dataset for the next graph element In operation 4014, computation of the sample data is complete, and the created dataset(s) is(are) used to plot the graph elements in canvas panel 404. Each time an instance of a graph element type is moved or copied from one cell to another or added to a cell, a new dataset(s) is(are) created by repeating the operations of one or more of FIGS. 35-40.

The described techniques and systems use less computer memory, provide more efficient communications, and result in faster computer processing times than previous designs. The described techniques and systems further support the interactive creation of data independent graph templates for reuse of the templates with different data to quickly and consistently create similarly structured graphs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
receive a first indicator indicating a first graph element type to present in a canvas panel;
generate first sample data to render a first instance of the first graph element type;
render the first instance of the first graph element type in the canvas panel using the generated first sample data;
render a second instance of the first graph element type as part of an overview axis using the generated first sample data, wherein the overview axis provides an overview of the first instance of the first graph element type rendered in the canvas panel and includes a scroll bar positioned in the canvas panel adjacent to an axis of the rendered first instance of the first graph element type and as an axis of the second instance of the first graph element type, wherein when used, selection and movement of an edge of the scroll bar of the overview axis results in corresponding movement of a scale of the axis of the rendered first instance of the first graph element type and does not change a scale of the axis of the rendered second instance of the first graph element type;
receive a second indicator indicating a second graph element type as a basis for presenting the second instance of the first graph element type as part of the overview axis, wherein the second graph element type is a different graph element type from the first graph element type;
generate second sample data to render a first instance of the second graph element type; and
render the first instance of the second graph element type, using the generated second sample data, as part of the overview axis to replace the rendered second instance of the first graph element type.

2. The non-transitory computer-readable medium of claim 1, wherein before generating the second sample data, the computer-readable instructions further cause the computing device to determine that the first graph element type and the second graph element type are compatible.

3. The non-transitory computer-readable medium of claim 2, wherein determining compatibility is based on an axis role classification overlapping by at least one option for each axis of the first graph element type and the second graph element type.

4. The non-transitory computer-readable medium of claim 3, wherein the axis role classification is selected from the group consisting of category, date-time and measure.

5. The non-transitory computer-readable medium of claim 1, wherein the overview axis is positioned in the canvas panel adjacent an x-axis of the first instance of the first graph element type.

6. The non-transitory computer-readable medium of claim 1, wherein the overview axis is positioned in the canvas panel adjacent a y-axis of the first instance of the first graph element type.

7. The non-transitory computer-readable medium of claim 1, further comprising computer-readable instructions that, when executed by the computing device, cause the computing device to:
receive a third indicator indicating a third graph element type to present as part of the overview axis overlaid with the first instance of the second graph element type;
determine that the second graph element type and the third graph element type are incompatible for overlaying in the overview axis; and
generate an incompatibility indicator that indicates the third graph element type is incompatible with the first graph element type.

8. The non-transitory computer-readable medium of claim 1, further comprising computer-readable instructions that, when executed by the computing device, cause the computing device to:
receive a third indicator indicating a third graph element type to present as part of the overview axis overlaid with the first instance of the second graph element type;
determine that the second graph element type and the third graph element type are compatible for overlaying in the overview axis;
generate third sample data to render an instance of the third graph element type; and
render the instance of the third graph element type overlaid with the first instance of the second graph element type as part of the overview axis using the generated third sample data.

9. The non-transitory computer-readable medium of claim 8, wherein the first graph element type and the third graph element type are the same graph element type.

10. The non-transitory computer-readable medium of claim 8, wherein the first graph element type and the third graph element type are different graph element types.

11. The non-transitory computer-readable medium of claim 8, wherein the second graph element type and the third graph element type are different graph element types.

12. The non-transitory computer-readable medium of claim 8, further comprising computer-readable instructions that, when executed by the computing device, cause the computing device to:
receive a fourth indicator indicating removal of the second graph element type from the overview axis; and
remove the instance of the second graph element type from the overview axis.

13. The non-transitory computer-readable medium of claim 1, wherein the rendered second instance of the first graph element type is removed from the overview axis after receiving the second indicator.

14. The non-transitory computer-readable medium of claim 1, further comprising computer-readable instructions that, when executed by the computing device, cause the computing device to:
store characteristics describing the first instance of the first graph element type and the first instance of the second graph element type in a graph design template;
present a window in a display that includes an indicator of the stored characteristics;
receive a third indicator indicating dropping of the indicator of the stored characteristics into a second canvas panel;

generate third sample data to render a third instance of the first graph element type in the second canvas panel; and render the third instance of the first graph element type in the second canvas panel using the generated third sample data;

generate fourth sample data to render a second instance of the second graph element type as part of a second overview axis of the second canvas panel; and render the second instance of the second graph element type as part of the second overview axis of the second canvas panel using the generated fourth sample data.

15. The non-transitory computer-readable medium of claim 14, further comprising computer-readable instructions that, when executed by the computing device, cause the computing device to:

present a second window in the display that includes an indicator of data columns stored in a dataset;

receive a fourth indicator indicating selection of a first data column of the data columns for the axis of the first graph element type and of the second graph element type;

receive a fifth indicator indicating selection of a second data column of the data columns for a second axis of the first graph element type;

receive a sixth indicator indicating selection of a third data column of the data columns for a second axis of the second graph element type;

render a fourth instance of the first graph element type in the second canvas panel using data from the first data column and from the second data column; and render a third instance of the second graph element type as part of the second overview axis of the second canvas panel using data from the first data column and from the third data column.

16. The non-transitory computer-readable medium of claim 15, further comprising, after rendering the third instance of the second graph element type in the second overview axis of the second canvas panel, computer-readable instructions that, when executed by the computing device, cause the computing device to:

present a second scroll bar as an axis of the third instance of the second graph element type of the second overview axis of the second canvas panel, wherein the second overview axis of the second canvas panel provides an overview of the fourth instance of the first graph element type rendered in the second canvas panel, wherein when used, selection and movement of the second scroll bar results in corresponding movement of a scale of the axis of the fourth instance of the first graph element type; and change a scale of the axis of the fourth instance of the first graph element type in the second canvas panel in response to movement of the presented second scroll bar, wherein the axis of the fourth instance is parallel to the axis of the third instance of the second graph element type of the second overview axis of the second canvas panel.

17. A computing device comprising:

a processor; and a non-transitory computer-readable medium operably coupled to the processor, the computer-readable medium having computer-readable instructions stored thereon that, when executed by the processor, cause the computing device to receive a first indicator indicating a first graph element type to present in a canvas panel;

generate first sample data to render a first instance of the first graph element type;

render the first instance of the first graph element type in the canvas panel using the generated first sample data;

render a second instance of the first graph element type as part of an overview axis using the generated first sample data, wherein the overview axis provides an overview of the first instance of the first graph element type rendered in the canvas panel and includes a scroll bar positioned in the canvas panel adjacent to an axis of the rendered first instance of the first graph element type and as an axis of the second instance of the first graph element type, wherein when used, selection and movement of an edge of the scroll bar of the overview axis results in corresponding movement of a scale of the axis of the rendered first instance of the first graph element type and does not change a scale of the axis of the rendered second instance of the first graph element type;

receive a second indicator indicating a second graph element type as a basis for presenting the second instance of the first graph element type as part of the overview axis, wherein the second graph element type is a different graph element type from the first graph element type;

generate second sample data to render a first instance of the second graph element type; and render the first instance of the second graph element type, using the generated second sample data, as part of the overview axis to replace the rendered second instance of the first graph element type.

18. A method of rendering an overview axis, the method comprising:

receiving a first indicator indicating a first graph element type to present in a canvas panel;

generating, by a computing device, first sample data to render a first instance of the first graph element type;

rendering, by the computing device, the first instance of the first graph element type in the canvas panel using the generated first sample data;

rendering, by the computing device, a second instance of the first graph element type as part of an overview axis using the generated first sample data, wherein the overview axis provides an overview of the first instance of the first graph element type rendered in the canvas panel and includes a scroll bar positioned in the canvas panel adjacent to an axis of the rendered first instance of the first graph element type and as an axis of the second instance of the first graph element type, wherein when used, selection and movement of an edge of the scroll bar of the overview axis results in corresponding movement of a scale of the axis of the rendered first instance of the first graph element type and does not change a scale of the axis of the rendered second instance of the first graph element type;

receiving a second indicator indicating a second graph element type as a basis for presenting the second instance of the first graph element type as part of the overview axis, wherein the second graph element type is a different graph element type from the first graph element type;

generating, by the computing device, second sample data to render a first instance of the second graph element type; and rendering, by the computing device, the first instance of the second graph element type, using the generated second sample data, as part of the overview axis to replace the rendered second instance of the first graph element type.

19. The computing device of claim 17, further comprising computer-readable instructions that, when executed by the computing device, cause the computing device to:
receive a third indicator indicating a third graph element type to present as part of the overview axis overlaid with the first instance of the second graph element type;
determine that the second graph element type and the third graph element type are incompatible for overlaying in the overview axis; and
generate an incompatibility indicator that indicates the third graph element type is incompatible with the first graph element type.

20. The computing device of claim 17, further comprising computer-readable instructions that, when executed by the computing device, cause the computing device to:
receive a third indicator indicating a third graph element type to present as part of the overview axis overlaid with the first instance of the second graph element type;
determine that the second graph element type and the third graph element type are compatible for overlaying in the overview axis;
generate third sample data to render an instance of the third graph element type; and
render the instance of the third graph element type overlaid with the first instance of the second graph element type as part of the overview axis using the generated third sample data.

21. The computing device of claim 20, further comprising computer-readable instructions that, when executed by the computing device, cause the computing device to:
receive a fourth indicator indicating removal of the second graph element type from the overview axis; and
remove the instance of the second graph element type from the overview axis.

22. The computing device of claim 17, wherein the rendered second instance of the first graph element type is removed from the overview axis after receiving the second indicator.

23. The method of claim 18, further comprising:
receiving a third indicator indicating a third graph element type to present as part of the overview axis overlaid with the first instance of the second graph element type;
determining that the second graph element type and the third graph element type are incompatible for overlaying in the overview axis; and
generating an incompatibility indicator that indicates the third graph element type is incompatible with the first graph element type.

24. The method of claim 18, further comprising:
receive a third indicator indicating a third graph element type to present as part of the overview axis overlaid with the first instance of the second graph element type;
determine that the second graph element type and the third graph element type are compatible for overlaying in the overview axis;
generate third sample data to render an instance of the third graph element type; and
render the instance of the third graph element type overlaid with the first instance of the second graph element type as part of the overview axis using the generated third sample data.

25. The method of claim 24, further comprising:
receive a fourth indicator indicating removal of the second graph element type from the overview axis; and
remove the instance of the second graph element type from the overview axis.

26. The method of claim 18, wherein the rendered second instance of the first graph element type is removed from the overview axis after receiving the second indicator.

27. The method of claim 18, further comprising:
storing characteristics describing the first instance of the first graph element type and the first instance of the second graph element type in a graph design template;
presenting a window in a display that includes an indicator of the stored characteristics;
receiving a third indicator indicating dropping of the indicator of the stored characteristics into a second canvas panel;
generating third sample data to render a third instance of the first graph element type in the second canvas panel; and
rendering the third instance of the first graph element type in the second canvas panel using the generated third sample data;
generating fourth sample data to render a second instance of the second graph element type in an overview axis of the second canvas panel; and
rendering the second instance of the second graph element type in the overview axis of the second canvas panel using the generated fourth sample data.

* * * * *